US011953919B2

(12) United States Patent
Nakata

(10) Patent No.: US 11,953,919 B2
(45) Date of Patent: Apr. 9, 2024

(54) DEVICE, METHOD, AND MEDIUM FOR VEHICLE POSITION AND COMMUNICATION RATE

(71) Applicant: NEC CORPORATION, Tokyo (JP)

(72) Inventor: Atsushi Nakata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 427 days.

(21) Appl. No.: 16/491,437

(22) PCT Filed: Mar. 15, 2018

(86) PCT No.: PCT/JP2018/010168
§ 371 (c)(1),
(2) Date: Sep. 5, 2019

(87) PCT Pub. No.: WO2018/180534
PCT Pub. Date: Oct. 4, 2018

(65) Prior Publication Data
US 2020/0033889 A1  Jan. 30, 2020

(30) Foreign Application Priority Data

Mar. 27, 2017  (JP) .................................. 2017-061122

(51) Int. Cl.
*G05D 1/10* (2006.01)
*B64C 39/02* (2023.01)
(Continued)

(52) U.S. Cl.
CPC .......... *G05D 1/102* (2013.01); *B64C 39/024* (2013.01); *B64D 47/08* (2013.01); *G01C 21/20* (2013.01);
(Continued)

(58) Field of Classification Search
CPC ............................. G05D 1/102; B64C 39/024; B64C 2201/127; B64C 2201/146; B64D 47/08; G01C 21/20; H04W 84/042
See application file for complete search history.

(56) References Cited

U.S. PATENT DOCUMENTS 9,046,370 B2 * 6/2015 Annapureddy .. G08G 1/096811
2015/0370251 A1 * 12/2015 Siegel ................... B64C 39/024
701/2
(Continued)

FOREIGN PATENT DOCUMENTS

CN   102938670 A   2/2013
CN   103542852 A   1/2014
(Continued)

OTHER PUBLICATIONS

Ç . Tanil, C. Warty and E. Obiedat, "Collaborative mission planning for UAV cluster to optimize relay distance," 2013 IEEE Aerospace Conference, 2013, pp. 1-11, doi: 10.1109/AERO.2013.6497407. (Year: 2013).*
(Continued)

*Primary Examiner* — Aniss Chad
*Assistant Examiner* — Christine Nguyen Huynh
(74) *Attorney, Agent, or Firm* — Sughrue Mion, PLLC

(57) ABSTRACT

In order to solve the problem in which a flight vehicle flies only in locations having poor communication quality and retained data cannot necessarily reach the ground, this device communicates with a flight vehicle, wherein the device is provided with: a storage means that associates and stores first position information and a first communication rate at which it is possible to communicate at the position of the first position information; an extraction means that, upon receiving information that corresponds to a prescribed second communication rate at which the flight vehicle transmits data, extracts the first position information corresponding to
(Continued)

DIAGRAM ILLUSTRATING CONFIGURATION EXAMPLE OF SYSTEM IN FIRST EXAMPLE EMBODIMENT the first communication rate equal to or greater than the second communication rate from the storage means; and an output means that outputs the first position information extracted by the extraction means to the flight vehicle, or outputs the inputted first position information to an instrument that notifies the flight vehicle.

16 Claims, 37 Drawing Sheets

(51) Int. Cl.
| | |
|---|---|
| B64D 47/08 | (2006.01) |
| G01C 21/20 | (2006.01) |
| G05D 1/00 | (2006.01) |
| H04W 84/04 | (2009.01) |
| B64U 101/30 | (2023.01) |

(52) U.S. Cl.
CPC ...... *B64U 2101/30* (2023.01); *B64U 2201/20* (2023.01); *H04W 84/042* (2013.01)

(56) References Cited

U.S. PATENT DOCUMENTS

| | | | |
|---|---|---|---|
| 2016/0210863 A1* | 7/2016 | Kohn-Rich | G08G 5/0086 |
| 2017/0025021 A1* | 1/2017 | Song | G08G 5/0013 |

FOREIGN PATENT DOCUMENTS

| | | |
|---|---|---|
| CN | 105009182 A | 10/2015 |
| CN | 105282831 A | 1/2016 |
| CN | 105792275 A | 7/2016 |
| EP | 2278732 A2 | 1/2011 |
| JP | 2009-540685 A | 11/2009 |
| JP | 2015-074277 A | 4/2015 |
| JP | 2016-032232 A | 3/2016 |
| JP | 2016-511408 A | 4/2016 |
| JP | 6081652 B1 | 2/2017 |
| WO | 2016/000349 A1 | 1/2016 |

OTHER PUBLICATIONS

Chinese Office Action for CN Application No. 201880021468.5 dated Jul. 1, 2021 with English Translation.
Cai Kai et al., "Research on initial trajectories of attack aircraft based on Dijkstra algorithm", vol. 15, Issue 11 of Electronics Optics & Control, Nov. 30, 2008.
International Search Report for PCT/JP2018/010168 dated Jun. 19, 2018 [PCT/ISA/210].
Written Opinion for PCT/JP2018/010168 dated Jun. 19, 2018 [PCT/ISA/210].
Chinese Office Action for CN Application No. 201880021468.5 dated Feb. 22, 2022 with English Translation.
CN Office Action for CN Application No. 201880021468.5, dated Jun. 28, 2022 with English Translation.

* cited by examiner

DIAGRAM ILLUSTRATING CONFIGURATION EXAMPLE OF OPERATION CONTROL STATION INCLUDED IN SYSTEM IN FIRST EXAMPLE EMBODIMENT

Fig.4

| POSITION INFORMATION | | | COMMUNICATION RATE |
|---|---|---|---|
| LATITUDE | LONGITUDE | ALTITUDE | |
| 35 DEG 40 MIN 28 SEC NORTH LATITUDE | 139 DEG 45 MIN 10 SEC EAST LONGITUDE | 100m | 0Mbps |
| 35 DEG 40 MIN 29 SEC NORTH LATITUDE | 139 DEG 45 MIN 10 SEC EAST LONGITUDE | 100m | 0Mbps |
| 35 DEG 40 MIN 30 SEC NORTH LATITUDE | 139 DEG 45 MIN 10 SEC EAST LONGITUDE | 100m | 0Mbps |
| 35 DEG 40 MIN 31 SEC NORTH LATITUDE | 139 DEG 45 MIN 10 SEC EAST LONGITUDE | 100m | 0Mbps |
| 35 DEG 40 MIN 28 SEC NORTH LATITUDE | 139 DEG 45 MIN 11 SEC EAST LONGITUDE | 100m | 50Mbps |
| 35 DEG 40 MIN 29 SEC NORTH LATITUDE | 139 DEG 45 MIN 11 SEC EAST LONGITUDE | 100m | 50Mbps |
| 35 DEG 40 MIN 30 SEC NORTH LATITUDE | 139 DEG 45 MIN 11 SEC EAST LONGITUDE | 100m | 0Mbps |
| 35 DEG 40 MIN 31 SEC NORTH LATITUDE | 139 DEG 45 MIN 11 SEC EAST LONGITUDE | 100m | 0Mbps |
| 35 DEG 40 MIN 28 SEC NORTH LATITUDE | 139 DEG 45 MIN 12 SEC EAST LONGITUDE | 100m | 0Mbps |
| 35 DEG 40 MIN 29 SEC NORTH LATITUDE | 139 DEG 45 MIN 12 SEC EAST LONGITUDE | 100m | 0Mbps |
| 35 DEG 40 MIN 30 SEC NORTH LATITUDE | 139 DEG 45 MIN 12 SEC EAST LONGITUDE | 100m | 0Mbps |
| 35 DEG 40 MIN 31 SEC NORTH LATITUDE | 139 DEG 45 MIN 12 SEC EAST LONGITUDE | 100m | 0Mbps |
| 35 DEG 40 MIN 28 SEC NORTH LATITUDE | 139 DEG 45 MIN 13 SEC EAST LONGITUDE | 100m | 0Mbps |
| 35 DEG 40 MIN 29 SEC NORTH LATITUDE | 139 DEG 45 MIN 13 SEC EAST LONGITUDE | 100m | 0Mbps |
| 35 DEG 40 MIN 30 SEC NORTH LATITUDE | 139 DEG 45 MIN 13 SEC EAST LONGITUDE | 100m | 0Mbps |
| 35 DEG 40 MIN 31 SEC NORTH LATITUDE | 139 DEG 45 MIN 13 SEC EAST LONGITUDE | 100m | 0Mbps |
| ... | ... | ... | ... |

PRESENT LOCATION (row 5: 50Mbps)
TO BE EXTRACTED (rows 5–6: 50Mbps)

DIAGRAM ILLUSTRATING EXAMPLE OF TABLE SET IN SYSTEM (OPERATION CONTROL STATION) OF FIRST EXAMPLE EMBODIMENT

DIAGRAM FOR DESCRIPTION OF RESULT OF OPERATION OF OPERATION CONTROL STATION INCLUDED IN SYSTEM IN FIRST EXAMPLE EMBODIMENT

DIAGRAM ILLUSTRATING CONFIGURATION EXAMPLE OF SYSTEM IN THIRD EXAMPLE EMBODIMENT

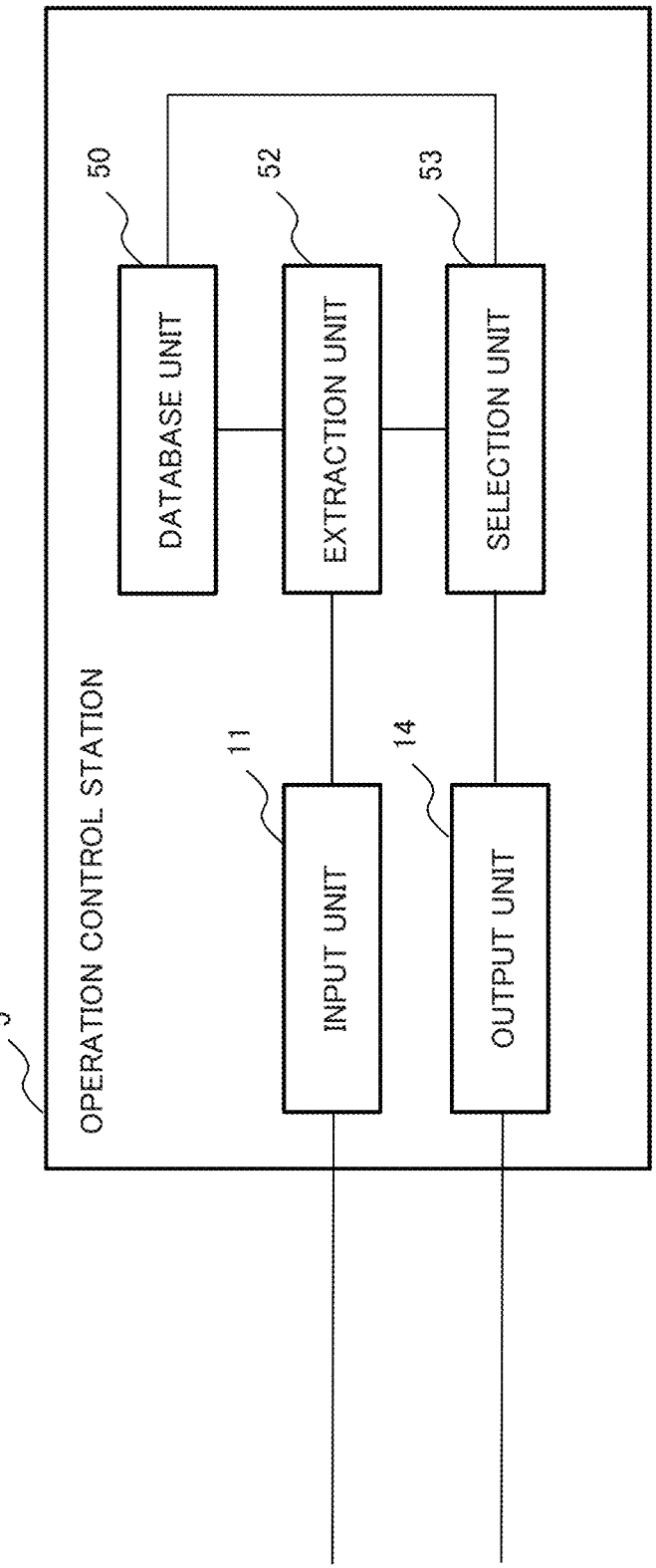

Fig.14

| POSITION INFORMATION | | | COMMUNICATION RATE | INFORMATION INDICATING CORNER |
|---|---|---|---|---|
| LATITUDE | LONGITUDE | ALTITUDE | | |
| 35 DEG 40 MIN 31 SEC NORTH LATITUDE | 139 DEG 45 MIN 10 SEC EAST LONGITUDE | 100m | 50Mbps | 1 |
| 35 DEG 40 MIN 30 SEC NORTH LATITUDE | 139 DEG 45 MIN 10 SEC EAST LONGITUDE | 100m | 50Mbps | 0 |
| 35 DEG 40 MIN 29 SEC NORTH LATITUDE | 139 DEG 45 MIN 10 SEC EAST LONGITUDE | 100m | 50Mbps | 0 |
| 35 DEG 40 MIN 28 SEC NORTH LATITUDE | 139 DEG 45 MIN 10 SEC EAST LONGITUDE | 100m | 50Mbps | 1 |
| 35 DEG 40 MIN 27 SEC NORTH LATITUDE | 139 DEG 45 MIN 10 SEC EAST LONGITUDE | 100m | 0Mbps | 0 |
| 35 DEG 40 MIN 26 SEC NORTH LATITUDE | 139 DEG 45 MIN 10 SEC EAST LONGITUDE | 100m | 50Mbps | 1 |
| 35 DEG 40 MIN 25 SEC NORTH LATITUDE | 139 DEG 45 MIN 10 SEC EAST LONGITUDE | 100m | 50Mbps | 0 |
| 35 DEG 40 MIN 24 SEC NORTH LATITUDE | 139 DEG 45 MIN 10 SEC EAST LONGITUDE | 100m | 50Mbps | 0 |
| 35 DEG 40 MIN 23 SEC NORTH LATITUDE | 139 DEG 45 MIN 10 SEC EAST LONGITUDE | 100m | 50Mbps | 0 |
| 35 DEG 40 MIN 22 SEC NORTH LATITUDE | 139 DEG 45 MIN 10 SEC EAST LONGITUDE | 100m | 50Mbps | 0 |
| 35 DEG 40 MIN 21 SEC NORTH LATITUDE | 139 DEG 45 MIN 10 SEC EAST LONGITUDE | 100m | 50Mbps | 1 |
| 35 DEG 40 MIN 20 SEC NORTH LATITUDE | 139 DEG 45 MIN 10 SEC EAST LONGITUDE | 100m | 50Mbps | 0 |
| 35 DEG 40 MIN 31 SEC NORTH LATITUDE | 139 DEG 45 MIN 11 SEC EAST LONGITUDE | 100m | 50Mbps | 0 |
| 35 DEG 40 MIN 30 SEC NORTH LATITUDE | 139 DEG 45 MIN 11 SEC EAST LONGITUDE | 100m | 50Mbps | 0 |
| 35 DEG 40 MIN 29 SEC NORTH LATITUDE | 139 DEG 45 MIN 11 SEC EAST LONGITUDE | 100m | 50Mbps | 0 |
| 35 DEG 40 MIN 28 SEC NORTH LATITUDE | 139 DEG 45 MIN 11 SEC EAST LONGITUDE | 100m | 50Mbps | 0 |
| ... | ... | ... | ... | ... |
| 35 DEG 40 MIN 20 SEC NORTH LATITUDE | 139 DEG 45 MIN 26 SEC EAST LONGITUDE | 100m | 50Mbps | 1 |

DIAGRAM ILLUSTRATING EXAMPLE OF TABLE SET IN SYSTEM (OPERATION CONTROL STATION) OF THIRD EXAMPLE EMBODIMENT

Fig. 15

| POSITION INFORMATION | | | COMMUNICATION RATE |
|---|---|---|---|
| LATITUDE | LONGITUDE | ALTITUDE | |
| 35 DEG 40 MIN 31 SEC NORTH LATITUDE | 139 DEG 45 MIN 10 SEC EAST LONGITUDE | 100m | 50Mbps |
| 35 DEG 40 MIN 30 SEC NORTH LATITUDE | 139 DEG 45 MIN 10 SEC EAST LONGITUDE | 100m | 50Mbps |
| 35 DEG 40 MIN 29 SEC NORTH LATITUDE | 139 DEG 45 MIN 10 SEC EAST LONGITUDE | 100m | 50Mbps |
| 35 DEG 40 MIN 28 SEC NORTH LATITUDE | 139 DEG 45 MIN 10 SEC EAST LONGITUDE | 100m | 50Mbps |
| 35 DEG 40 MIN 27 SEC NORTH LATITUDE | 139 DEG 45 MIN 10 SEC EAST LONGITUDE | 100m | 0Mbps |
| 35 DEG 40 MIN 26 SEC NORTH LATITUDE | 139 DEG 45 MIN 10 SEC EAST LONGITUDE | 100m | 50Mbps |
| 35 DEG 40 MIN 25 SEC NORTH LATITUDE | 139 DEG 45 MIN 10 SEC EAST LONGITUDE | 100m | 50Mbps |
| 35 DEG 40 MIN 24 SEC NORTH LATITUDE | 139 DEG 45 MIN 10 SEC EAST LONGITUDE | 100m | 50Mbps |
| 35 DEG 40 MIN 23 SEC NORTH LATITUDE | 139 DEG 45 MIN 10 SEC EAST LONGITUDE | 100m | 50Mbps |
| 35 DEG 40 MIN 22 SEC NORTH LATITUDE | 139 DEG 45 MIN 10 SEC EAST LONGITUDE | 100m | 50Mbps |
| 35 DEG 40 MIN 21 SEC NORTH LATITUDE | 139 DEG 45 MIN 10 SEC EAST LONGITUDE | 100m | 50Mbps |
| 35 DEG 40 MIN 20 SEC NORTH LATITUDE | 139 DEG 45 MIN 10 SEC EAST LONGITUDE | 100m | 50Mbps |
| 35 DEG 40 MIN 31 SEC NORTH LATITUDE | 139 DEG 45 MIN 11 SEC EAST LONGITUDE | 100m | 50Mbps |
| 35 DEG 40 MIN 30 SEC NORTH LATITUDE | 139 DEG 45 MIN 11 SEC EAST LONGITUDE | 100m | 50Mbps |
| 35 DEG 40 MIN 29 SEC NORTH LATITUDE | 139 DEG 45 MIN 11 SEC EAST LONGITUDE | 100m | 50Mbps |
| 35 DEG 40 MIN 28 SEC NORTH LATITUDE | 139 DEG 45 MIN 11 SEC EAST LONGITUDE | 100m | 50Mbps |
| ... | ... | ... | ... |
| 35 DEG 40 MIN 20 SEC NORTH LATITUDE | 139 DEG 45 MIN 26 SEC EAST LONGITUDE | 100m | 50Mbps |

DIAGRAM (PART 1) FOR DESCRIPTION OF CREATION METHOD OF TABLE SET IN SYSTEM (OPERATION CONTROL STATION) OF THIRD EXAMPLE EMBODIMENT

DIAGRAM (PART 2) FOR DESCRIPTION OF CREATION METHOD OF TABLE SET IN SYSTEM (OPERATION CONTROL STATION) OF THIRD EXAMPLE EMBODIMENT

DIAGRAM (PART 3) FOR DESCRIPTION OF CREATION METHOD OF TABLE SET IN SYSTEM (OPERATION CONTROL STATION) OF THIRD EXAMPLE EMBODIMENT

Fig. 19 DIAGRAM (PART 1) FOR DESCRIPTION OF OPERATION PROCESS OF OPERATION CONTROL STATION INCLUDED IN SYSTEM IN THIRD EXAMPLE EMBODIMENT

DIAGRAM (PART 2) FOR DESCRIPTION OF OPERATION PROCESS OF OPERATION CONTROL STATION INCLUDED IN SYSTEM IN THIRD EXAMPLE EMBODIMENT

DIAGRAM (PART 3) FOR DESCRIPTION OF OPERATION PROCESS OF OPERATION CONTROL STATION INCLUDED IN SYSTEM IN THIRD EXAMPLE EMBODIMENT

DIAGRAM FOR DESCRIPTION OF RESULT OF OPERATION OF OPERATION CONTROL STATION INCLUDED IN SYSTEM IN THIRD EXAMPLE EMBODIMENT

DIAGRAM ILLUSTRATING CONFIGURATION EXAMPLE OF BASE STATION INCLUDED IN SYSTEM IN FOURTH EXAMPLE EMBODIMENT

DIAGRAM ILLUSTRATING CONFIGURATION EXAMPLE OF OPERATION CONTROL STATION INCLUDED IN SYSTEM IN FIFTH EXAMPLE EMBODIMENT

Fig.27

| POSITION INFORMATION | | | COMMUNI-CATION RATE | INFORMATION INDICATING CORNER | FLIGHT INFORMATION |
|---|---|---|---|---|---|
| LATITUDE | LONGITUDE | ALTITUDE | | | |
| 35 DEG 40 MIN 31 SEC NORTH LATITUDE | 139 DEG 45 MIN 10 SEC EAST LONGITUDE | 100m | 50Mbps | 1 | ALLOWED TO FLY |
| 35 DEG 40 MIN 30 SEC NORTH LATITUDE | 139 DEG 45 MIN 10 SEC EAST LONGITUDE | 100m | 50Mbps | 0 | ALLOWED TO FLY |
| 35 DEG 40 MIN 29 SEC NORTH LATITUDE | 139 DEG 45 MIN 10 SEC EAST LONGITUDE | 100m | 50Mbps | 0 | ALLOWED TO FLY |
| 35 DEG 40 MIN 28 SEC NORTH LATITUDE | 139 DEG 45 MIN 10 SEC EAST LONGITUDE | 100m | 0Mbps | 1 | FORBIDDEN TO FLY |
| 35 DEG 40 MIN 27 SEC NORTH LATITUDE | 139 DEG 45 MIN 10 SEC EAST LONGITUDE | 100m | 50Mbps | 0 | ALLOWED TO FLY |
| 35 DEG 40 MIN 26 SEC NORTH LATITUDE | 139 DEG 45 MIN 10 SEC EAST LONGITUDE | 100m | 50Mbps | 1 | ALLOWED TO FLY |
| 35 DEG 40 MIN 25 SEC NORTH LATITUDE | 139 DEG 45 MIN 10 SEC EAST LONGITUDE | 100m | 50Mbps | 0 | ALLOWED TO FLY |
| 35 DEG 40 MIN 24 SEC NORTH LATITUDE | 139 DEG 45 MIN 10 SEC EAST LONGITUDE | 100m | 50Mbps | 0 | ALLOWED TO FLY |
| 35 DEG 40 MIN 23 SEC NORTH LATITUDE | 139 DEG 45 MIN 10 SEC EAST LONGITUDE | 100m | 50Mbps | 0 | ALLOWED TO FLY |
| 35 DEG 40 MIN 22 SEC NORTH LATITUDE | 139 DEG 45 MIN 10 SEC EAST LONGITUDE | 100m | 50Mbps | 0 | ALLOWED TO FLY |
| 35 DEG 40 MIN 21 SEC NORTH LATITUDE | 139 DEG 45 MIN 10 SEC EAST LONGITUDE | 100m | 50Mbps | 0 | ALLOWED TO FLY |
| 35 DEG 40 MIN 20 SEC NORTH LATITUDE | 139 DEG 45 MIN 10 SEC EAST LONGITUDE | 100m | 50Mbps | 0 | ALLOWED TO FLY |
| 35 DEG 40 MIN 31 SEC NORTH LATITUDE | 139 DEG 45 MIN 11 SEC EAST LONGITUDE | 100m | 50Mbps | 0 | ALLOWED TO FLY |
| 35 DEG 40 MIN 30 SEC NORTH LATITUDE | 139 DEG 45 MIN 11 SEC EAST LONGITUDE | 100m | 50Mbps | 0 | ALLOWED TO FLY |
| 35 DEG 40 MIN 29 SEC NORTH LATITUDE | 139 DEG 45 MIN 11 SEC EAST LONGITUDE | 100m | 50Mbps | 0 | ALLOWED TO FLY |
| 35 DEG 40 MIN 28 SEC NORTH LATITUDE | 139 DEG 45 MIN 11 SEC EAST LONGITUDE | 100m | 50Mbps | 0 | ALLOWED TO FLY |
| ... | ... | ... | ... | ... | ... |
| 35 DEG 40 MIN 20 SEC NORTH LATITUDE | 139 DEG 45 MIN 26 SEC EAST LONGITUDE | 100m | 50Mbps | 1 | ALLOWED TO FLY |

DIAGRAM ILLUSTRATING EXAMPLE OF TABLE SET IN SYSTEM (OPERATION CONTROL STATION) OF FIFTH EXAMPLE EMBODIMENT

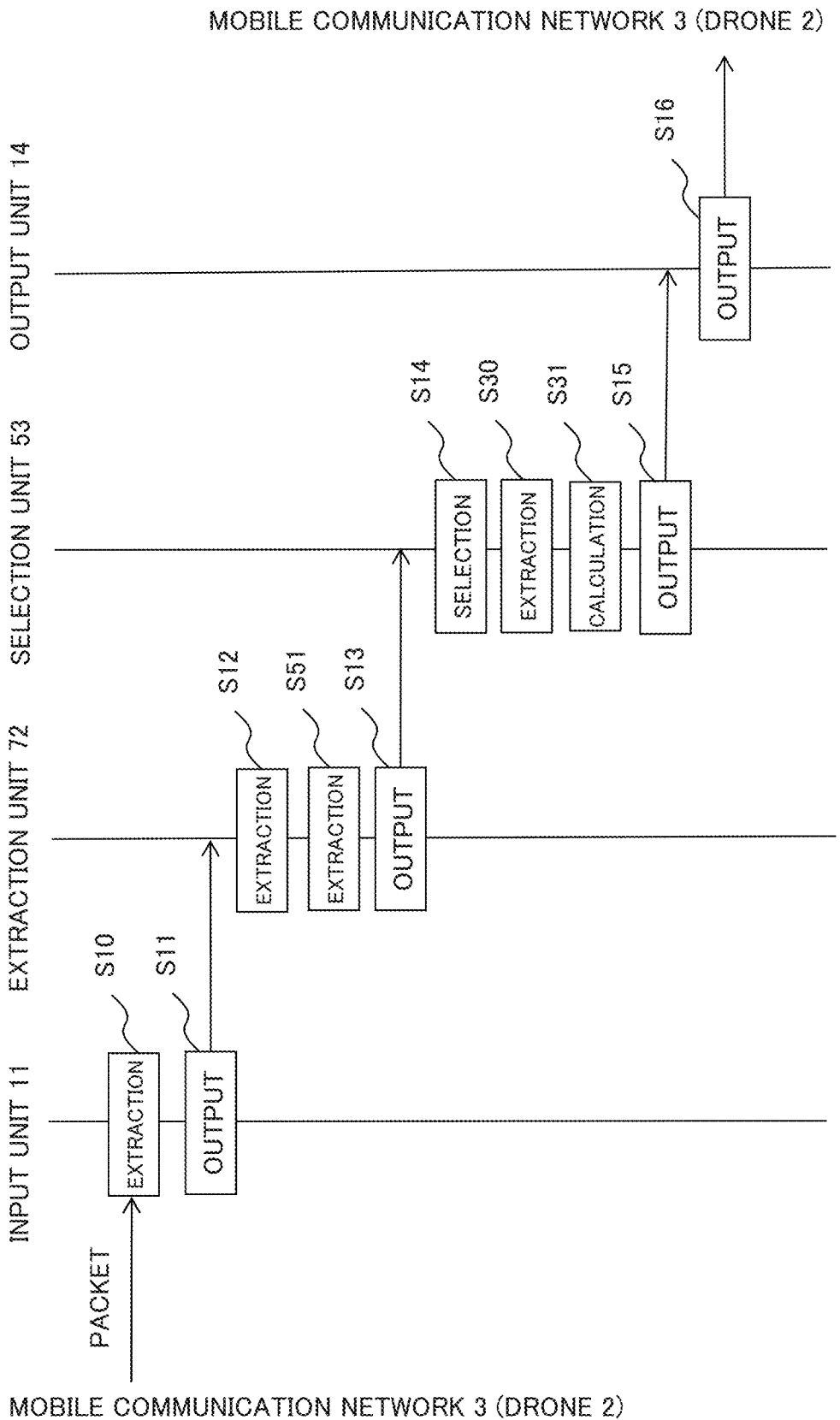

DIAGRAM (PART 1) FOR DESCRIPTION OF RESULT OF OPERATION OF OPERATION CONTROL STATION INCLUDED IN SYSTEM IN FIFTH EXAMPLE EMBODIMENT

DIAGRAM (PART 2) FOR DESCRIPTION OF RESULT OF OPERATION OF OPERATION CONTROL STATION INCLUDED IN SYSTEM IN FIFTH EXAMPLE EMBODIMENT

DIAGRAM ILLUSTRATING CONFIGURATION EXAMPLE OF SYSTEM IN SEVENTH EXAMPLE EMBODIMENT

DIAGRAM ILLUSTRATING CONFIGURATION EXAMPLE OF OPERATION CONTROL STATION INCLUDED IN SYSTEM IN SEVENTH EXAMPLE EMBODIMENT

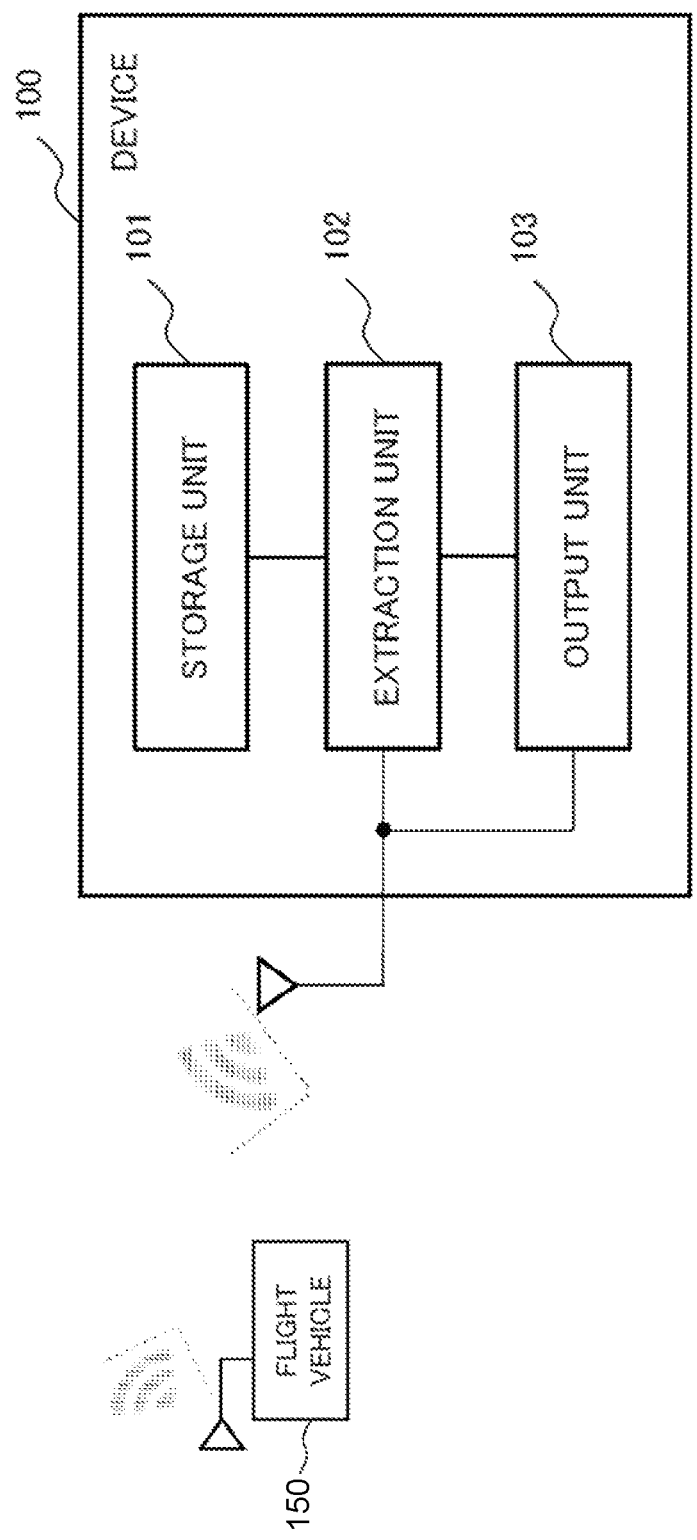

DEVICE, METHOD, AND MEDIUM FOR VEHICLE POSITION AND COMMUNICATION RATE

CROSS REFERENCE TO RELATED APPLICATIONS

This application is a National Stage of International Application No. PCT/JP2018/010168, filed on Mar. 15, 2018, which claims priority from Japanese Patent Application No. 2017-061122, filed on Mar. 27, 2017, the contents of all of which are incorporated herein by reference in their entirety.

TECHNICAL FIELD

The present invention relates to a device, a system, a method, and a recording medium recording a program, and particularly relates to a device, a system, a method, and a recording medium recording a program that control a flight vehicle.

BACKGROUND ART

Generally, operation control stations each of which wirelessly controls a drone have been known. A general operation control station transmits a control message to a drone, using radio waves of a mobile communication system. The drone, when receiving the control message, flies in accordance with instructions (for example, instructions of forward/backward and right/left movement) included in the received control message. Further, since the drone transmits image data of images captured from the sky, the operation control station receives and displays the image data on a connected display.

An operation control station that wirelessly controls a drone, described above, is disclosed in PTL 1. FIG. 1 is a diagram illustrating a configuration example of a system including the operation control station in PTL 1.

As illustrated in FIG. 1, the operation control station in PTL 1 transmits control messages to unmanned aerial vehicles (UAVs) via a mobile phone network. The control messages include instructions of controlling direction and speed in which each UAV flies. Each UAV, when receiving a control message from the operation control station in PTL 1, flies in accordance with an instruction included in the received control message. When each UAV has captured an image of the ground from the sky, the UAV transmits the captured image data to the operation control station in PTL 1. The operation control station in PTL 1 receives image data from the UAVs via the mobile phone network.

As the above-described configuration and operation show, the operation control station in PTL 1 is capable of remote controlling the UAVs. The operation control station in PTL 1 is also capable of receiving image data from the UAVs.

CITATION LIST

Patent Literature

[PTL 1] JP 2009-540685 A

SUMMARY OF INVENTION

Technical Problem

General mobile communication systems are designed considering communication with terminals (mobile phones) on the ground as a primary target. Thus, each base station of a mobile communication system is adjusted to emit the main lobe (radio waves having a strong intensity) from an antenna placed at a height of 20 to 30 m above the ground toward the ground. On the other hand, each base station of the mobile communication system emits only side lobes (radio waves having a weak intensity) toward the sky at a height of 50 to 120 m where the drone flies. Therefore, in the sky at a height of 50 to 120 m where the drone flies, there exists a lot of spots where communication quality is too low to transmit image data.

Further, the operation control station in PTL 1 only transmits control messages to the drone and does not transmit position information of a spot where image data can be transmitted. Therefore, the drone cannot have a perception of a spot where image data can be transmitted and is sometimes caused to fly over only spots where communication quality is too low to transmit image data. As a consequence, there has been a problem in that the drone cannot always deliver image data to the ground.

An object of the present invention is to provide a device, a system, a method, and a recording medium recording a program that solves the above-described problem.

Solution to Problem

In order to achieve the above-described object, a device of the present invention is a device configured to communicate with a flight vehicle and includes a storage means for storing a piece(s) of first position information and a first communication rate(s) at which communication can be performed at a position(s) indicated by the piece(s) of first position information in association with each other, an extraction means for, when a piece of information corresponding to a predetermined second communication rate at which the flight vehicle transmits data is input, extracting a piece(s) of first position information corresponding to a first communication rate(s) that is/are equal to or higher than the second communication rate from the storage means, and an output means for outputting the piece(s) of first position information extracted by the extraction means to the flight vehicle or an instrument configured to notify the flight vehicle of the input piece(s) of first position information.

In order to achieve the above-described object, a system of the present invention includes a device that is a device configured to communicate with a flight vehicle and includes a storage means for storing a piece(s) of first position information and a first communication rate(s) at which communication can be performed at a position(s) indicated by the piece(s) of first position information in association with each other, an extraction means for, when a piece of information corresponding to a predetermined second communication rate at which the flight vehicle transmits data is input, extracting a piece(s) of first position information corresponding to a first communication rate(s) that is/are equal to or higher than the second communication rate from the storage means, and an output means for outputting the piece(s) of first position information extracted by the extraction means to the flight vehicle or an instrument configured to notify the flight vehicle of the input piece(s) of first position information and the flight vehicle configured to fly to a position(s) indicated by the input piece(s) of first position information.

In order to achieve the above-described object, a method of the present invention is a method for a device configured to communicate with a flight vehicle and includes, when a piece of information corresponding to a predetermined first communication rate at which the flight vehicle transmits data is input, extracting, from a storage means that stores a piece(s) of second position information and a second communication rate(s) at which communication can be performed at a position(s) indicated by the piece(s) of second position information in association with each other, a piece(s) of second position information corresponding to a second communication rate(s) that is/are equal to or higher than the first communication rate, and outputting the extracted piece(s) of second position information to the flight vehicle or an instrument configured to notify the flight vehicle of the input piece(s) of second position information.

In order to achieve the above-described object, a recording medium recording a program of the present invention is a recording medium recording a program causing a processor installed in a device configured to communicate with a flight vehicle to execute extraction processing of, when a piece of information corresponding to a predetermined first communication rate at which the flight vehicle transmits data is input, extracting, from a storage means that stores a piece(s) of second position information and a second communication rate(s) at which communication can be performed at a position(s) indicated by the piece(s) of second position information in association with each other, a piece(s) of second position information corresponding to a second communication rate(s) that is/are equal to or higher than the first communication rate, and output processing of outputting the piece(s) of second position information extracted in the extraction processing to the flight vehicle or an instrument configured to notify the flight vehicle of the input piece(s) of second position information.

Advantageous Effects of Invention

The present invention enables a drone to deliver data to the ground.

BRIEF DESCRIPTION OF DRAWINGS

FIG. 4 is a diagram illustrating an example of a table set in the system (operation control station) in the first example embodiment of the present invention;

FIG. 13 is a diagram illustrating a configuration example of an operation control station included in the system in the third example embodiment of the present invention;

FIG. 14 is a diagram illustrating an example of a table set in the system (operation control station) in the third example embodiment of the present invention;

FIG. 15 is a diagram (part 1) for a description of a creation method of a table to be set in the system (operation control station) in the third example embodiment of the present invention;

FIG. 27 is a diagram illustrating an example of a table set in the system (operation control station) in the fifth example embodiment of the present invention;

FIG. 28 is a diagram for a description of operation of the operation control station included in the system in the fifth example embodiment of the present invention;

FIG. 37 is a diagram illustrating a configuration example of a system in an eighth example embodiment of the present invention.

EXAMPLE EMBODIMENT

Next, example embodiments of the present invention will be described in detail with reference to the drawings.

First Example Embodiment

[Outline]

When a communication rate required to transmit image data is input from a drone, an operation control station included in a system of the present example embodiment calculates a piece(s) of position information of a position(s) at which image data can be transmitted at the communication rate and notifies the drone of the calculated piece(s) of position information. The drone can perceive a position(s) at which image data can be transmitted and deliver image data retained by the drone to the ground at the position(s).

Hereinafter, a configuration, functions, and operation of a system in a first example embodiment of the present invention will be described.

[Description of Configuration]

Figure 1:
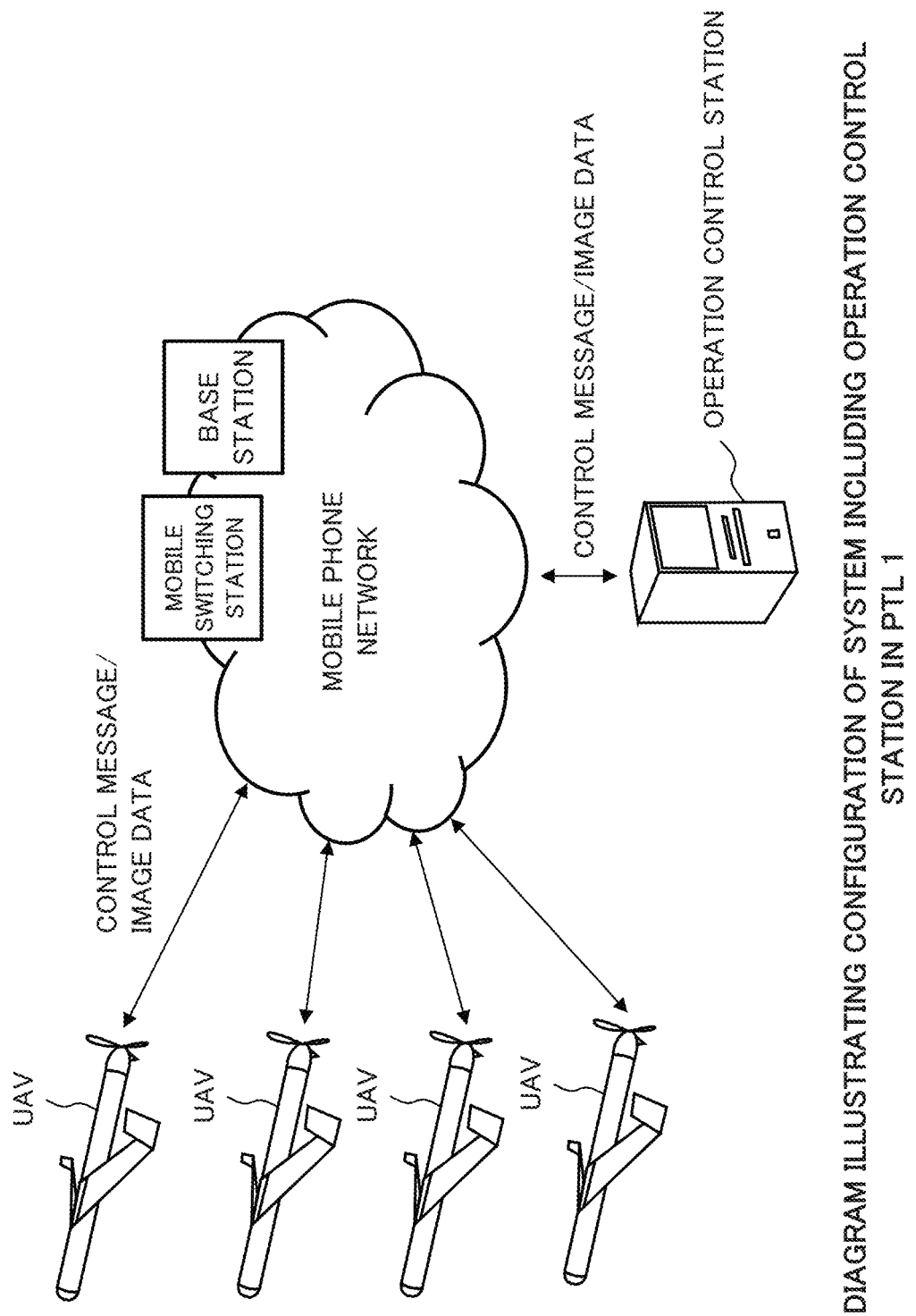
FIG. 1 is a diagram illustrating a configuration example of a system including an operation control station in PTL 1.
Figure 2:
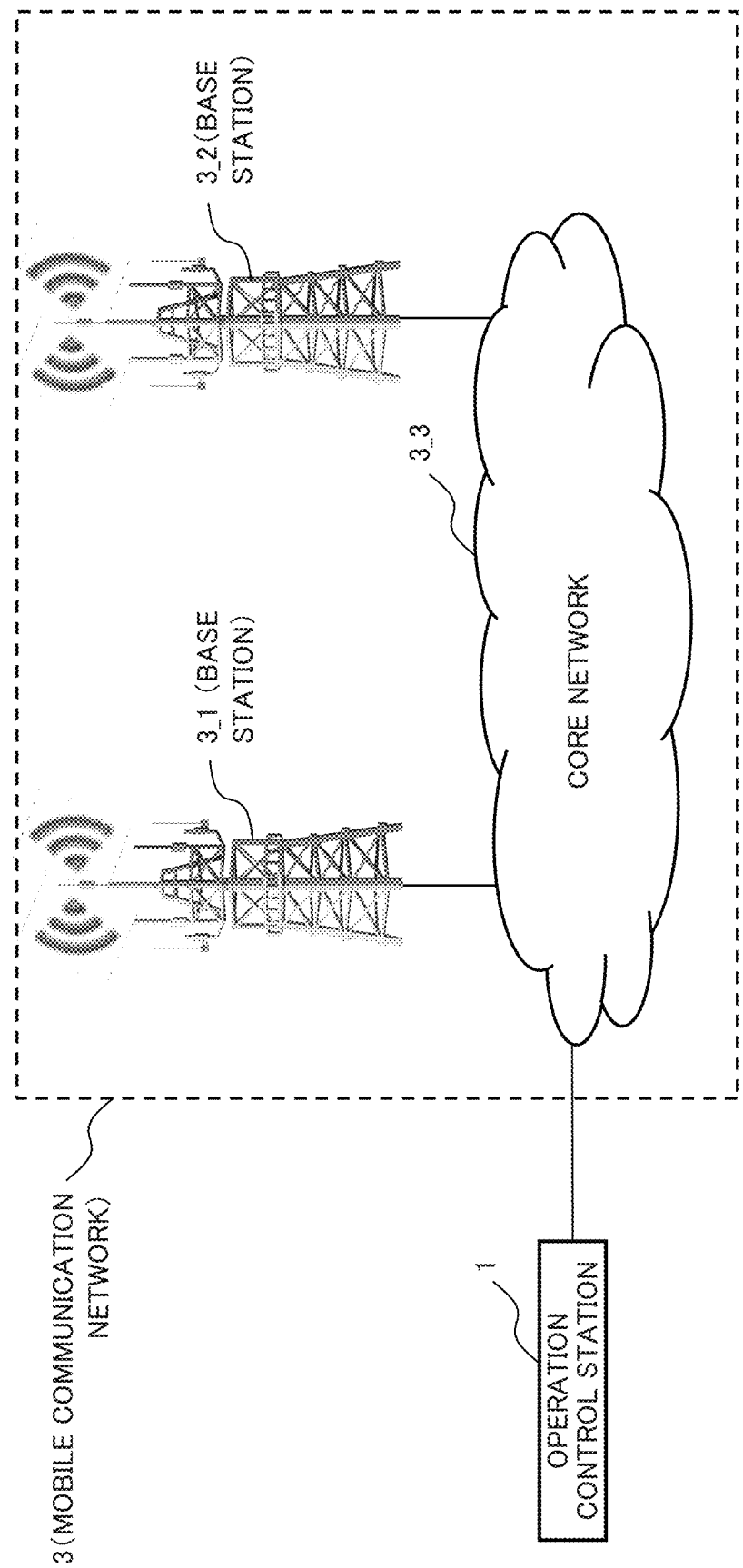
FIG. 2 is a diagram illustrating a configuration example of a system in a first example embodiment of the present invention.
Figure 3:
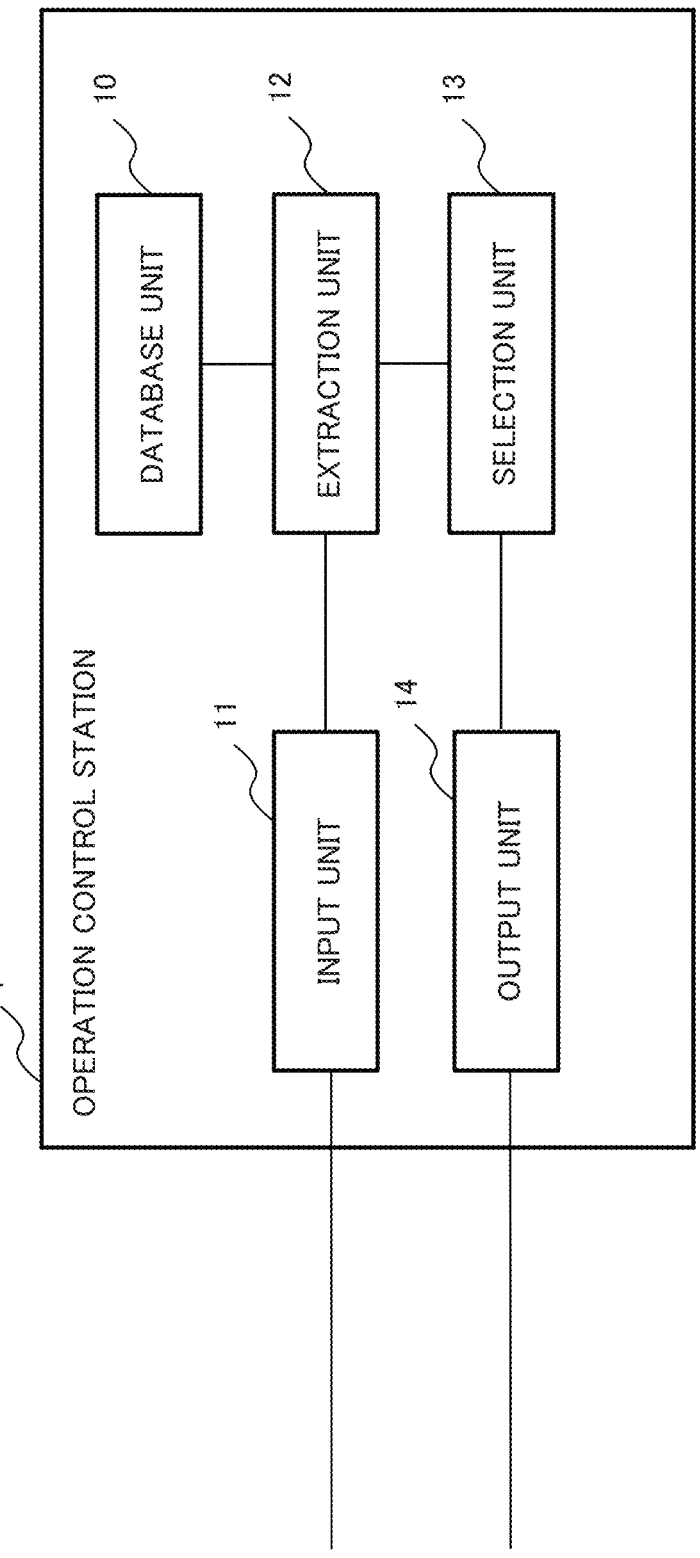
FIG. 3 is a diagram illustrating a configuration example of an operation control station included in the system in the first example embodiment of the present invention.

First, a configuration and functions of the system in the first example embodiment of the present invention will be described. FIG. 2 is a diagram illustrating a configuration example of the system in the first example embodiment of the present invention. FIG. 3 is a diagram illustrating a configuration example of an operation control station included in the system in the first example embodiment of the present invention.

(1) Configuration of System in First Example Embodiment of the Present Invention The system of the present example embodiment includes, as illustrated in FIG. 2, an operation control station 1, a drone 2, and a mobile communication network 3. The mobile communication network 3 includes base stations 3_1 and 3_2 and a core network 3_3.

The operation control station 1 is connected to the core network 3_3 via a wired line. The core network 3_3 is connected to the base stations 3_1 and 3_2 via wired lines. The base station 3_1 is connected to the drone 2 via a wireless line.

(2) Configuration of Operation Control Station 1 Included in System in the Present Example Embodiment The operation control station 1 includes, as illustrated in FIG. 3, a database unit 10, an input unit 11, an extraction unit 12, a selection unit 13, and an output unit 14. The input unit 11 and the output unit 14 are connected to the core network 3_3 in the mobile communication network 3 via wired lines.

(3) Functions of Respective Devices Included in System in the Present Example Embodiment FIG. 4 is a diagram illustrating an example of a table set in the operation control station 1 included in the system in the first example embodiment of the present invention.

First, functions of the operation control station 1 will be described. The following description will be made with respect to each functional unit in the operation control station 1. Note that, in the following description, it is assumed that to "output" something means outputting something as an electrical signal and an expression "information is input" means extracting information from an input electrical signal.

(3-1) Functions of Operation Control Station 1

(3-1-1) Functions of Database Unit 10

The database unit 10 is a memory, into which a table illustrated in FIG. 4 is set in advance by an administrator of the present example embodiment. The table illustrated in FIG. 4 is a table in which pieces of position information and communication rates when communication is performed at positions indicated by the pieces of position information are associated with each other. Each piece of position information is, as illustrated in FIG. 4, represented by latitude, longitude, and altitude.

The administrator of the system of the present example embodiment may, in order to create the table illustrated in FIG. 4, mount, on a drone, a mobile terminal into which a general application for measuring wireless communication speed is installed. The administrator of the system of the present example embodiment may, using the drone on which the above-described mobile terminal is mounted, measure a wireless communication speed at each position indicated by a piece of position information indicated in the table in FIG. 4. The database unit 10 stores the set table.

(3-1-2) Functions of Input Unit 11

When a packet addressed to the operation control station 1 is input, the input unit 11 extracts, from the packet, a piece of position information of a present location of the drone 2, a communication rate required to transmit image data, and a piece of position information of a flight destination of the drone 2. The input unit 11 outputs the extracted pieces of position information and the like to the extraction unit 12.

(3-1-3) Functions of Extraction Unit 12

To the extraction unit 12, the piece of position information of the present location of the drone 2, the communication rate necessary for the drone 2 to transmit image data, and the piece of position information of the flight destination of the drone 2 are input.

The extraction unit 12 extracts all piece(s) of position information corresponding to a communication rate(s) equal to or higher than the input communication rate from the table stored in the database unit 10. Each extracted piece of position information is a piece of position information of a position at which image data can be transmitted. The extraction unit 12 outputs, to the selection unit 13, the extracted piece(s) of position information (hereinafter, referred to as a piece(s) of "position information of a stopover location(s)"), the input piece of position information of the present location of the drone 2, and the input piece of position information of the flight destination of the drone 2.

(3-1-4) Functions of Selection Unit 13

When the piece(s) of position information of the stopover location(s) is/are input, the selection unit 13 selects, out of the input piece(s) of position information of the stopover location(s), a piece(s) of position information of a stopover location(s) located between the present location and flight destination of the drone 2. This selection is aimed at not causing the drone 2 to be notified of a piece of position information of a stopover location located in the opposite direction to the direction toward the flight destination. A specific selection method will be described in detail in [Description of Operation], to be described later.

The selection unit 13 outputs, to the output unit 14, the selected piece(s) of position information of the stopover location(s) and the input piece of position information of the flight destination of the drone 2. When there are a plurality of selected pieces of position information of stopover locations, the selection unit 13 outputs the plurality of pieces of position information of the stopover locations in descending order of proximity to the present location of the drone 2. The selection unit 13 outputs the piece of position information of the flight destination of the drone 2 after the selected piece(s) of position information of the stopover location(s).

(3-1-5) Functions of Output Unit 14

To the output unit 14, the piece(s) of position information of the stopover location(s) from the selection unit 13 and the piece of position information of the flight destination of the drone 2 are input in this order. The output unit 14 transmits the pieces of position information by including the pieces of position information in a packet addressed to the drone 2 in the order of input.

Note that, when including the piece(s) of position information of the stopover location(s) in a packet addressed to the drone 2, the output unit 14 assigns a number(s) indicating order of input to the piece(s) of position information. The output unit 14 assigns a smaller number to a piece of position information of a stopover location input earlier. This assignment method of numbers is aimed at enabling the reception side (the drone 2) to discriminate which one is a piece of position information of a stopover location closer to the present location.

In addition, the output unit 14 includes a general keyboard and a memory. When a piece of position information of a flight destination of the drone 2 is input through the keyboard by the administrator of the system of the present example embodiment, the output unit 14 transmits the input piece of position information of the flight destination by including the piece of position information of the flight destination in a packet addressed to the drone 2.

(3-1-6) Other Functions of Input Unit 11

The above-described input unit 11 includes a display. The input unit 11 has a function of, when extracting image data from a packet addressed to the operation control station 1, displaying the extracted image data on the display.

(3-2) Functions of Drone 2

(3-2-1) Wireless Communication Function

The drone 2, as with a general drone, has a wireless communication function of performing communication with the base station 3_1 via a wireless line. The drone 2, when receiving a packet addressed to the drone 2 itself by means of the wireless communication function, extracts pieces of position information included in the received packet and numbers assigned thereto.

(3-2-2) Flight Function

The drone 2 has a global positioning system (GPS) function. In addition, the drone 2 has a function of, using the GPS function, flying to a position indicated by an extracted piece of position information. When there are a plurality of extracted pieces of position information, the drone 2 flies to positions indicated by the pieces of position information in ascending order of numbers assigned to the pieces of position information.

(3-2-3) Image Data Storage Function

The drone 2 includes a general camera and a memory. When the drone 2 captures an image of the ground using the camera, the drone 2 stores the captured image data in the memory.

(3-2-4) Transmission Function of Position Information and Others

The drone 2, when having stored the data of the captured image in the memory, includes a piece of position information of a present location measured using the GPS function, a communication rate required to transmit the stored image data, and an extracted piece of position information of a flight destination in a packet addressed to the operation control station 1.

The drone 2 transmits the packet addressed to the operation control station 1, using the wireless communication function.

The above-described "communication rate required to transmit image data" is set in the drone 2 in advance by the administrator of the system of the present example embodiment. The administrator of the system of the present example embodiment determines a transmission rate at which the drone 2 transmits image data as a system standard at the time of system design. The administrator of the system of the present example embodiment sets the determined communication rate in the drone 2 as the communication rate required to transmit image data.

(3-2-5) Image Data Transmission Function

The drone 2, when having flown to a position indicated by an extracted piece of position information, transmits image data stored in the memory, using the wireless communication function.

(3-3) About Respective Devices Constituting Mobile Communication Network 3

The base stations 3_1 and 3_2 in the mobile communication network 3 are base stations of a general mobile communication network. The core network 3_3 is a core network of a general mobile communication network.

For this reason, the base station 3_1, when receiving a packet addressed to the operation control station 1 from the drone 2, transmits the received packet addressed to the operation control station 1 to the core network 3_3. The core network 3_3 transmits the packet addressed to the operation control station 1, received from the base station 3_1, to the operation control station 1.

In addition, the core network 3_3, when receiving a packet addressed to the drone 2 from the operation control station 1, transmits the received packet addressed to the drone 2 to the base station 3_1. The base station 3_1 transmits the packet addressed to the drone 2, received from the core network 3_3, to the drone 2.

[Description of Operation]

Figure 5:
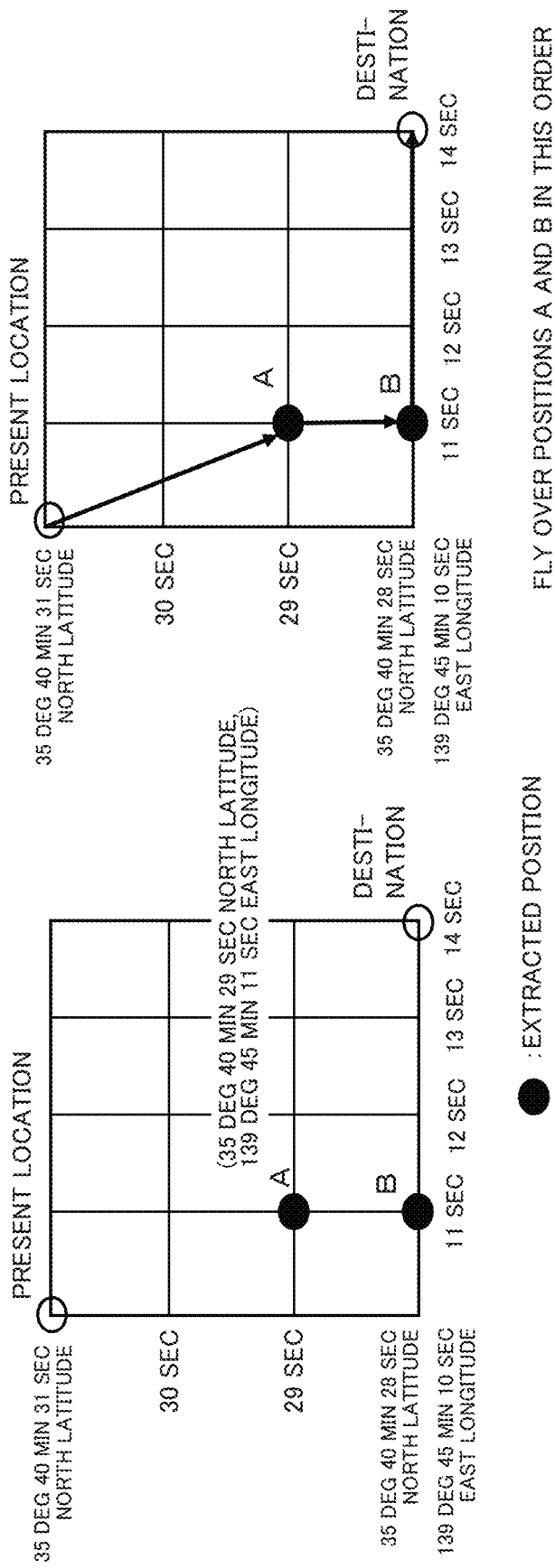
FIG. 5 is a diagram for a description of a result of an operation of the operation control station included in the system in the first example embodiment of the present invention.
Figure 6:
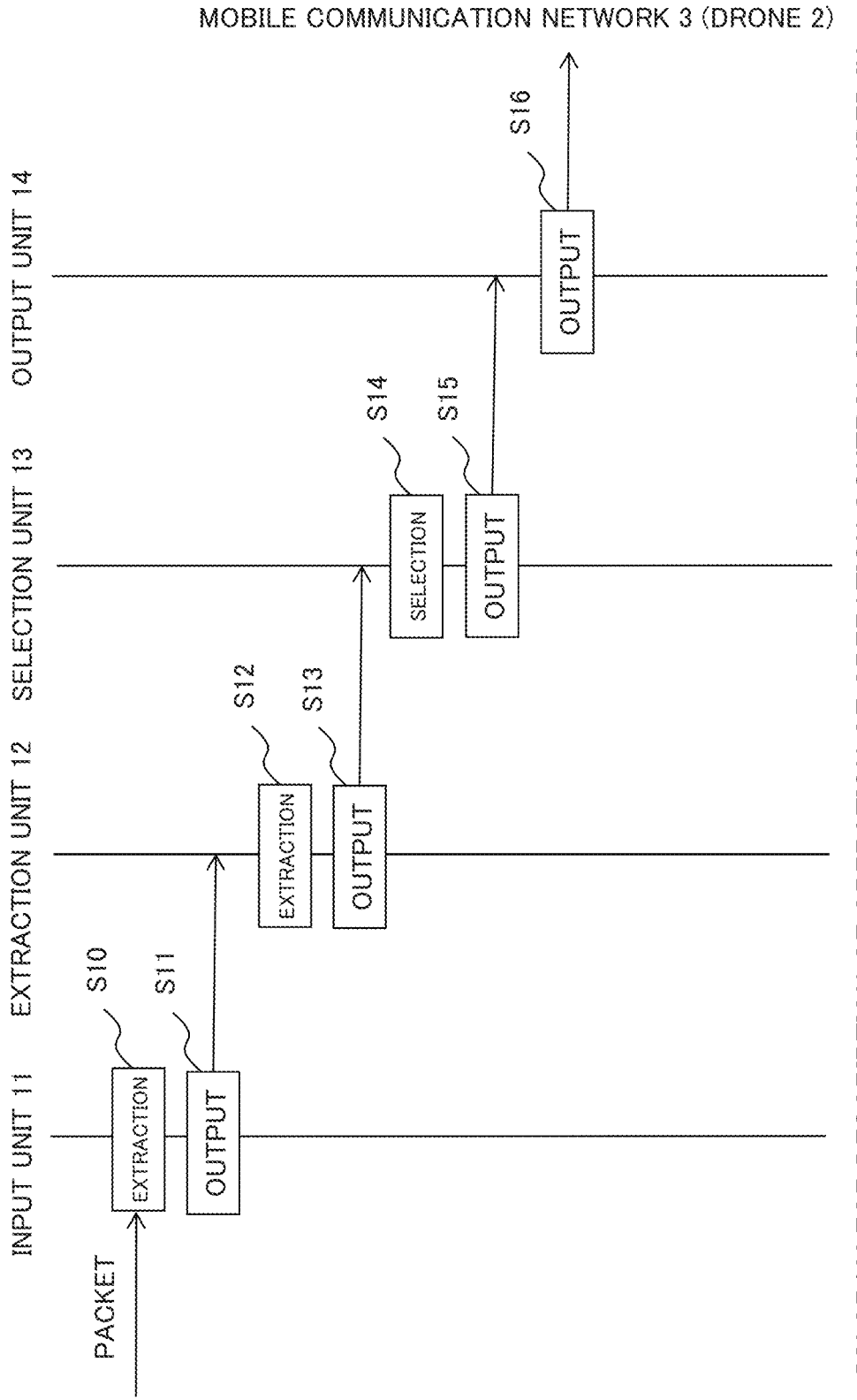
FIG. 6 is a diagram for a description of operation of the operation control station included in the system in the first example embodiment of the present invention.

FIG. 5 is a diagram for a description of a result of an operation of the operation control station included in the system in the first example embodiment of the present invention. FIG. 6 is a diagram for a description of operation of the operation control station included in the system in the first example embodiment of the present invention.

Using FIGS. 5 and 6, the operation of the system of the present example embodiment will be described below.

(1) Operation of Drone 2

First, it is assumed that the drone 2 is flying toward a flight destination (a position of 35 degrees 40 minutes 28 seconds north latitude and 139 degrees 45 minutes 14 seconds east longitude). To the drone 2, a piece of position information of the flight destination has been input from the output unit 14 of the operation control station 1.

It is assumed that the drone 2 has captured an image of the ground, using the camera mounted on the drone 2 itself. The drone 2, when having captured an image of the ground, stores the captured image data in the memory.

Next, when having stored the image data in the memory, the drone 2, using the GPS function included in the drone 2 itself, measures a piece of position information of the present location.

Hereinafter, it is assumed that the drone 2 has measured, as a piece of position information of the present location, a piece of position information (35 degrees 40 minutes 31 seconds north latitude, 139 degrees 45 minutes 10 seconds east longitude). In FIG. 5, the present location indicated by the measured piece of position information is illustrated enclosed by an unfilled circle (unfilled circle to which characters "present location" are attached).

Next, the drone 2, when having measured the piece of position information of the present location, includes the measured piece of position information of the present location, the communication rate required to transmit image data, and the input piece of position information of the flight destination in a packet addressed to the operation control station 1.

The above-described "communication rate required to transmit image data" is, as described in the above-described "(3-2-4) Transmission Function of Position Information and Others", a value that is set in the drone 2 in advance by the administrator of the system of the present example embodiment. The following description will be made assuming that the "communication rate required to transmit image data" is 3 Mbps.

Next, the drone 2 wirelessly transmits the packet addressed to the operation control station 1.

The packet addressed to the operation control station 1, transmitted from the drone 2, is input to the input unit 11 of the operation control station 1 via the base station 3_1 and the core network 3_3 illustrated in FIG. 2.

(2) Operation of Operation Control Station 1

As illustrated in FIG. 6, when the packet addressed to the operation control station 1 is input, the input unit 11 of the operation control station 1 extracts, from the input packet, the piece of position information of the present location of the drone 2 and the communication rate (3 Mbps) required to transmit image data (S10). Further, the input unit 11 of the operation control station 1 also extracts the piece of position information of the flight destination of the drone 2 from the input packet.

Next, the input unit 11 of the operation control station 1 outputs the extracted pieces of position information and the like to the extraction unit 12 (S11). To the extraction unit 12, the piece of position information of the present location of the drone 2, the communication rate (3 Mbps) required for the drone 2 to transmit image data, and the piece of position information of the flight destination of the drone 2 are input.

Next, the extraction unit 12 of the operation control station 1 extracts all pieces of position information corresponding to communication rates equal to or higher than the communication rate (3 Mbps) input from the input unit 11 from the table stored in the database unit 10 (S12).

It is now assumed that the table stored in the database unit 10 is the table illustrated in FIG. 4. In the above-described processing in step S12, the extraction unit 12 of the operation control station 1 extracts the following two pieces of position information.

Position information of a position of 35 degrees 40 minutes 28 seconds north latitude and 139 degrees 45 minutes 11 seconds east longitude Position information of a position of 35 degrees 40 minutes 29 seconds north latitude and 139 degrees 45 minutes 11 seconds east longitude That is, the extraction unit 12 of the operation control station 1 extracts pieces of position information of positions A and B indicated by filled circles illustrated in the left diagram in FIG. 5.

The positions indicated by the extracted pieces of position information are positions at which communication can be performed at a communication rate of 3 Mbps, which is the communication rate required to transmit image data, or higher. In other words, the positions indicated by the extracted pieces of position information are positions at which image data can be transmitted.

Next, the extraction unit 12 of the operation control station 1 outputs, to the selection unit 13, the extracted pieces of position information (pieces of position information of the positions A and B), the input piece of position information of the present location of the drone 2, and the piece of position information of the flight destination of the drone 2 (S13).

To the selection unit 13, the two pieces of position information (hereinafter, referred to as pieces of "position information of stopover locations") extracted by the extraction unit 12, the piece of position information of the present location of the drone 2, and the piece of position information of the flight destination of the drone 2 are input.

Next, the selection unit 13 selects, out of the input pieces of position information of the stopover locations, a piece(s) of position information of a stopover location(s) located between the present location and flight destination of the drone 2 (S14).

Specifically, the selection unit 13 of the operation control station 1 selects, out of the input pieces of position information of the stopover locations, a piece(s) of position information of a location(s) the latitude and longitude of which are the latitude and longitude of a location located between the present location and flight destination of the drone 2.

While the input pieces of position information of the stopover locations are the pieces of position information of the positions A and B illustrated in the left diagram in FIG. 5, the latitude and longitude of the positions are the latitude and longitude of a location located between the present location and flight destination of the drone 2. For this reason, in the above-described processing in step S14, both pieces of position information of the positions A and B are selected.

The above-described processing in step S14 is processing aimed at not causing the drone 2 to be notified of a piece of position information of a stopover location located in the opposite direction to the direction toward the flight destination.

Next, the selection unit 13 outputs, to the output unit 14, the piece(s) of position information of the stopover location(s) selected in the processing in step S14 (that is, the pieces of position information of the positions A and B) and the input piece of position information of the flight destination of the drone 2 (S15).

On this occasion, the selection unit 13 outputs the piece(s) of position information of the stopover location(s) in descending order of proximity to the present location of the drone 2. For that purpose, the selection unit 13 may calculate a distance of each stopover location from the present location, using Hubeny's formula.

In this example, assuming that the selection unit 13 has output, as pieces of position information of stopover locations, the piece of position information of the position A and the piece of position information of the position B in this order to the output unit 14 and has subsequently output the piece of position information of the flight destination of the drone 2 to the output unit 14, the description will be continued.

Next, when the piece(s) of position information of the stopover location(s) and the piece of position information of the flight destination of the drone 2 are input, the output unit 14 transmits the input pieces of position information by including the pieces of position information in a packet addressed to the drone 2 in the order of input (S16).

Note that the output unit 14, when including the pieces of position information of the stopover locations in a packet addressed to the drone 2, assigns numbers 1 and 2 indicating order of input to the pieces of position information. The output unit 14 assigns the smaller number 1 to the piece of position information of the stopover location (the piece of position information of the position A) input earlier. This numbering is aimed at enabling the drone 2 to discriminate which one is a piece of position information of a stopover location closer to the drone 2.

(3) Transfer of Packet Addressed to Drone 2

The packet addressed to the drone 2, transmitted from the operation control station 1, is input to the drone 2 via the core network 3_3 and the base station 3_1 illustrated in FIG. 2.

(4) Operation of Drone 2

(4-1) Flight Operation

Although not illustrated, the drone 2, when receiving a packet addressed to the drone 2 itself, extracts pieces of position information included in the received packet and numbers assigned thereto.

Specifically, the drone 2 extracts a piece of position information of a stopover location (the position A) and the number 1 and further extracts another piece of position information of a stopover location (the position B) and the number 2. Further, the drone 2 also extracts the piece of position information of the flight destination included in the received packet.

Next, the drone 2 flies to the stopover location(s) in ascending order of the number(s) assigned to the piece(s) of position information of the stopover location(s).

Specifically, as illustrated in the right diagram in FIG. 5, the drone 2 flies to the stopover location (the position A) indicated by the piece of position information to which the number 1 is assigned and, next, flies to the stopover location (the position B) indicated by the piece of position information to which the value 2 is assigned.

(4-2) Image Data Transmission Operation

The above-described positions A and B are positions at which image data can be transmitted.

When the drone 2 has flown to the position A, the drone 2 includes image data stored in the memory in a packet addressed to the operation control station 1 and transmits the packet, using the wireless communication function.

The packet addressed to the operation control station 1, transmitted from the drone 2, is input to the input unit 11 of the operation control station 1 via the base station 3_1 and the core network 3_3 illustrated in FIG. 2. The input unit 11 of the operation control station 1 extracts image data from the notified packet addressed to the operation control station 1 and displays the extracted image data on the display.

That is, the drone 2 can transmit image data to the ground.

Next, the drone 2 flies to the position B and may also transmit the image data at the position B. Last, the drone 2 flies to the position indicated by the input piece of position information of the flight destination.

As described above, the drone 2 can deliver the image data to the ground at the positions A and B.

(5) About Altitude

In the above description, it was described that the drone 2, using the GPS function, measured a piece of position information of a present location. To be precise, the drone 2, using the GPS function, measured latitude, longitude, and altitude of a present location. A general GPS function is also capable of measuring altitude.

Therefore, the pieces of position information that are transmitted from the drone 2 to the operation control station 1 are pieces of position information including altitude. In addition, the pieces of position information that are input and output inside the operation control station 1 due to the above-described processing in steps S10 to S16 are also pieces of position information including altitude. Further, the pieces of position information that are transmitted from the operation control station 1 to the drone 2 are also pieces of position information including altitude.

The drone 2 flies at an altitude indicated by a received piece of position information.

Note that the drone 2 may include an altimeter in addition to the GPS function and, using the altimeter, measure altitude.

(6) Other Configuration and Operation (6-1) About Processing in Step S14

Although, in the above description, it was described that the selection unit 13 executes the processing in step S14, the selection unit 13 does not have to execute the processing in step S14. In that case, in the processing in step S15, the selection unit 13 outputs the piece(s) of position information of the stopover location(s) and the piece of position information of the flight destination of the drone 2, which were input from the extraction unit 12, to the output unit 14.

In addition, the selection unit 13 may, in place of executing the processing in step S14, select a piece of position information of a stopover location located within a radius of X m from the present location of the drone 2 and/or a piece of position information of a stopover location located within a radius of X m from the flight destination. The radius X is set in the selection unit 13 by the administrator of the system of the present example embodiment. The drone 2 can fly to the flight destination via a stopover location in a vicinity of the present location and/or a stopover location in a vicinity of the flight destination.

In addition, the selection unit 13 may, in place of executing the processing in step S14, select a piece(s) of position information of a stopover location(s) located within a radius of Y m from the middle point between the present location and the flight destination. The radius Y is a distance between the present location and flight destination of the drone 2 and is set in the selection unit 13 by the administrator of the system of the present example embodiment. The drone 2 can fly to the flight destination via a stopover location(s) located within the radius of Y m from the middle point.

(6-2) About Table in FIG. 4

Although a case where, in the table in FIG. 4, the altitude of all pieces of position information is 100 m is described, the altitude is not limited to 100 m. The administrator of the system of the present example embodiment can set a piece of position information with an arbitrary altitude to the table illustrated in FIG. 4. In addition, types of information included in the table in FIG. 4 are not limited to position information and a communication rate. In the table in FIG. 4, for example, an antenna angle and an antenna gain value may be included in association with the position information and the communication rate.

(6-3) About Number of Base Stations

Although a case where the system of the present example embodiment includes two base stations was described, the system of the present example embodiment is not limited to this case. The system of the present example embodiment may include one base station or three or more base stations.

(6-4) About Interconnection Among Respective Devices

Although the above description was made assuming that the operation control station 1 is connected to the core network 3_3 via a wired line, the operation control station 1 may be connected to the core network 3_3 via a wireless line. Further, the operation control station 1 may be connected to the core network 3_3 via both a wireless line and a wired line.

In addition, although the above description was made assuming that the core network 3_3 is connected to the base stations 3_1 and 3_2 via wired lines, the core network 3_3 may be connected to the base stations 3_1 and 3_2 via wireless lines. Further, the core network 3_3 may be connected to the base stations 3_1 and 3_2 via both wireless lines and wired lines.

(6-5) Function of Specifying Altitude

Raising the altitude at which the drone 2 flies sometimes causes the main lobe from a base station on the top of a distant mountain to become more intense than side lobes from a base station in a vicinity of the drone 2 and thereby enables the drone 2 to perform, although with a low speed, wireless communication. In that case, although it is difficult to transmit and receive high definition image data, the drone 2 and the operation control station 1 can transmit and receive data with each other if the data are only coarse image data or text data.

Therefore, the operation control station 1 may have a function of specifying an altitude at which the drone 2 flies. In that case, a piece of information indicating an altitude is set in the output unit 14 of the operation control station 1 in advance by the administrator of the system of the present example embodiment. The administrator of the system of the present example embodiment measures beforehand an altitude at which coarse image data and text data can be transmitted and received using the main lobe from a base station on the top of a distant mountain and sets a piece of information indicating the measured altitude in the output unit 14 of the operation control station 1.

The output unit 14 of the operation control station 1, at a predetermined opportunity, transmits the piece of information indicating the altitude by including the piece of information indicating the altitude in a packet addressed to the drone 2. The drone 2 extracts a piece of information indicating an altitude from a received packet, raises the flight altitude thereof to the altitude indicated by the extracted piece of information, and transmits coarse image data or text data.

The above-described predetermined opportunity may be an occasion when a packet (hereinafter, referred to as an "opportunity packet") informing that radio waves from a base station on the top of a distant mountain have been received is input from the drone 2. In that case, the drone 2 has a function of, when receiving radio waves from a base station on the top of a distant mountain, notifying the operation control station 1 of an opportunity packet. The input unit 11, extraction unit 12, and selection unit 13 of the operation control station 1 notify the output unit 14 of the notified opportunity packet. When an opportunity packet is input in the case where no piece of position information of a stopover location has been input from the selection unit 13, the output unit 14 of the operation control station 1 transmits a piece of information indicating an altitude by including the piece of information indicating the altitude in a packet addressed to the drone 2.

(6-6) About Packet

Although, in the above description, the operation control station 1 and the drone 2 communicated with each other using packets, the operation control station 1 and the drone 2 may communicate with each other using, in place of packets, messages or electrical signals.

(6-7) About Mobile Terminal Mounted on Drone 2

In "(3-1-1) Functions of Database Unit 10" described above, it was described that wireless communication speed is measured by the drone 2 on which a mobile terminal is mounted.

The above-described mobile terminal may be a terminal configured to measure a value indicating wireless communication quality (for example, reception power intensity, RSRP, and RSRQ). In that case, the administrator of the system of the present example embodiment calculates a wireless communication speed from a measured wireless communication quality value. RSRP and RSRQ are abbreviations of reference signal received power and reference signal received quality, respectively.

In addition, the above-described mobile terminal may be a communication chip module.

(6-8) About Keyboard Included in Output Unit 14

The output unit 14 may include, in place of the keyboard, a general external input device. In that case, when the piece of position information of the flight destination of the drone 2 is input through the external input device, the output unit 14 transmits the input piece of position information of the flight destination by including the piece of position information of the flight destination in a packet addressed to the drone 2. Other external input devices may include, for example, a touch panel.

(6-9) About Operation of Drone 2

(6-9-1) About Data Stored in Drone 2

In the above description, the drone 2 captured an image of the ground, using the camera. The drone 2 may capture an image of, instead of the ground, an object in the air (for example, a power transmission line in the air) or a wall surface or back surface of a construction present at a position higher than the drone 2 itself. The drone 2 stores the captured image data.

In addition, the drone 2 may include a camera having a video capturing function and capture a video, using the camera. In that case, the drone 2 also stores the captured video data.

(6-9-2) About Timing of Performing Image Capturing

In the above description, the drone 2, after having captured an image, transmitted a piece of position information of the present location and the like to the operation control station 1 and received a piece(s) of position information of a stopover location(s) from the operation control station 1. The drone 2 may, after receiving the piece(s) of position information of the stopover location(s), capture an image. In that case, the drone 2 may transmit the piece of position information of the present location to the operation control station 1 at the time of starting a flight.

(6-9-3) About Transmission Destination of Data

In the above description, the drone 2 transmitted image data to the operation control station 1. The drone 2 may transmit the image data to a device (hereinafter, referred to as a "transmission destination device") different from the operation control station 1. In that case, the drone 2 transmits the image data by including the image data in a packet addressed to the transmission destination device.

(7) About Achievement Method of Respective Functional Units

The database unit 10 can be achieved using a general memory, such as a RAM. The input unit 11 can be achieved using a general input/output port and a general router. The extraction unit 12 and the selection unit 13 can be achieved using an arithmetic processing device, such as a central processing unit (CPU), and a general memory, such as a RAM. The RAM is an abbreviation of random access memory. The output unit 14 can be achieved using an arithmetic processing device, such as a CPU, a general memory, such as a RAM, a general input/output port, and a general router.

[Description of Advantageous Effect]

The present example embodiment enables the drone 2 to deliver image data to the ground.

That is because the operation control station 1 included in the system of the present example embodiment, when receiving a communication rate required to transmit image data, calculates a piece(s) of position information of a position(s) at which image data can be transmitted at the communication rate and notifies the drone 2 of the calculated piece(s) of position information(s). Therefore, the drone 2 can perceive a position at which image data can be transmitted, fly to the position, and transmit image data. As a consequence, the drone 2 can deliver image data to the ground.

Second Example Embodiment

Next, a second example embodiment of the present invention will be described.

An operation control station of a system of the second example embodiment obtains, out of pieces of position information of stopover locations at which image data can be transmitted that are extracted from the table in FIG. 4, a piece of position information of a stopover location on a shortest path along which a drone flies to a destination in the shortest distance and notifies the drone of the obtained piece of position information of the stopover location. The drone can not only transmit image data but also reach a destination sufficiently fast.

Figure 7:
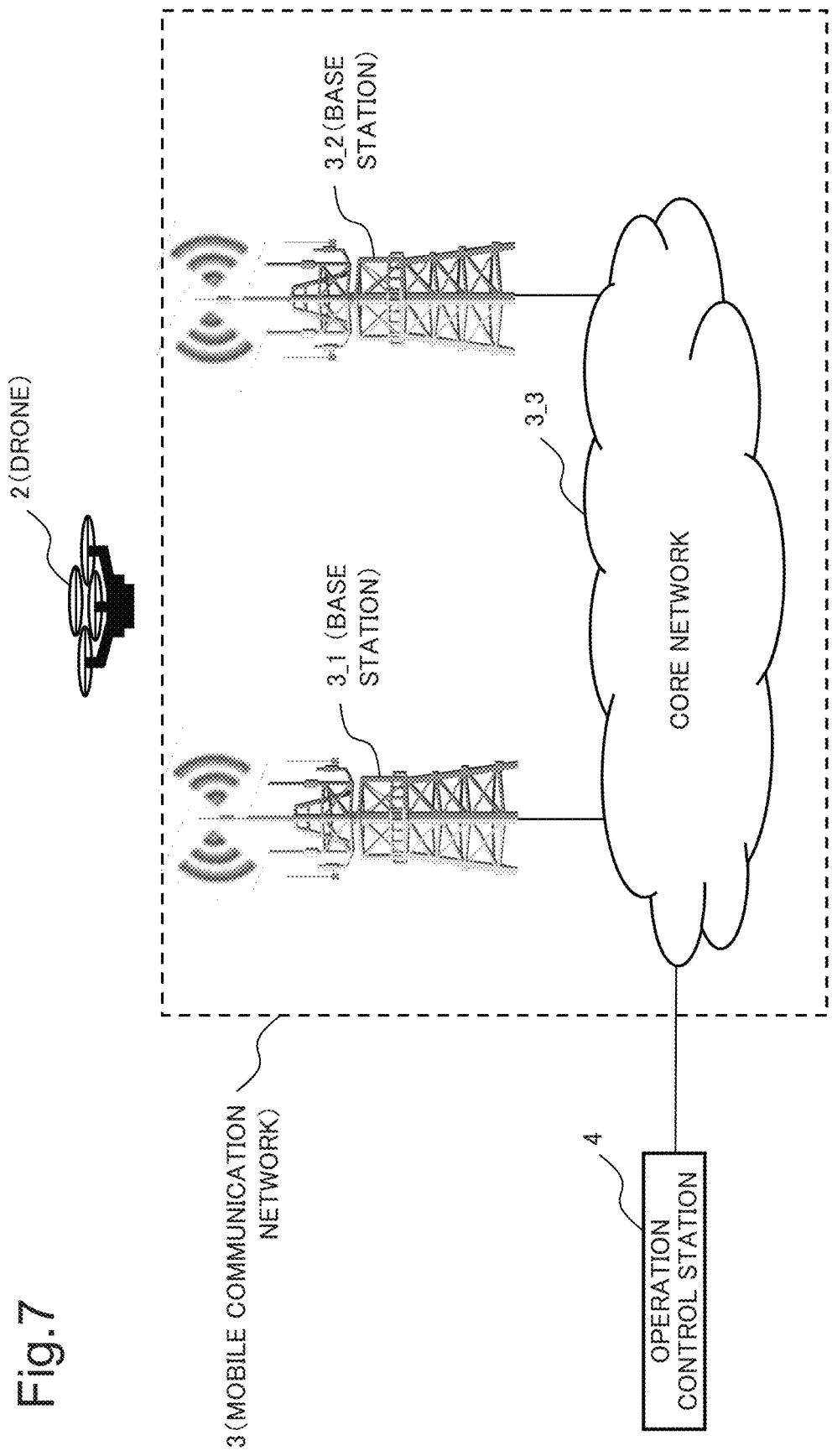
FIG. 7 is a diagram illustrating a configuration example of a system in a second example embodiment of the present invention.
Figure 8:
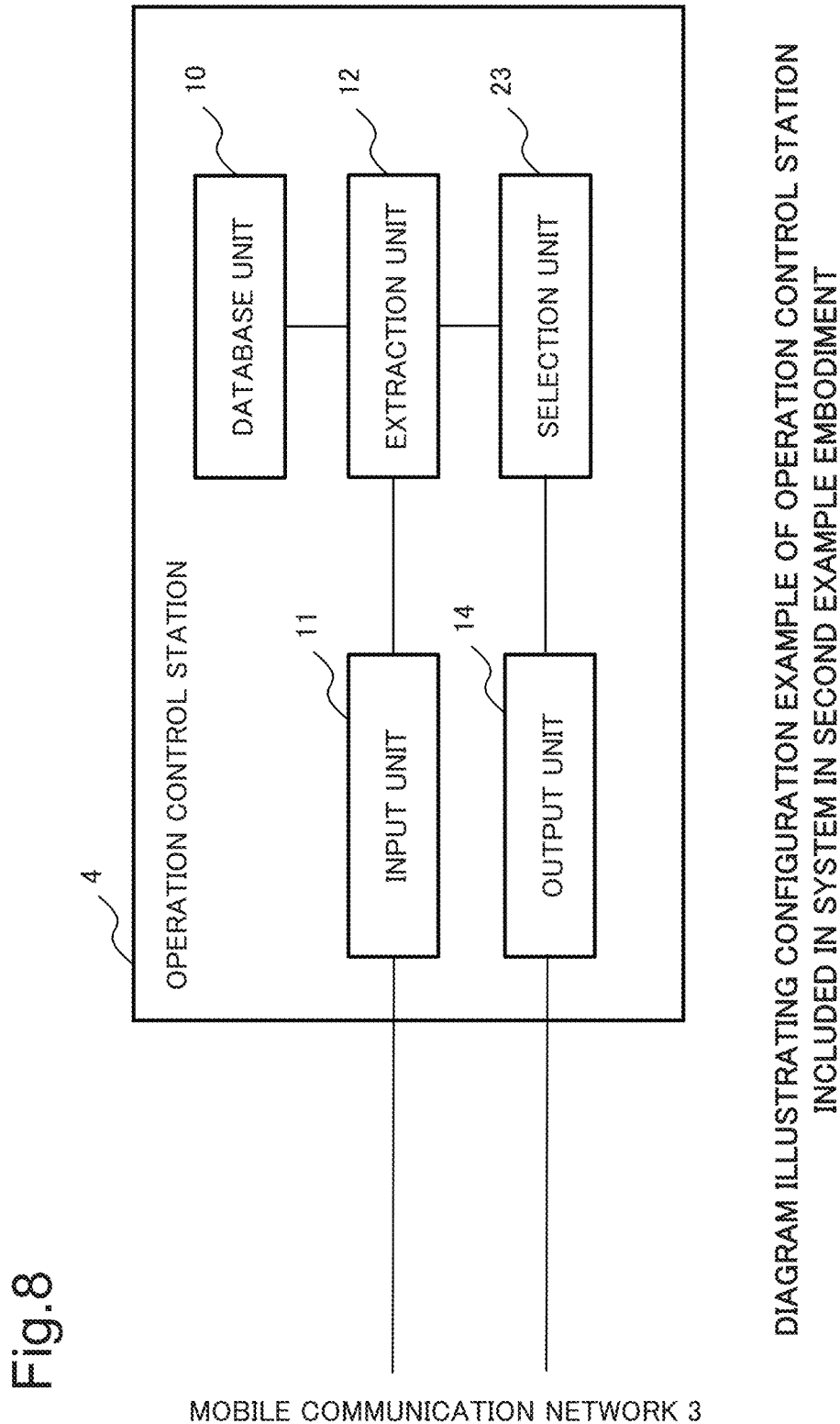
FIG. 8 is a diagram illustrating a configuration example of an operation control station included in the system in the second example embodiment of the present invention.

Hereinafter, a configuration and operation of the system of the second example embodiment will be described. FIG. 7 is a diagram illustrating a configuration example of the system in the second example embodiment of the present invention. FIG. 8 is a diagram illustrating a configuration example of the operation control station included in the system in the second example embodiment of the present invention.

[Description of Configuration]

(1) Configuration of System of Second Example Embodiment

The system of the second example embodiment includes, as illustrated in FIG. 7, an operation control station 4 in place of the operation control station 1. The operation control station 4 includes, as illustrated in FIG. 8, a selection unit 23 in place of the selection unit 13.

(2) About Functions of Selection Unit 23

The selection unit 23 has the functions of the selection unit 13 and selects pieces of position information of stopover locations. The selected pieces of position information of the stopover locations are pieces of position information of stopover locations that are extracted from the table in FIG. 4 and at which image data can be transmitted.

Further, the selection unit 23 calculates, out of the selected pieces of position information of the stopover locations, a piece of position information of a stopover location on a shortest path along which a drone 2 flies to a destination in the shortest distance. A specific calculation procedure will be described in detail in [Description of Operation], to be described later. The selection unit 23 outputs the extracted piece of position information of the stopover location to an output unit 14.

Since a configuration and functions of components other than the above-described components are the same as those in the system in the first example embodiment, the same reference signs are assigned to those components and descriptions thereof will be omitted.

[Description of Operation]

Figure 9:
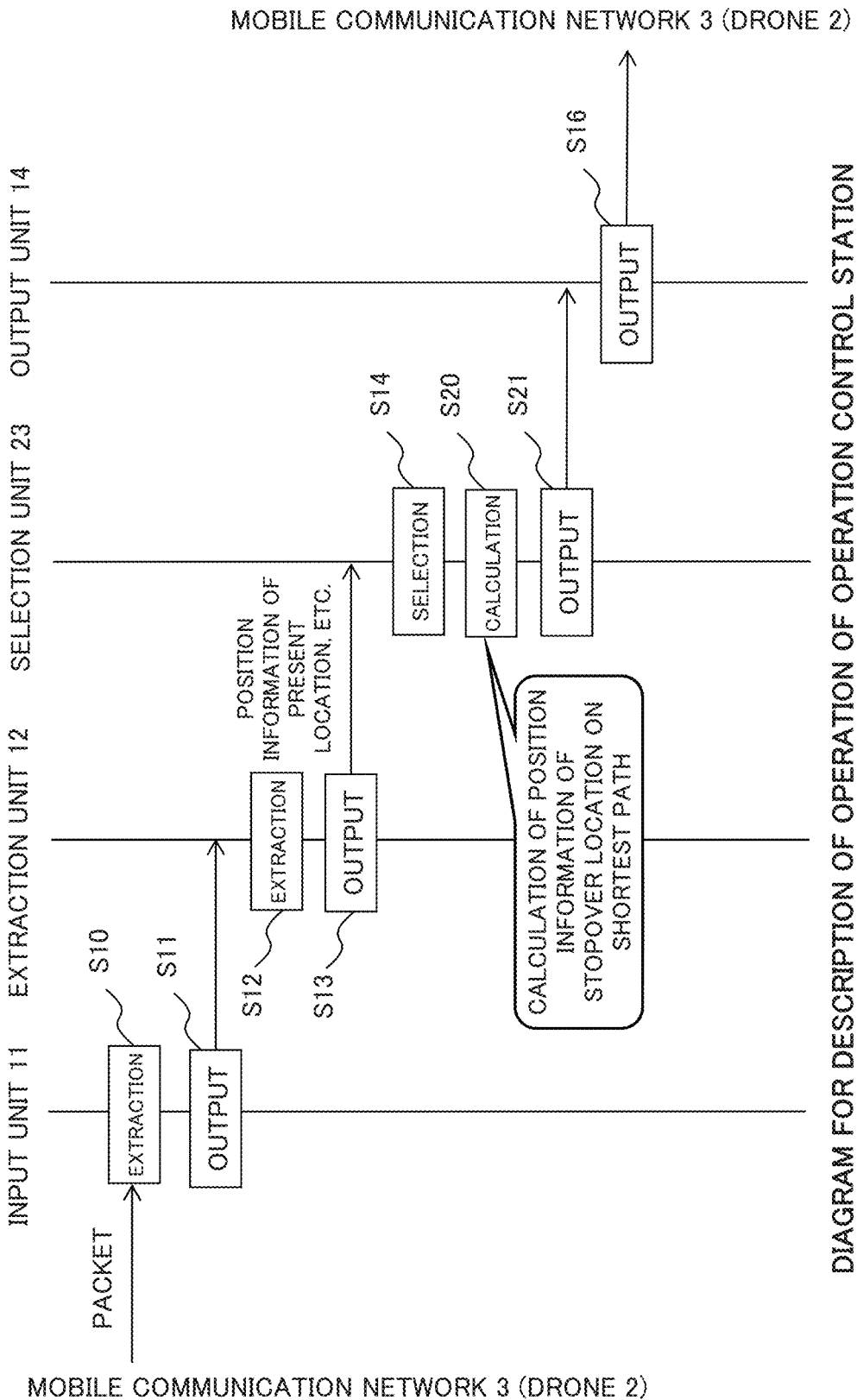
FIG. 9 is a diagram for a description of operation of the operation control station included in the system in the second example embodiment of the present invention.
Figure 10:
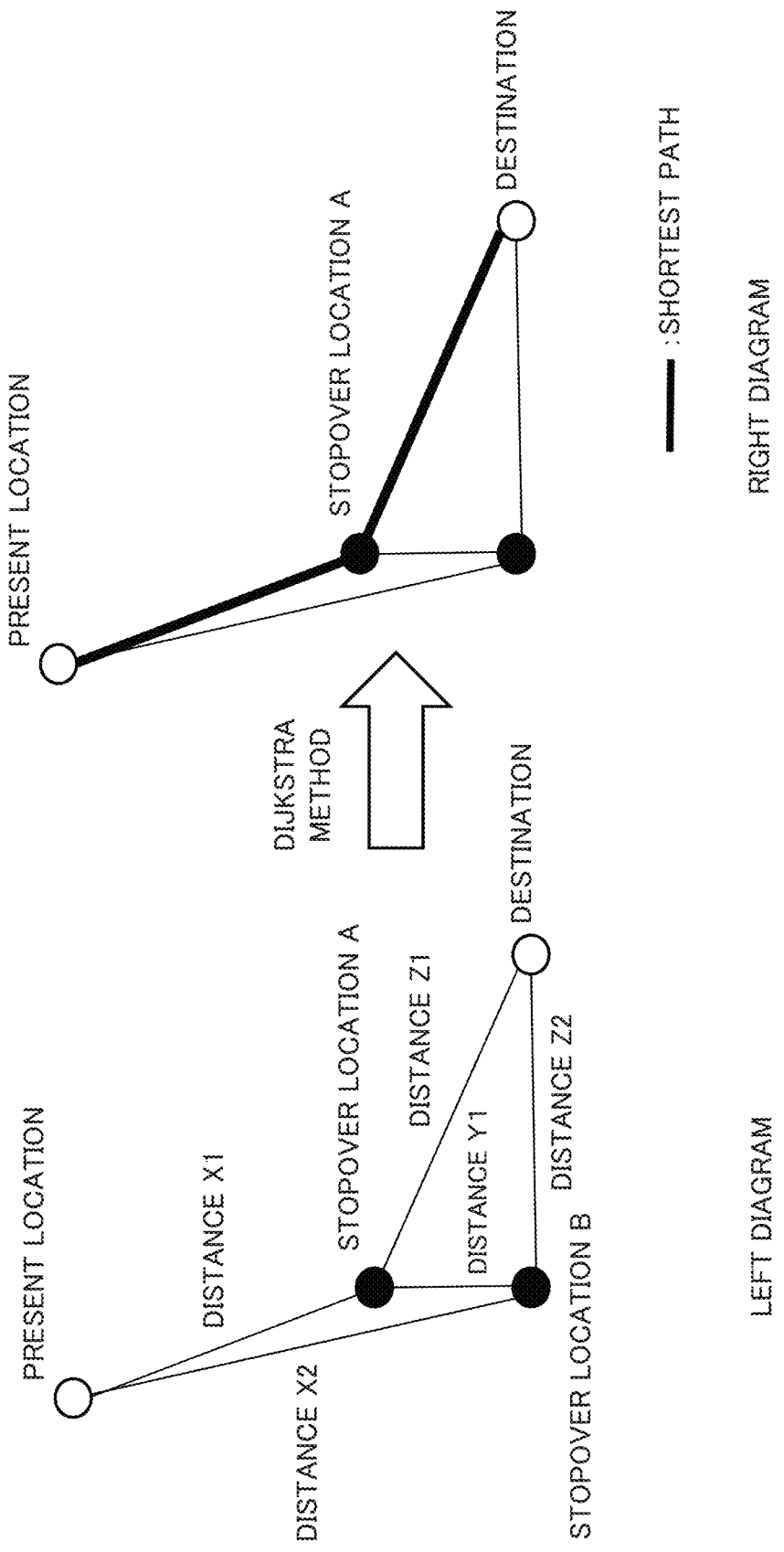
FIG. 10 is a diagram for a description of a result of an operation of the operation control station included in the system in the second example embodiment of the present invention.

Operation of the system of the present example embodiment will be described below. FIG. 9 is a diagram for a description of operation of the operation control station included in the system in the present example embodiment. FIG. 10 is a diagram for a description of a result of an operation of the operation control station included in the system in the present example embodiment. Using FIGS. 9 and 10, the operation of the system of the present example embodiment will be described below.

(1) Operation of Calculating Position Information of Stopover Location on Shortest Path First, as illustrated in FIG. 9, the selection unit 23, as with the selection unit 13, performs processing in step S14 when pieces of position information of a present location, stopover locations, and a destination are input and selects pieces of position information of stopover locations (S14).

The selected pieces of position information of stopover locations are pieces of position information of positions at which image data can be transmitted. Hereinafter, for the purpose of description, it is assumed that the selection unit 23 has selected, as pieces of position information of stopover locations, pieces of position information of stopover locations A and B illustrated in FIG. 10.

After the above-described processing in step S14, the selection unit 23 calculates, out of the selected pieces of position information of the stopover locations, a piece of position information of a stopover location on a shortest path along which the drone 2 flies to the destination in the shortest distance (S20).

Specifically, the selection unit 23, by performing the following processing (i) to (iv), calculates a piece of position information of a stopover location on a route having the shortest distance among routes each of which connects the present location of the drone 2 to the flight destination of the drone 2 via one of the stopover locations indicated by the selected pieces of position information. The selection unit 23 uses a general Dijkstra method to calculate the piece of position information of the stopover location on the route having the shortest distance.

(i) First, the selection unit 23 calculates, with respect to each of the selected pieces of position information of the stopover locations, a distance between the stopover location indicated by the piece of position information and the present location of the drone 2. For example, the selection unit 23 calculates a distance X1 between the stopover location A and the present location of the drone 2 and a distance X2 between the stopover location B and the present location of the drone 2, illustrated in the left diagram in FIG. 10, using Hubeny's formula.

(ii) Next, the selection unit 23 calculates a distance(s) between two stopover locations among the stopover locations indicated by the selected pieces of position information. For example, the selection unit 23 calculates a distance Y1 between the stopover locations A and B illustrated in the left diagram in FIG. 10, using Hubeny's formula.

(iii) Next, the selection unit 23 calculates, with respect to each of the selected pieces of position information of the stopover locations, a distance between the stopover location indicated by the piece of position information and the flight destination of the drone 2. For example, the selection unit 23 calculates a distance Z1 between the stopover location A and the flight destination of the drone 2 and a distance Z2 between the stopover location B and the flight destination of the drone 2, illustrated in the left diagram in FIG. 10, using Hubeny's formula.

(iv) Next, the selection unit 23, using a general Dijkstra method with the distances calculated in the above-described processing (i) to (iii) used as weights, calculates a piece of position information of a stopover location on a path having the shortest distance among the paths each of which passes the present location, any of the stopover locations, and the destination.

(2) Details of Processing (iv)

The above-described processing (iv) will be described in more detail.

First, the Dijkstra method is an algorithm for calculating a node (a number indicating the node) on a path having the shortest distance (weight) among the paths each of which connects the start node to the terminal node via an intermediate node(s).

When the number N of nodes, weights between the start node and intermediate nodes, weights between intermediate nodes, and weights between intermediate nodes and the terminal node are input, general Dijkstra method software outputs node numbers indicating nodes on a path having the least weight among the paths from the start node to the terminal node.

Note that weights between two nodes, which are input to the general Dijkstra method software, are input as values in a two-dimensional array W[i][j]. The indices i and j are node numbers indicating two nodes. For example, a weight between the start node and an intermediate node is input as a value of an element W[the node number indicating the start node] [the node number indicating the intermediate node] in the two-dimensional array. The node numbers indicating the start node and the terminal node are 0 and N, respectively. The node numbers indicating the intermediate nodes have values 1 to N−1.

Using the above-described general Dijkstra method software, the above-described processing (iv) is achieved in accordance with the following steps (a) to (e).

(a) First, the selection unit 23 counts the number of input pieces of position information of the present location, the stopover locations, and the destination. The present location, the stopover locations, and the destination are points, that is, nodes, on flight routes of the drone. Since it is required to input the number of nodes to the general Dijkstra method software, the selection unit 23 counts the number of input pieces of position information. Hereinafter, assuming that the counted number is N, the description will be continued.

(b) Next, the selection unit 23 assigns a node number to each of the input pieces of position information. Specifically, the selection unit 23 assigns the node number 0 and the node number N to the piece of position information of the present location and piece of position information of the flight destination of the drone 2, respectively. In addition, the selection unit 23 assigns node numbers 1 to N−1 to the pieces of position information of the stopover locations in order. The selection unit 23 stores the pieces of position information and the node numbers assigned thereto in association with each other in a memory.

(c) Next, the selection unit 23 inputs the number N, counted in the processing in step (a), as the number of nodes and the distances, calculated in the processing (i) to (iii), as weights between nodes into the general Dijkstra method software. The selection unit 23 includes the general Dijkstra method software and an operating system (OS) that starts up the software. The selection unit 23, when inputting the weights between nodes into the general Dijkstra method software, inputs the weights between nodes as values in a two-dimensional array. Indices of the two-dimensional array are the node numbers assigned in the processing in step (b).

(d) After the processing in step (c), node numbers indicating nodes are output from the general Dijkstra method software. The output node numbers are numbers indicating nodes on the shortest path from the start node to the terminal node. That is, the output node numbers are numbers indicating nodes on the shortest path from the present location to the flight destination.

(e) Next, the selection unit 23 extracts, with respect to each of the output node number(s) (the numbers except 0 and N), a piece of position information corresponding to the node number from the memory. The extracted piece(s) of position information is/are a piece(s) of position information of a stopover location(s) that connect(s) the present location of the drone 2 to the flight destination of the drone 2 with the shortest path.

Through the above-described processing in steps (a) to (e), the selection unit 23 can calculate a piece of position information of a stopover location on the shortest path connecting the present location to the flight destination of the drone 2. That is, the selection unit 23 can calculate a piece of position information of a stopover location when the drone 2 flies to a destination in the shortest distance.

(3) Operation of Notifying Drone 2 of Position Information of Stopover Location on Shortest Path The selection unit 23, through the above-described processing in step S20, calculates, out of the selected pieces of position information of the stopover locations, a piece of position information of a stopover location on a shortest path along which the drone 2 flies to the destination in the shortest distance.

Hereinafter, assuming that, as a piece of position information of a stopover location on the shortest path, the selection unit 23 has calculated the piece of position information of the stopover location A illustrated in the right diagram in FIG. 10, the description will be continued.

Next, as illustrated in FIG. 9, the selection unit 23 outputs, to the output unit 14, the piece of position information of the stopover location A, calculated in the processing in step S20, in conjunction with the piece of position information of the flight destination of the drone 2 (the piece of position information input in the processing in step S14) (S21).

Next, the output unit 14, by executing the above-described processing in step S16, transmits the piece of position information of the stopover location A and the piece of position information of the flight destination to the drone 2. The drone 2 is notified of the piece of position information of the stopover location A and the piece of position information of the flight destination.

The drone 2 can fly to the stopover location A and, after transmitting image data, fly to the flight destination indicated by the piece of position information. The drone 2 can not only transmit image data but also fly to the destination in the shortest path.

Since operation other than the above-described operation is the same as that in the system in the first example embodiment, a description thereof will be omitted.

Note that, although, in the above description, the selection unit 23 used a Dijkstra method, any method can be used as long as the method is an algorithm for solving a shortest path problem. For example, the selection unit 23 may use, in place of a Dijkstra method, a Bellman-Ford method.

[Description of Advantageous Effect]

In the system of the present example embodiment, the drone 2 can not only transmit image data but also fly to a destination sufficiently fast.

That is because the operation control station included in the system of the present example embodiment calculates, out of pieces of position information of stopover locations at which image data can be transmitted, a piece of position information of a stopover location on a shortest path along which the drone 2 flies to a destination in the shortest distance, using a Dijkstra method and notifies the drone of the calculated piece of position information of the stopover location. As a consequence, the drone can not only transmit image data but also fly to a destination sufficiently fast in a shortest path.

Third Example Embodiment

Next, a third example embodiment of the present invention will be described.

Figure 11:
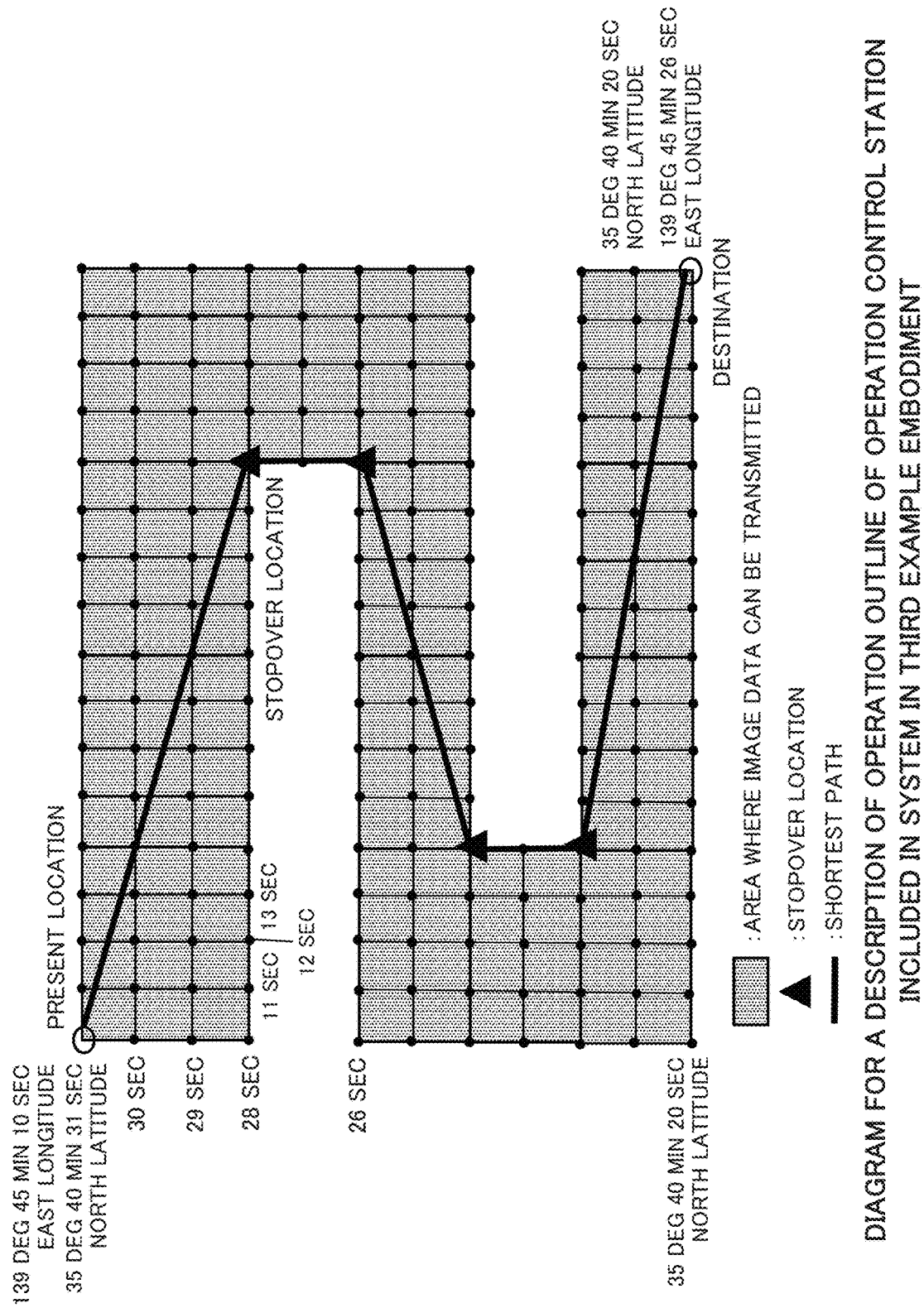
FIG. 11 is a diagram for a description of operation outline of an operation control station included in a system in a third example embodiment of the present invention.

An operation control station of a system of the third example embodiment, as illustrated in FIG. 11, calculates a piece(s) of position information of a stopover location(s) passed by a path reaching a destination in the shortest distance within an area in which image data can be transmitted (an area filled in gray in FIG. 11) and notifies a drone of the calculated piece(s) of position information of the stopover location(s). The drone can not only transmit image data continuously but also fly to a destination in a shortest path. FIG. 11 is a diagram for a description of operation outline of the operation control station of the system of the third example embodiment.

Hereinafter, a configuration and operation of the system of the third example embodiment will be described.

[Description of Configuration]

(1) Configuration of System of Third Example Embodiment

Figure 12:
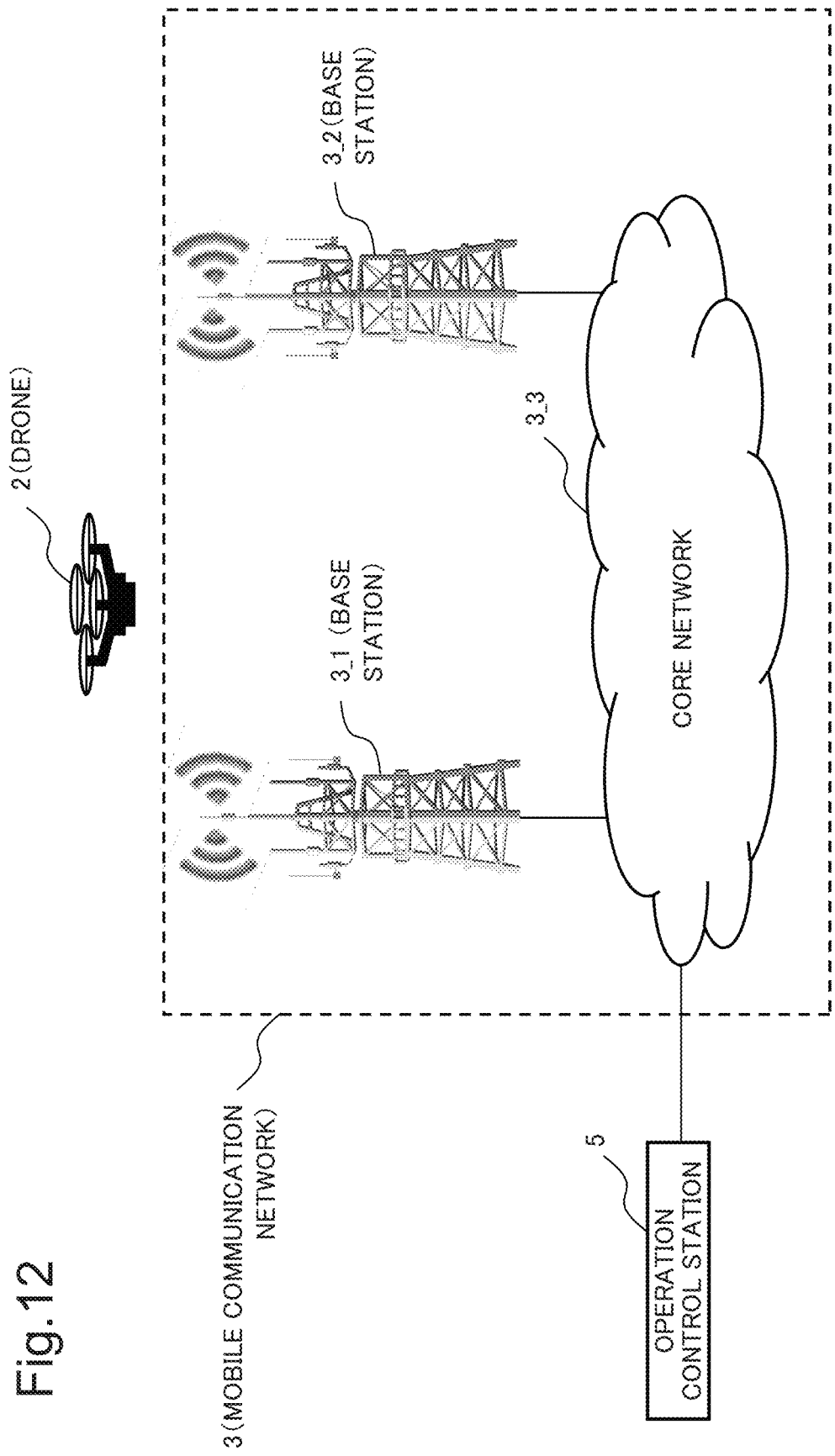
FIG. 12 is a diagram illustrating a configuration example of the system in the third example embodiment of the present invention.

FIG. 12 is a diagram illustrating a configuration example of the system in the third example embodiment of the present invention. FIG. 13 is a diagram illustrating a configuration example of the operation control station included in the system in the third example embodiment of the present invention.

The system of the third example embodiment is a variation of the system of the second example embodiment and includes, as illustrated in FIG. 12, an operation control station 5 in place of the operation control station 4. The operation control station 5 includes, as illustrated in FIG. 13, a database unit 50, an extraction unit 52, and a selection unit 53 in place of the database unit 10, the extraction unit 12, and the selection unit 23, respectively. The selection unit 53 is connected to the database unit 50 via a wired line.

Since components other than the above-described components are the same as those in the system in the second example embodiment, the same reference signs are assigned to those components and descriptions thereof will be omitted.

(2) About Functions of Database Unit 50 and Selection Unit 53

FIG. 14 is a diagram illustrating an example of a table set in the operation control station included in the system in the third example embodiment of the present invention.

In the database unit 50, the table illustrated in FIG. 14 is set by an administrator of the system of the present example embodiment. The table illustrated in FIG. 14 is a table in which, with each piece of position information, a piece of information (hereinafter, referred to as a piece of "information indicating a corner") indicating whether or not the piece of position information is a piece of position information of a position that corresponds to a corner of the area in which image data can be transmitted is associated.

A creation method of the above-described piece of "information indicating a corner" and the table illustrated in FIG. 14 will be described in detail in "(3) About Creation Method of Table Illustrated in FIG. 14", to be described later. Functions of the database unit 50 and the selection unit 53 will now be described.

The database unit 50 stores a table that is set as illustrated in FIG. 14.

Next, the extraction unit 52 has the functions of the extraction unit 12. Note, however, that, when the extraction unit 52 extracts a piece of position information from a table, the extraction unit 52 extracts the piece of position information from the table stored in the database unit 50.

The selection unit 53 has the functions of the selection unit 23 and selects a piece(s) of position information of a stopover location(s). In addition, the selection unit 53 calculates, out of the selected piece(s) of position information of the stopover location(s), a piece(s) of position information of a stopover location(s) passed by a path reaching a destination in the shortest distance within an area in which image data can be transmitted. A specific calculation procedure will be described in detail in [Description of Operation], to be described later.

Functions other than the above-described functions are the same as those in the system in the second example embodiment.

(3) About Creation Method of Table Illustrated in FIG. 14

Figure 16:
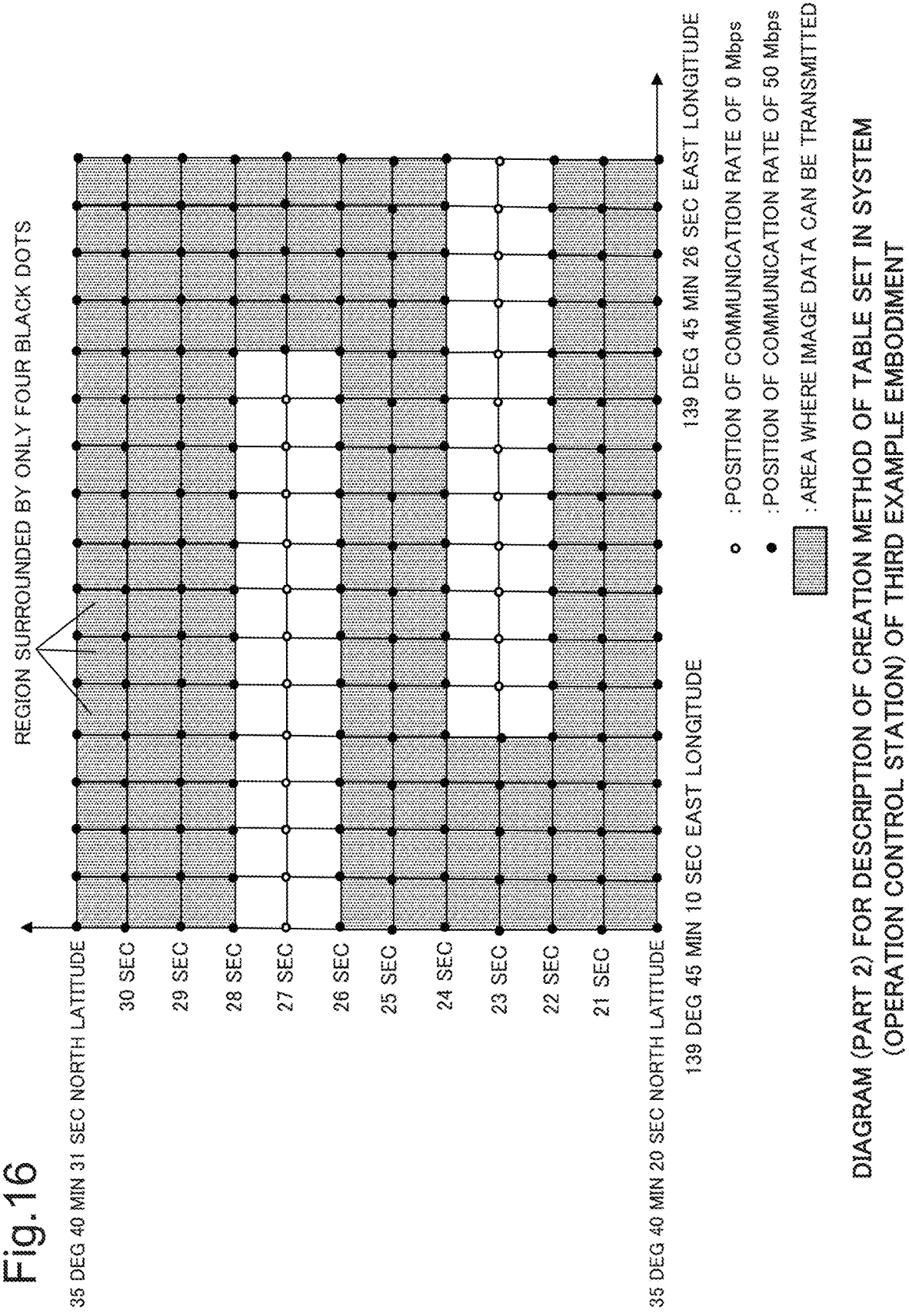
FIG. 16 is a diagram (part 2) for the description of the creation method of the table to be set in the system (operation control station) in the third example embodiment of the present invention.
Figure 17:
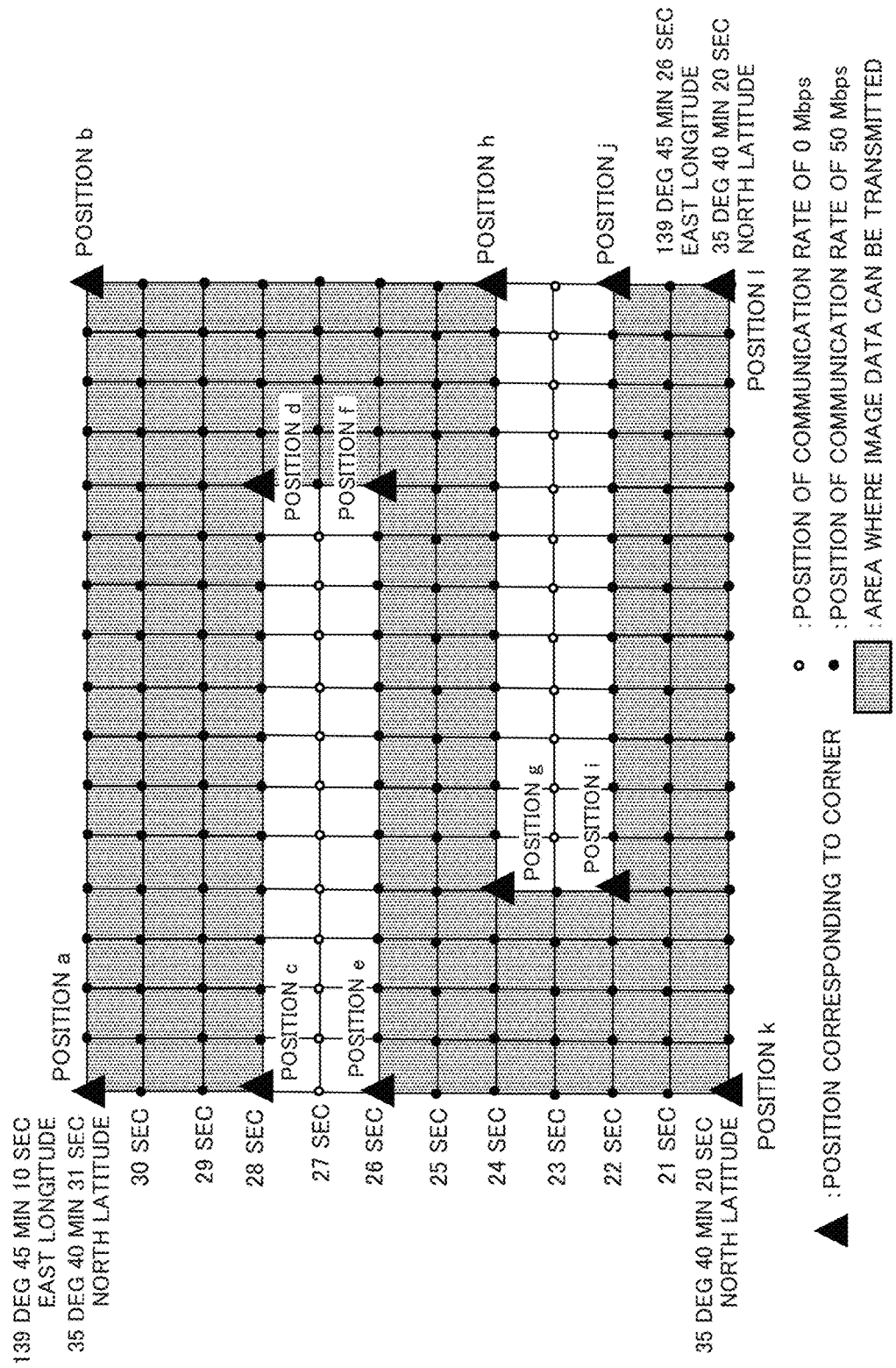
FIG. 17 is a diagram (part 3) for the description of the creation method of the table to be set in the system (operation control station) in the third example embodiment of the present invention.

The administrator of the system of the present example embodiment creates the table illustrated in FIG. 14 in accordance with the following method and sets the created table in the database unit 50. FIGS. 15 to 17 are diagrams for a description of a creation method of a table to be set in the operation control station included in the system in the third example embodiment of the present invention.

Hereinafter, a creation method of the table illustrated in FIG. 14 will be described.

(3-1) Creation of Table Serving as Base

First, the administrator of the system of the present example embodiment, as with the systems in the first and second example embodiments, creates a table to be set in the database unit 10. The administrator of the system of the present example embodiment creates the table illustrated in FIG. 14, using the table set in the database unit 10 as a base.

Hereinafter, it is assumed that the created table set in the database unit 10 (table serving as a base) is a table illustrated in FIG. 15.

(3-2) Recognition of Area where Image Data can be Transmitted

Next, the administrator of the system of the present example embodiment plots communication rates indicated in the table in FIG. 15 at respective corresponding positions on a graph with the ordinate and the abscissa representing latitude and longitude, respectively, illustrated in FIG. 16. In the graph in FIG. 16, black dots and white dots are plotted at positions corresponding to a communication rate of 50 Mbps and a communication rate of 0 Mbps indicated in the table in FIG. 15, respectively. A black dot indicates a position corresponding to a communication rate of 3 Mbps or higher, that is, a position at which image data can be transmitted.

The administrator of the system of the present example embodiment recognizes, in the plotted graph in FIG. 16, a region surrounded by only four positions at which image data can be transmitted (that is, black dots) as a region in which image data can be transmitted.

Further, when regions in which image data can be transmitted continue to a destination, the administrator of the system of the present example embodiment recognizes the continuous regions as an area in which image data can be transmitted. In FIG. 16, the area in which image data can be transmitted is filled in gray. The area in which image data can be transmitted is a polygon.

(3-3) Identification of Position Corresponding to Corner of Area

Next, when the administrator of the system of the present example embodiment has recognized an area in which image data can be transmitted, the administrator identifies positions corresponding to corners of the area (specifically, positions a to 1 of filled triangles illustrated in FIG. 17).

More in detail, when the administrator of the system of the present example embodiment has recognized an area, that is, a polygon, in which image data can be transmitted, the administrator identifies positions (positions a to 1 illustrated in FIG. 17) corresponding to corners of the recognized polygon. The identified positions are positions corresponding to the corners of the area in which image data can be transmitted.

Hereinafter, assuming that the administrator of the system of the present example embodiment has identified the positions a to 1 of the filled triangles illustrated in FIG. 17 as positions corresponding to the corners of the area in which image data can be transmitted, the description will be continued.

(3-4) Creation of Table Set in Database Unit 10

Next, the administrator of the system of the present example embodiment associates, in the table illustrated in FIG. 15, values of 1 and values of 0 with the pieces of position information of the identified corner positions and pieces of position information other than those, respectively, as pieces of information indicating corners.

As a consequence, the administrator of the system of the present example embodiment creates the table illustrated in FIG. 14. The administrator of the system of the present example embodiment writes the created table in the database unit 50.

[Description of Operation]

Next, operation of the system of the present example embodiment will be described.

Figure 18:
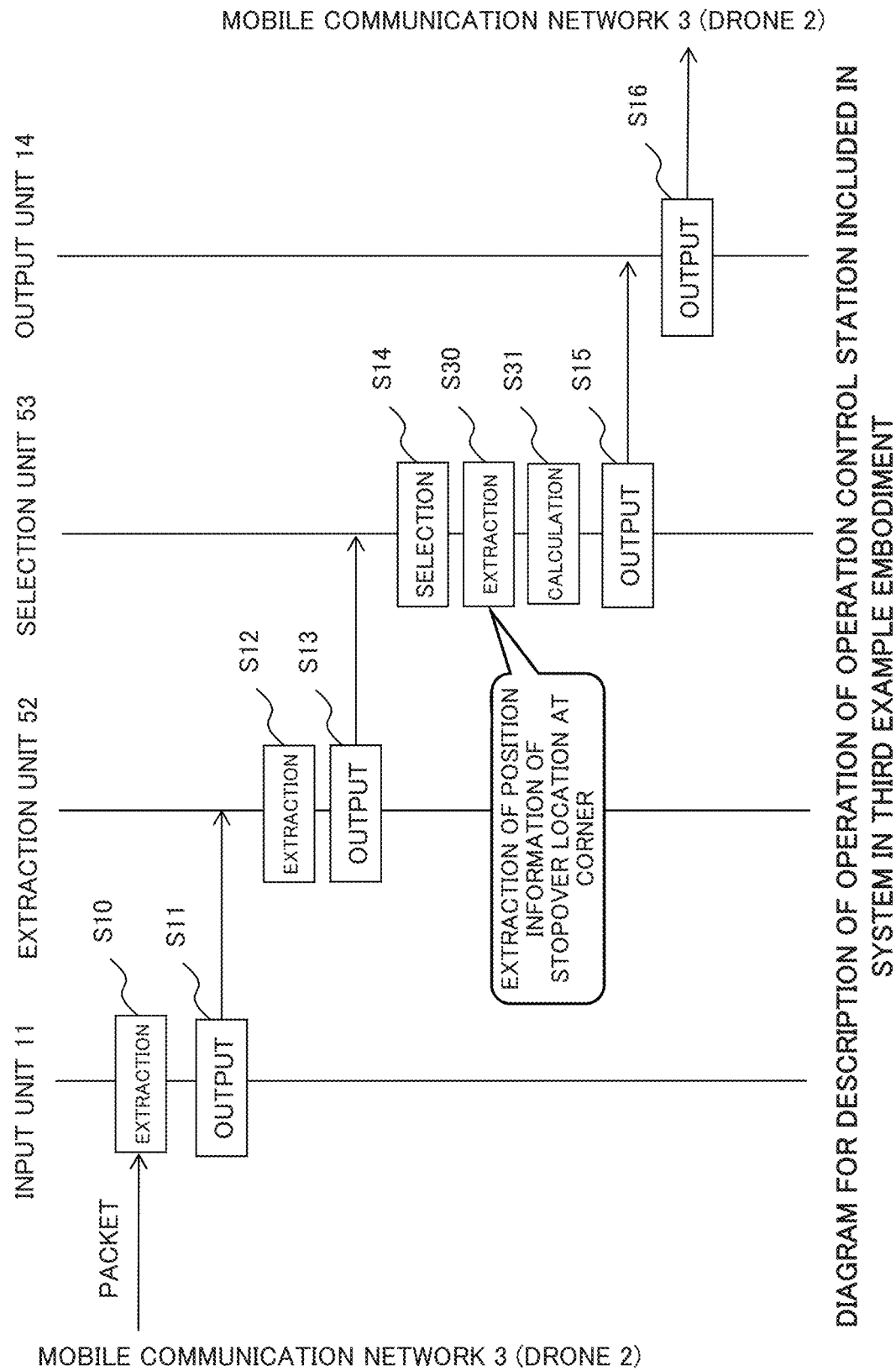
FIG. 18 is a diagram for a description of operation of the operation control station included in the system in the third example embodiment of the present invention.

FIG. 18 is a diagram for a description of operation of the operation control station included in the system in the third example embodiment of the present invention. FIGS. 19 to 22 are diagrams for a description of an operation process or an operation result of the operation control station included in the system in the third example embodiment of the present invention.

Using FIGS. 18 to 22, the operation of the system of the present example embodiment will be described below. Note that it is assumed that the table illustrated in FIG. 14 has been set in the database unit 50.

(1) Position Information Extraction of Stopover Location

First, it is assumed that a packet addressed to an operation control station 1 is input to an input unit 11 of the operation control station 1 from a drone 2.

In that case, it is also assumed that the input unit 11 of the operation control station 1, as illustrated in FIG. 18, has extracted, from the input packet, a piece of position information of a present location of the drone 2 and a piece of position information of a flight destination of the drone 2 (S10).

Figure 19:
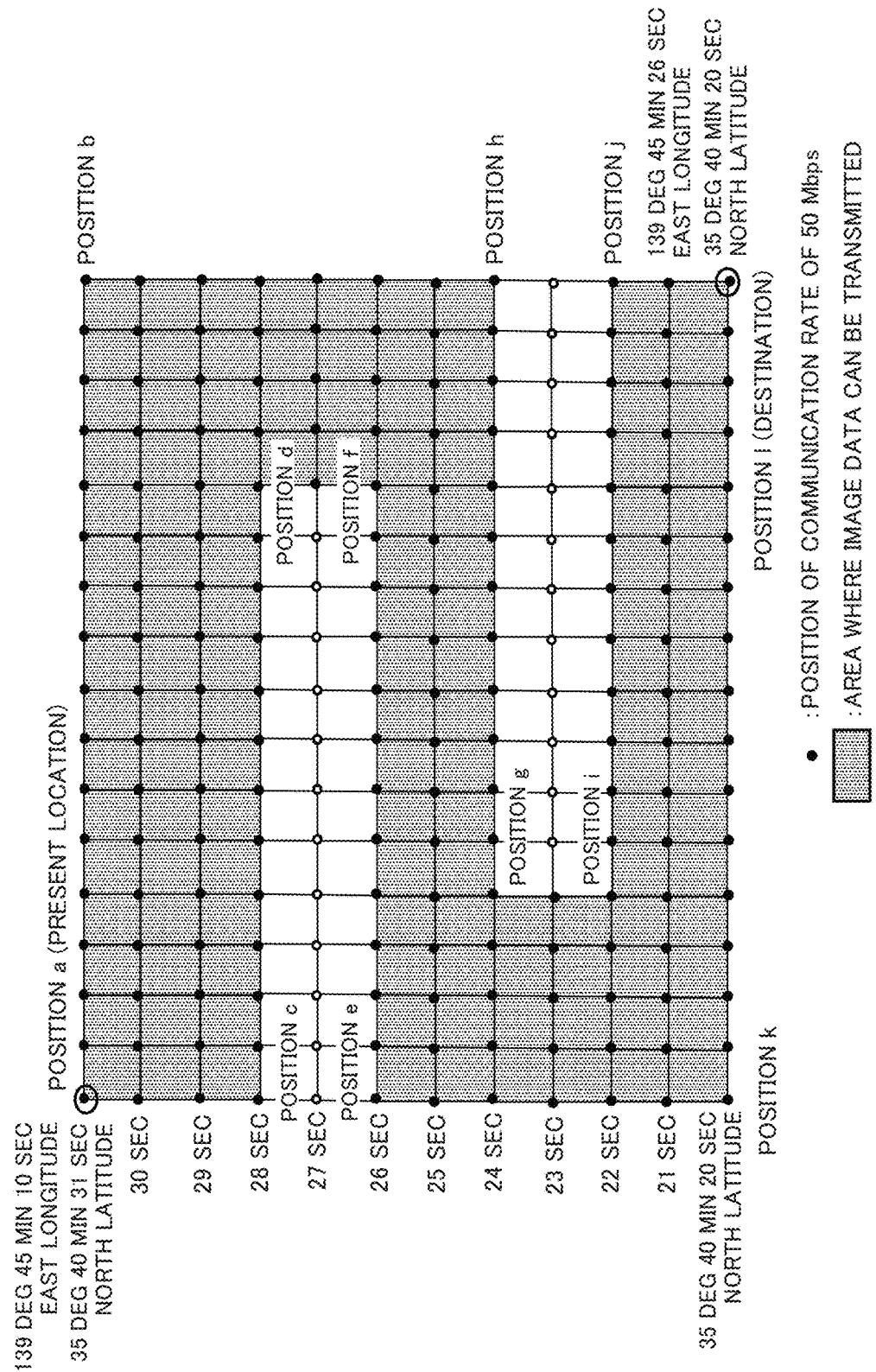
FIG. 19 is a diagram (part 1) for a description of an operation process of the operation control station included in the system in the third example embodiment of the present invention.

Hereinafter, assuming that the extracted pieces of position information of the present location and the flight destination are the pieces of position information of the positions a and 1 illustrated in FIG. 19, respectively, a description will be made.

After the above-described processing in step S10, the operation control station 1 executes, as illustrated in FIG. 18, the above-described processing in steps S11 to S14 in order. Note, however, that, when the extraction unit 52 extracts pieces of position information from a table in the processing in step S12, the extraction unit 52 extracts the pieces of position information from the table stored in the database unit 50.

The selection unit 53, when executing the above-described processing in step S14, selects all pieces of position information of positions at which an image can be transmitted. Hereinafter, assuming that the selection unit 53 has selected, as pieces of position information of positions at which an image can be transmitted, the pieces of position information of the positions of black dots illustrated in FIG. 19, the description will be continued. The selected pieces of position information will be used in processing in step (g), to be described later.

Figure 20:
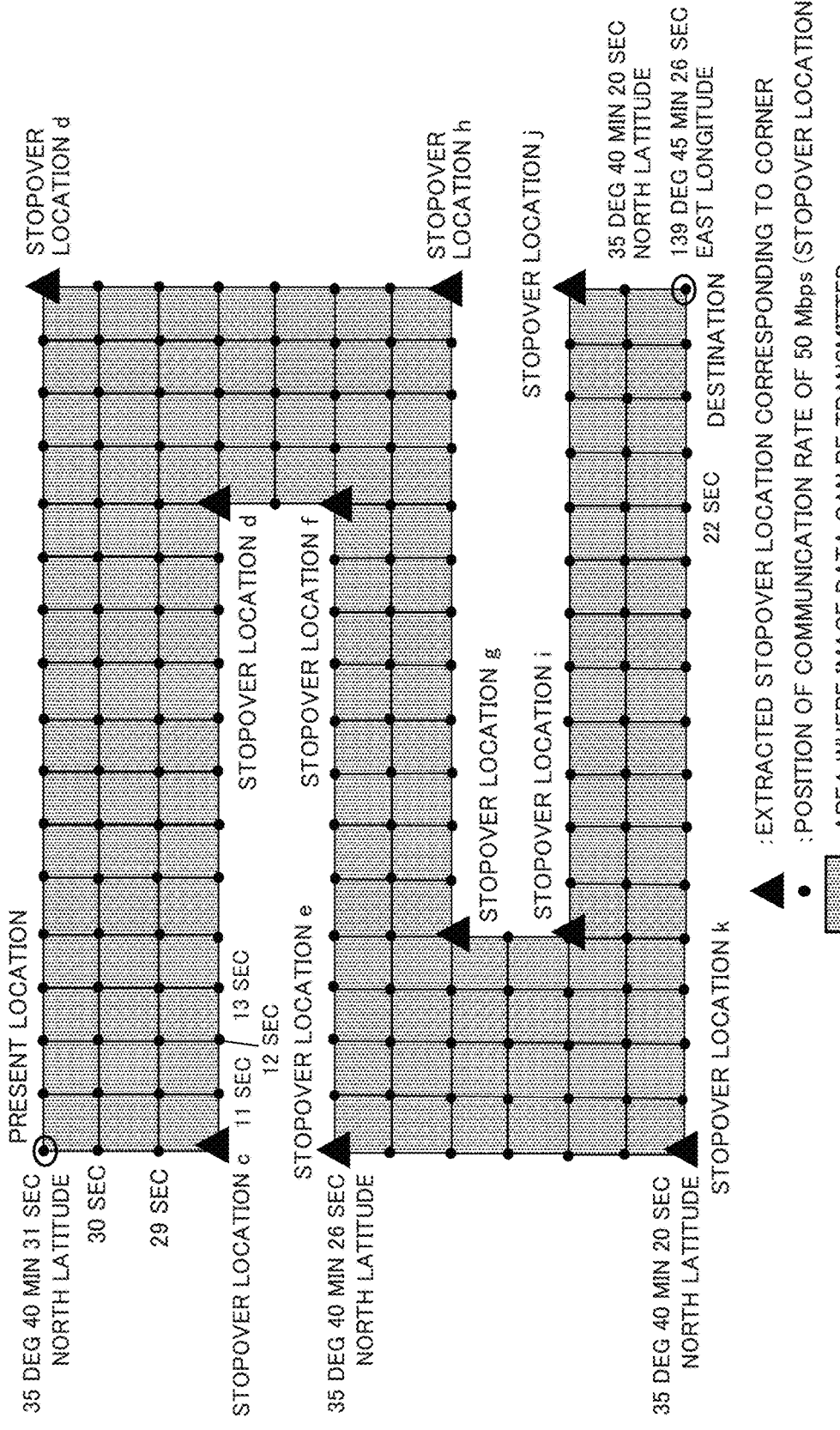
FIG. 20 is a diagram (part 2) for the description of the operation process of the operation control station included in the system in the third example embodiment of the present invention.

Next, as illustrated in FIG. 18, the selection unit 53 extracts pieces of position information of stopover locations corresponding to corners of an area in which image data can be transmitted (S30). Specifically, the selection unit 53 extracts, out of the table in FIG. 14 stored in the database unit 50, all pieces of position information with each of which a piece of information that having a value of 1, indicating a corner, is associated, as pieces of position information of stopover locations. As a consequence, the selection unit 53 extracts the pieces of position information of the positions b to k illustrated in FIG. 19 as pieces of position information of stopover locations. As illustrated in FIG. 20, the positions b to k are, hereinafter, referred to as "stopover locations b to k".

(2) Selection of Stopover Location on Shortest Path Reaching Destination in Shortest Distance within Area in which Image Data can be Transmitted Next, the selection unit 53 calculates, out of the pieces of position information of the positions b to k extracted in step S30, pieces of position information of stopover locations on a shortest path that reaches the destination in the shortest distance within the area in which image data can be transmitted, using a Dijkstra method (S31). The area in which image data can be transmitted is, in FIG. 20, an area that is filled in gray.

(2-1) Distance (Cost) Calculation between Stopover Locations

For that purpose, first, the selection unit 53 calculates distances between the present location of the drone and respective stopover locations, distances between stopover locations, and distances between the flight destination of the drone and respective stopover locations. Specifically, the selection unit 53 executes the following processing (I) to (III).

(I) The selection unit 53, as with the above-described processing in step (i), calculates, with respect to each of the extracted pieces of position information of the stopover locations, a distance (hereinafter, referred to as a "calculated distance X") between the stopover location indicated by the piece of position information (hereinafter, referred to as "applicable position information") and the present location of the drone 2. Note, however, that the selection unit 53 calculates the calculated distance X only when a path (hereinafter, referred to as a "calculation path X") connecting the stopover location indicated by the piece of applicable position information to the present location of the drone 2 passes within the area in which image data can be transmitted (the area filled in gray in FIG. 20).

The selection unit 53 performs discrimination of whether or not a calculation path X passes within the area in which image data can be transmitted, in accordance with the following steps (f) to (h).

(f) The selection unit 53 calculates pieces of position information of positions on a line segment connecting between the stopover location indicated by the piece of applicable position information and the present location of the drone 2 every one second (25 m).

For example, when a stopover location indicated by a piece of applicable position information is the stopover location d illustrated in FIG. 20, the selection unit 53 calculates pieces of position information of positions on a line segment connecting between the stopover location d and the present location of the drone 2 every one second (25 m).

(g) Next, the selection unit 53 discriminates, with respect to each of the pieces of position information of positions on the line segment calculated in the processing in step (f), whether or not any one of the positions of black dots (the positions indicated by the pieces of position information selected in the above-described processing in step S14) illustrated in FIG. 20 exists within a distance shorter than a predetermined distance from the position indicated by the piece of position information. The predetermined distance is a distance (25 m) equivalent to one second and is set in the selection unit 53 by the administrator of the system of the present example embodiment.

(h) Next, when the discrimination with respect to each piece of position information in the processing in step (g) has produced all positive results, the selection unit 53 discriminates that the calculation path X passes within the area in which image data can be transmitted. When the discrimination with respect to each piece of position information in the processing in step (g) has produced even one negative result, the selection unit 53 discriminates that the calculation path X does not pass within the area in which image data can be transmitted.

Figure 21:
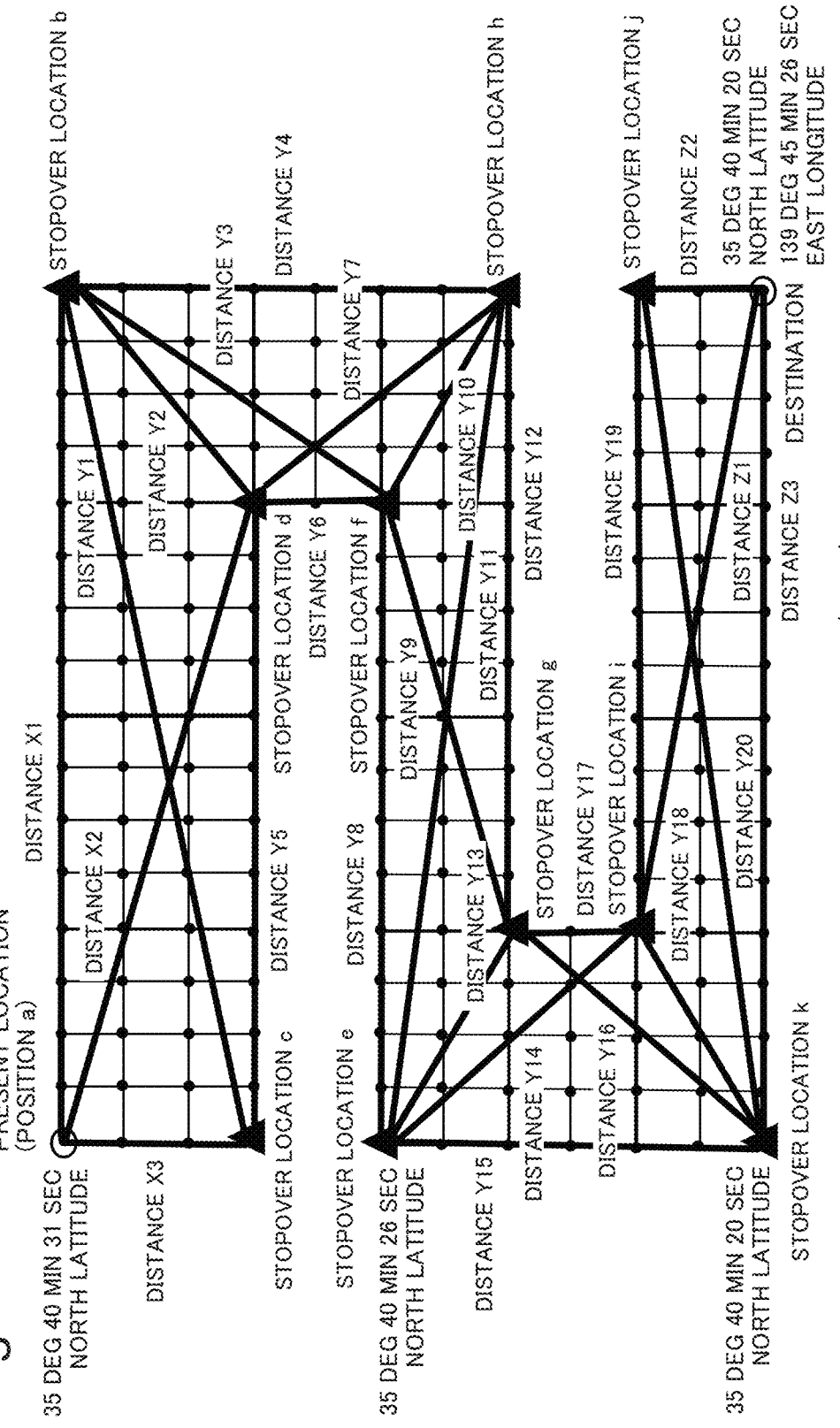
FIG. 21 is a diagram (part 3) for the description of the operation process of the operation control station included in the system in the third example embodiment of the present invention.

Result 1: Through the above-described processing (I) including the above-described processing in steps (f) to (h), the selection unit 53 calculates distances X1, X2, and X3 between the stopover locations b, c, and d and the present location of the drone 2, respectively, as illustrated in FIG. 21.

(II) Next, the selection unit 53, as with the above-described processing (iii), calculates, with respect to each of selected pieces of position information of stopover locations, a distance (hereinafter, referred to as a "calculated distance Z") between the stopover location indicated by the piece of position information (applicable position information) and the flight destination of the drone 2.

Note, however, that the selection unit 53 calculates the calculated distance Z only when a path (hereinafter, referred to as a "calculation path Z") connecting the stopover location indicated by the piece of applicable position information to the flight destination of the drone 2 passes within the area in which image data can be transmitted. The selection unit 53 performs discrimination of whether or not a calculation path Z passes within the area in which image data can be transmitted (the area filled in gray in FIG. 20) in accordance with the above-described processing in steps (f) to (h). In so doing, the selection unit 53 executes the processing, considering a calculation path X to be a calculation path Z.

Result 2: Through the above-described processing (II), the selection unit 53 calculates distances Z1, Z2, and Z3 between the stopover locations i, j, and k and the destination of the drone 2, respectively, as illustrated in FIG. 21.

(III) Next, the selection unit 53, as with the processing (ii), calculates distances between selected stopover locations. That is, the selection unit 53, as with the processing (ii), calculates, with respect to each of the selected pieces of position information of the stopover locations, a distance (hereinafter, referred to as a "calculated distance Y") between the stopover location indicated by the piece of position information (applicable position information) and another stopover location (stopover location indicated by a piece of position information different from the applicable position information) for all combinations of the stopover locations.

Note, however, that the selection unit 53 calculates the calculated distance Y only when a path (hereinafter, referred to as a "calculation path Y") connecting the stopover location indicated by the piece of applicable position information to another stopover location passes within the area in which image data can be transmitted (the area filled in gray in FIG. 20). The selection unit 53 performs discrimination of whether or not a calculation path Y passes within the area in which image data can be transmitted in accordance with the above-described processing in steps (f) to (h). In so doing, the selection unit 53 executes the processing, considering a calculation path X to be a calculation path Y.

Result 3: Through the above-described processing (III), the selection unit 53 calculates distances Y1 to Y20 between stopover locations among the stopover locations b to k, as illustrated in FIG. 21.

(2-2) Position Information Calculation of Stopover Location on Shortest Path

Next, the selection unit 53 calculates, based on the distances calculated in the above-described processing (I) to (III), a piece(s) of position information of stopover location(s) on a shortest path that reaches the destination in the shortest distance within the area in which image data can be transmitted, using a Dijkstra method. Specifically, the selection unit 53 executes the following processing in steps (k) to (o).

(k) First, the selection unit 53 calculates a number obtained by adding 2 to the number of pieces of position information of the stopover locations b to k selected in step S30. The numeral 2 is the number of pieces of position information of the present location and the destination. The number that the selection unit 53 calculates is the number of nodes. The present processing is processing corresponding to the above-described step (a). Hereinafter, assuming that the calculated number is a value N, the description will be continued.

(1) Next, the selection unit 53, as with the above-described processing in step (b), assigns the start node number 0 and the terminal node number N to the pieces of position information of the present location and flight destination of the drone 2, respectively. In addition, the selection unit 53 assigns node numbers 1 to N−1 to the pieces of position information of the stopover locations b to k selected in the above-described step S30 in order. The selection unit 53 stores the pieces of position information and the node numbers assigned thereto in association with each other in a memory.

(m) Next, the selection unit 53, as with the above-described processing in step (c), inputs the distances calculated in the above-described processing (I) to (III) as weights between nodes in conjunction with the number of nodes calculated in the above-described processing in step (k) into the general Dijkstra method software.

(n) After the processing in step (m), node numbers indicating nodes are output from the general Dijkstra method software. The general Dijkstra method software outputs the node numbers in the order from the start node toward the terminal node. That is, the general Dijkstra method software outputs numbers indicating nodes on a shortest path from the present location to the flight destination.

(o) Next, the selection unit 53 extracts, with respect to each of the output node numbers (the numbers except 0 and N), a corresponding piece of position information from the memory. The extracted piece(s) of position information is/are a piece(s) of position information of a stopover location(s) on a shortest path that reaches the flight destination in the shortest distance within the area in which image data can be transmitted.

(2-3) Result of Processing in S31

As a result of the above-described processing in steps (k) to (o), the selection unit 53 can obtain a piece(s) of position information of a stopover location(s) on a shortest path that reaches the flight destination in the shortest distance within the area in which image data can be transmitted. Specifically, the selection unit 53 can obtain the pieces of position information indicating the stopover locations d, f, g, and i illustrated in FIG. 22.

(3) Notification of Position Information of Stopover Location to Drone 2

Next, as illustrated in FIG. 18, the selection unit 53, after step S31, outputs, to the output unit 14, the extracted piece of position information of the stopover locations d, f, g, and i and the piece of position information of the flight destination of the drone 2 (S15).

The drone 2 is notified of the pieces of position information of the stopover locations d, f, g, and i and the piece of position information of the flight destination.

Figure 22:
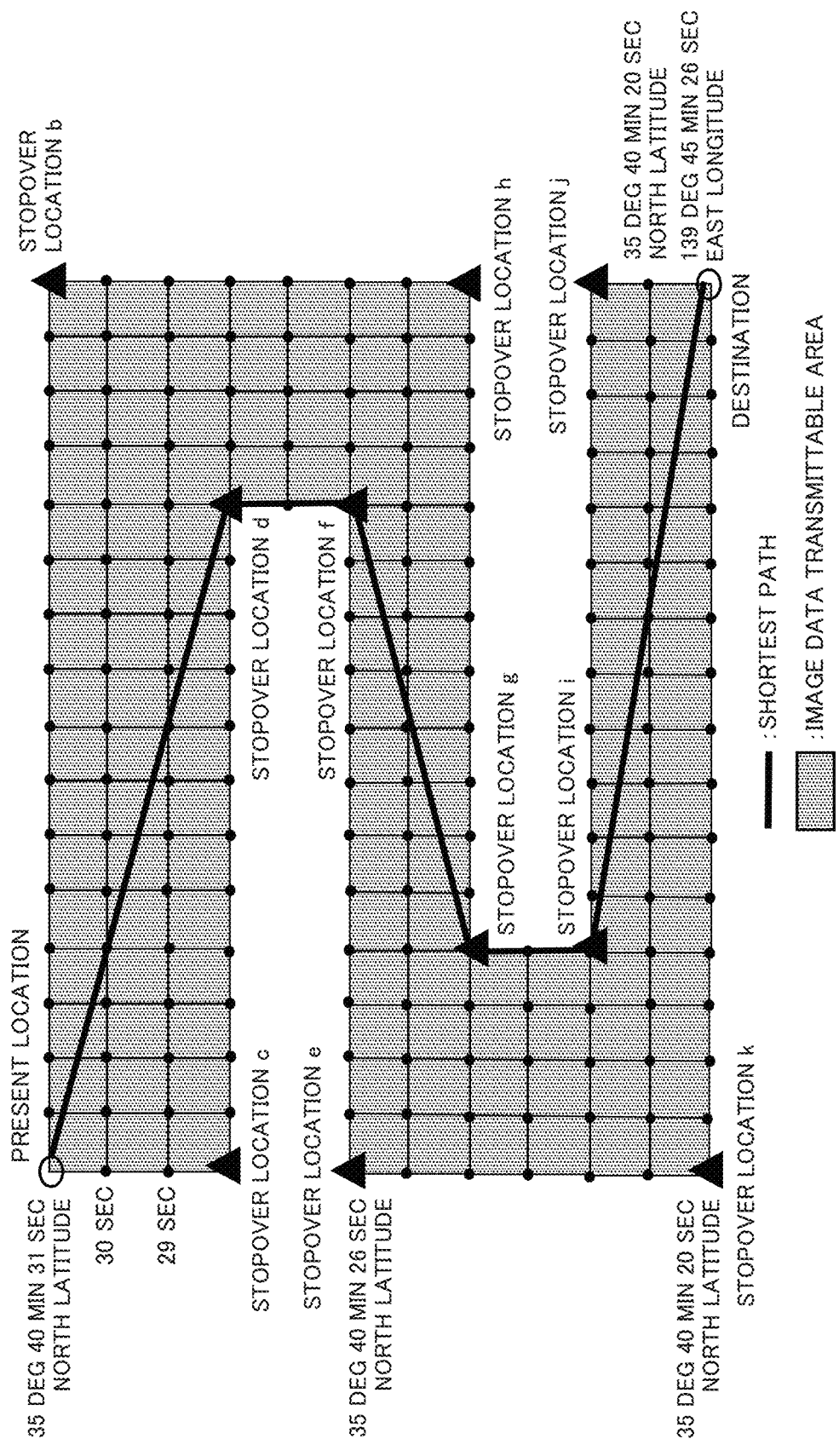
FIG. 22 is a diagram for a description of a result of the operation of the operation control station included in the system in the third example embodiment of the present invention.

As a consequence, as illustrated in FIG. 22, the drone 2, after having flown over the stopover locations d, f, g, and i and having transmitted image data continuously, flies to the destination. The drone 2 can not only transmit image data continuously but also fly to a destination in a shortest path.

(4) About Data Transmission from Drone 2

The drone 2 does not always have to transmit image data continuously.

For example, the drone 2 may transmit image data every predetermined period of time (for example, every 10 minutes). The predetermined period of time is set in the drone 2 by the administrator of the system of the present example embodiment.

In addition, the drone 2 may perform transmission of image data at stopover locations specified by the operation control station 1. In that case, the operation control station 1 has a function of outputting, to the drone 2, the pieces of position information of the stopover locations at which image data are transmitted in conjunction with the pieces of position information of the stopover locations d, f, g, and i. On the occasion of the output, the operation control station 1 calculates positions on the shortest path every predetermined distance and outputs the pieces of position information of the calculated positions to the drone 2 as pieces of position information of stopover locations at which image data are transmitted. The above-described predetermined distance is set in the drone 2 by the administrator of the system of the present example embodiment. The administrator of the system of the present example embodiment may set, in the drone 2, a distance over which the drone 2 flies in 10 minutes as the predetermined distance.

Since operation other than the above-described operation is the same as that in the system in the second example embodiment, a description thereof will be omitted.

[Description of Advantageous Effects]

In the system of the present example embodiment, the drone 2 can not only transmit image data continuously but also fly to a destination in a shortest path.

That is because the operation control station included in the system of the present example embodiment calculates a piece(s) of position information of a stopover location(s) on a shortest path by which a drone 2 reaches the flight destination in the shortest distance within an area in which image data can be transmitted, using a Dijkstra method and notifies the drone of the calculated piece(s) of position information of the stopover location(s). As a consequence, the drone can not only transmit image data continuously but also fly to a destination in a shortest path.

Fourth Example Embodiment

Next, a fourth example embodiment of the present invention will be described. A system of the present example embodiment is a system in which each base station has the functions of the operation control station 5. In the system of the present example embodiment, communication with a drone can be performed faster by as much as traffic does not go through a core network.

Hereinafter, a configuration and operation of the system of the fourth example embodiment will be described.

[Description of Configuration]

(1) Configuration of System of Fourth Example Embodiment

Figure 23:
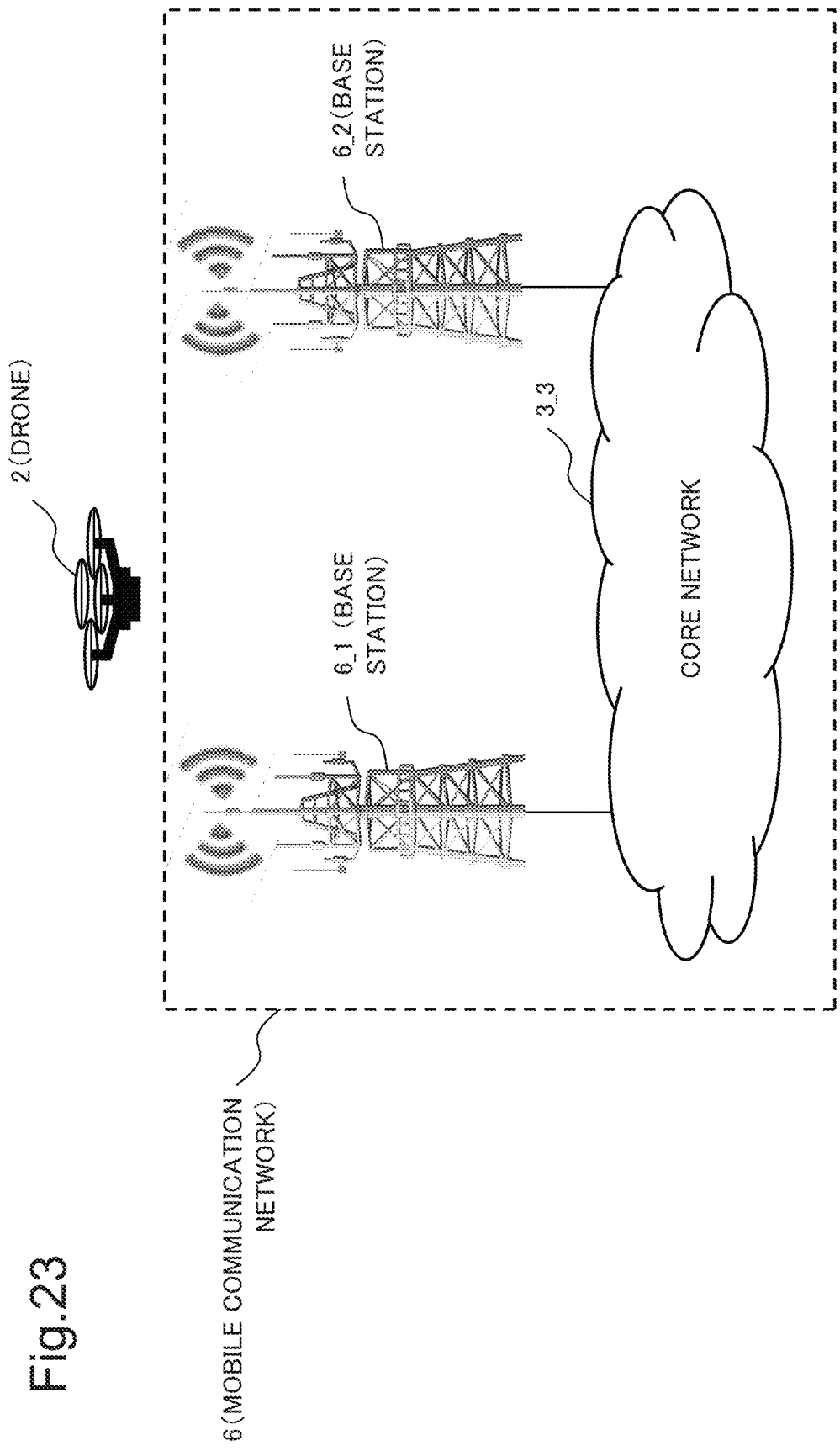
FIG. 23 is a diagram illustrating a configuration example of a system in a fourth example embodiment of the present invention.
Figure 24:
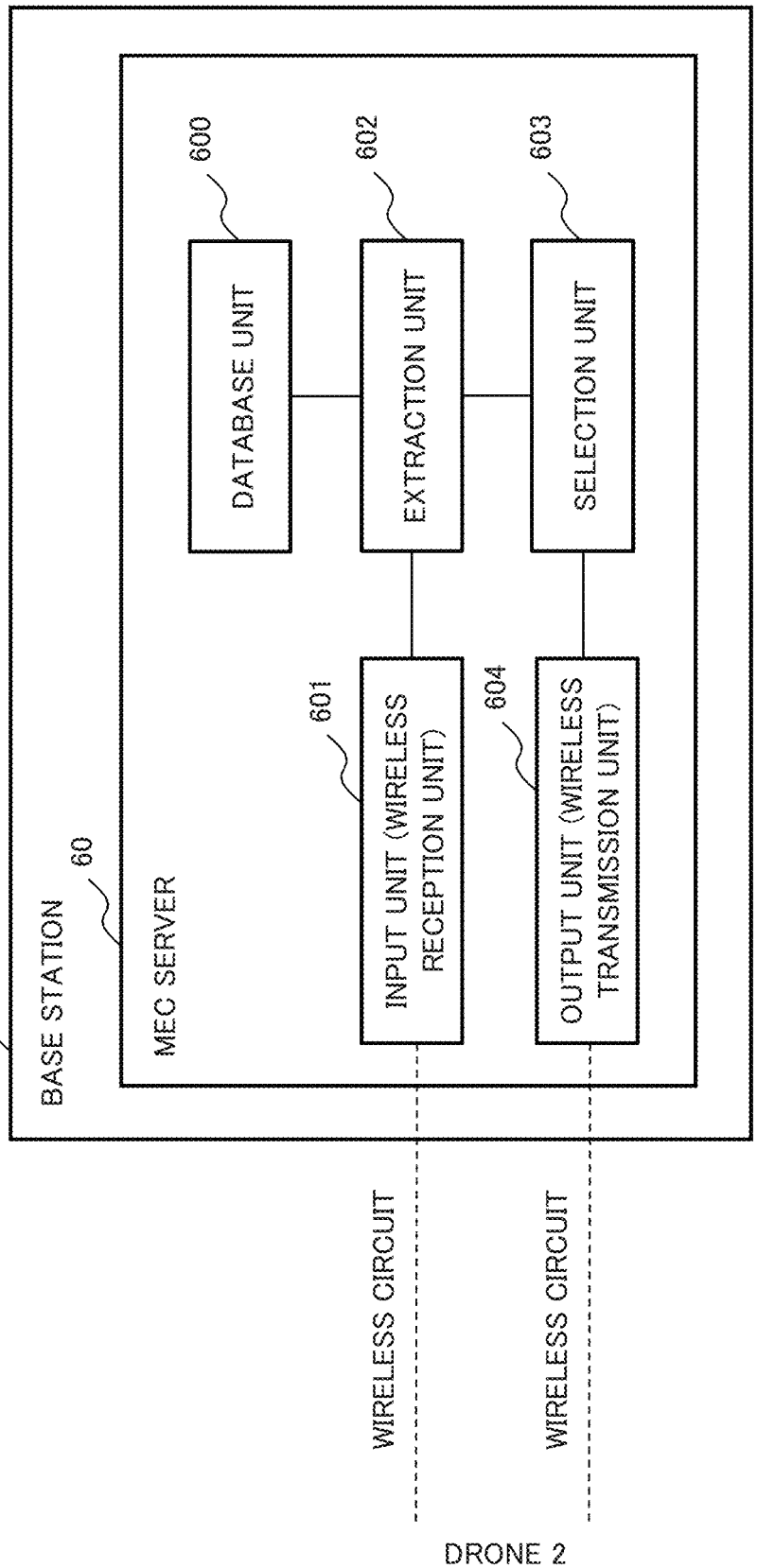
FIG. 24 is a diagram illustrating a configuration example of each base station included in the system in the fourth example embodiment of the present invention.

FIG. 23 is a diagram illustrating a configuration example of the system in the fourth example embodiment of the present invention. FIG. 24 is a diagram illustrating a configuration example of each base station included in the system in the fourth example embodiment of the present invention.

The system of the present example embodiment includes, as illustrated in FIG. 23, a mobile communication network 6 in place of the mobile communication network 3. The mobile communication network 6 includes base stations 6_1 and 6_2 in place of the base stations 3_1 and 3_2, respectively.

Each of the base stations 6_1 and 6_2 include, as illustrated in FIG. 24, a mobile edge computing (MEC) server

60. The MEC server 60 includes a database unit 600, input unit 601, extraction unit 602, selection unit 603, and output unit 604 of an operation control station. As illustrated in FIG. 23, the system of the present example embodiment does not have to include an operation control station 5.

Since components other than the above-described components are the same as those in the system in the third example embodiment, the same reference signs are assigned to those components and descriptions thereof will be omitted.

(2) Functions of Base Stations 6_1 and 6_2

Since the base stations 6_1 and 6_2 have the same functions, functions of the base station 6_1 will be described as a representative thereof.

The base station 6_1 has the functions of both the base station 3_1 and the operation control station 5. For this reason, the database unit 600, extraction unit 602, and selection unit 603 of the base station 6_1 have the same functions as the database unit 50, the extraction unit 52, and the selection unit 53 illustrated in FIG. 13, respectively. The input unit 601 and output unit 604 of the base station 6_1 have a wireless communication function in addition to the functions of the input unit 11 and output unit 14.

Specifically, the input unit 601, when receiving a wireless signal from a drone 2 through the wireless communication function, extracts a packet addressed to the operation control station 5 from the received wireless signal and outputs the extracted packet to the extraction unit 602.

When the output unit 604 transmits a packet addressed to the drone 2, the output unit 604 converts the packet to be transmitted to a wireless signal and, using the wireless communication function, transmits the wireless signal.

Functions other than the above-described functions are the same as those in the system in the third example embodiment.

[Description of Operation]

Next, operation of the system of the present example embodiment will be described below. In the following description, it will be described that the base station 6_1 having the functions of the operation control station 5 performs wireless communication with the drone 2.

(A) First, the input unit 601 of the base station 6_1, when receiving a wireless signal from the drone 2, extracts a packet addressed to the operation control station 5 from the received wireless signal and outputs the extracted packet to the extraction unit 602.

(B) Next, the extraction unit 602 and the selection unit 603, by executing the processing in steps S12 to S14, S30, S31, and S15 illustrated in FIG. 18, output a piece(s) of position information of a stopover location(s) to the output unit 604.

(C) The output unit 604 includes the input piece(s) of position information of the stopover location(s) in a packet addressed to the drone 2 and transmits the packet addressed to the drone 2 as a wireless signal.

Operation other than the above-described operation is the same as that in the system in the third example embodiment.

Note that the above description was made assuming that the system of the present example embodiment has the configuration and functions of the system of the third example embodiment. The system of the present example embodiment may be a system configured under the assumption that the system has the configurations and functions of the systems of the first or second example embodiment. Even in that case, the input unit 601 and the output unit 604 perform the above-described operations (A) to (C).

Although, in the above description, a case where an MEC server 60 is included in each base station was described, the MEC server 60 may be a device disposed outside the base stations. In that case, the MEC server 60 is connected to the base stations. In addition, the MEC server 60 may be a device connected to the core network 3_3.

[Description of Advantageous Effect]

Since, in the system of the present example embodiment, traffic does not go through a core network, communication with the drone 2 can be performed faster than the system of the first example embodiment.

Fifth Example Embodiment

Next, a fifth example embodiment of the present invention will be described.

An operation control station included in a system of the fifth example embodiment, when extracting a piece(s) of position information of a stopover location(s) from a table, performs the extraction by excluding a piece(s) of position information of a stopover location(s) (for example, an airport) over which a drone is forbidden to fly. As a consequence, a drone can, avoiding a place over which a drone is forbidden to fly, fly to a destination in a shortest path.

Hereinafter, a configuration and operation of the system of the fifth example embodiment will be described.

[Description of Configuration]

(1) Configuration of System of Fifth Example Embodiment

Figure 25:
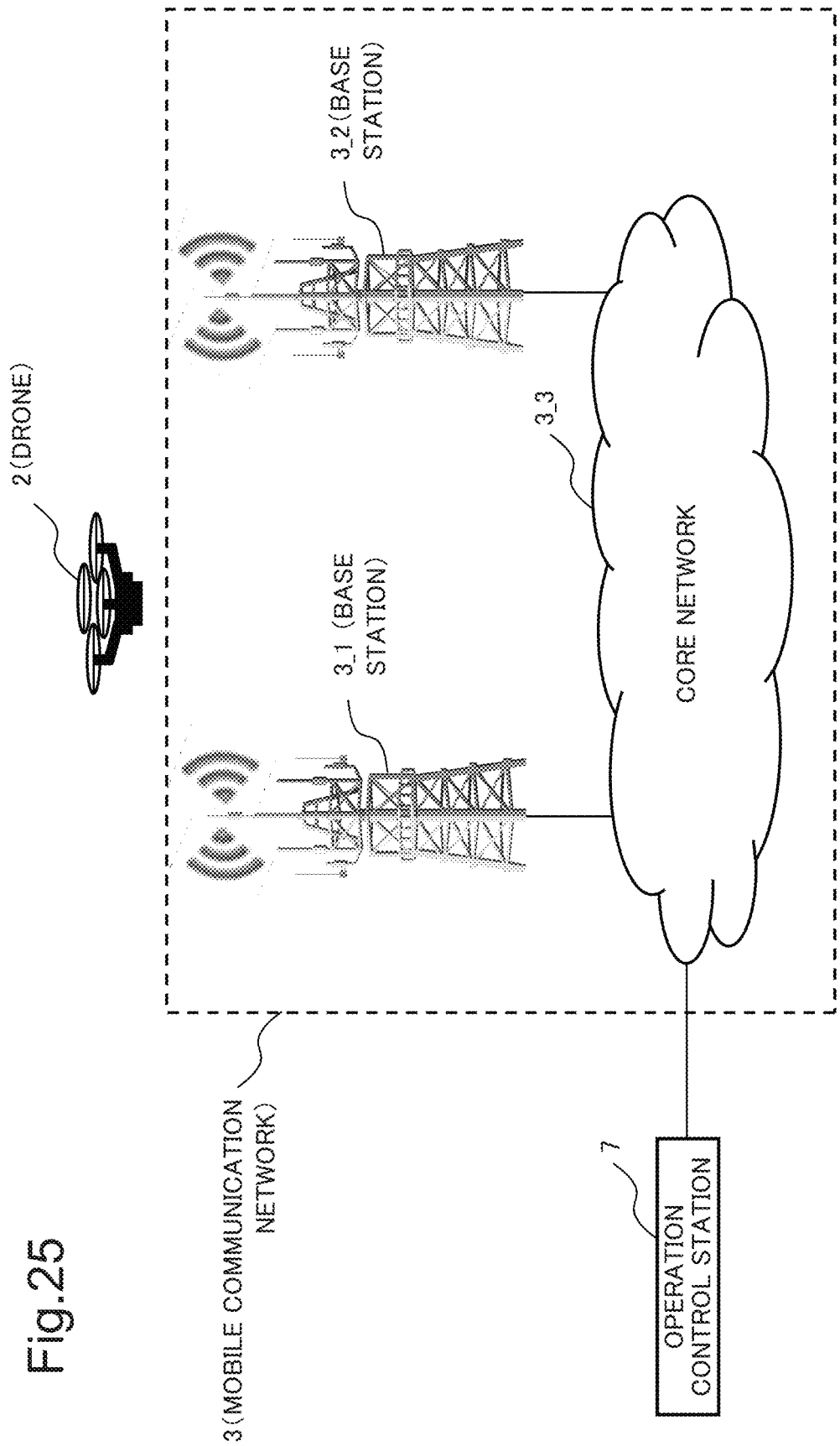
FIG. 25 is a diagram illustrating a configuration example of a system in a fifth example embodiment of the present invention.
Figure 26:
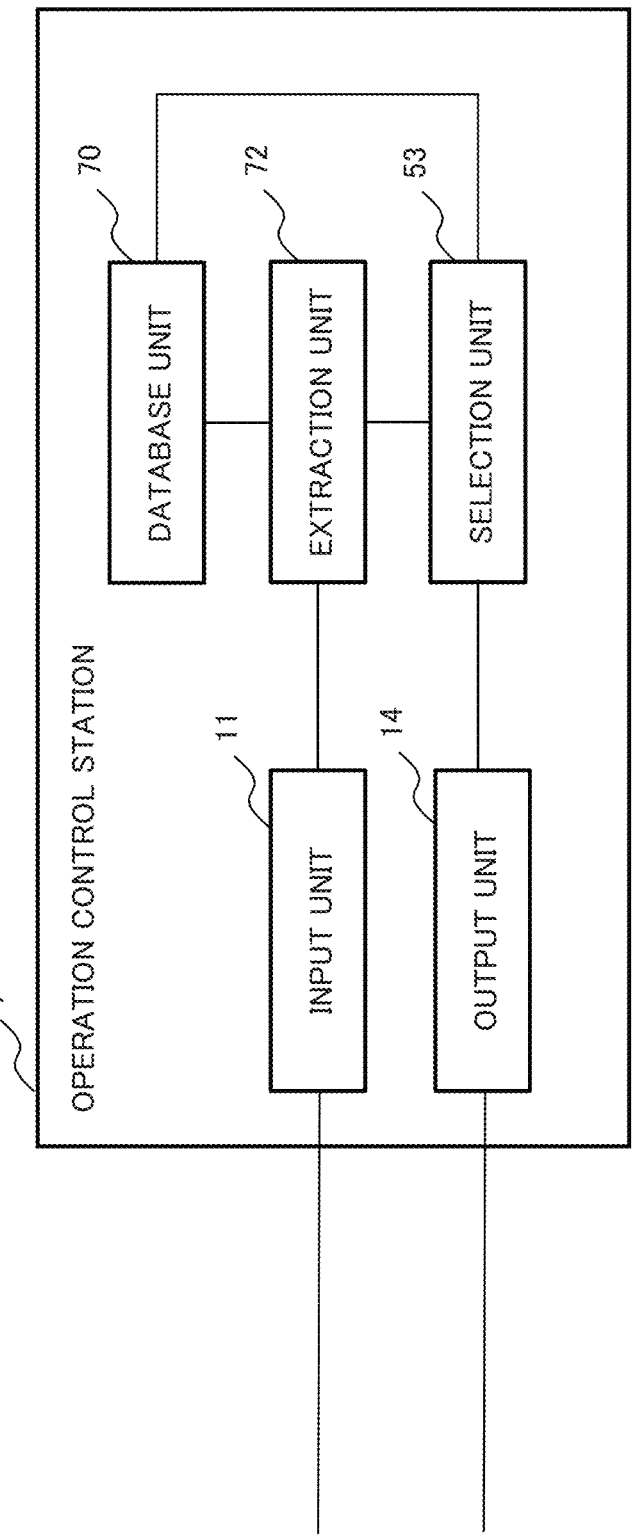
FIG. 26 is a diagram illustrating a configuration example of an operation control station included in the system in the fifth example embodiment of the present invention.

FIG. 25 is a diagram illustrating a configuration example of the system in the fifth example embodiment of the present invention. FIG. 26 is a diagram illustrating a configuration example of the operation control station included in the system in the fifth example embodiment of the present invention.

The system of the fifth example embodiment includes, as illustrated in FIG. 25, an operation control station 7 in place of the operation control station 5. The operation control station 7 includes, as illustrated in FIG. 26, a database unit 70 and an extraction unit 72 in place of the database unit 50 and the extraction unit 52 (illustrated in FIG. 13), respectively. The extraction unit 72 includes a memory.

Since components other than the above-described components are the same as those in the system in the third example embodiment, the same reference signs are assigned to those components and descriptions thereof will be omitted.

(2) About Functions of Database Unit 70 and Extraction Unit 72

FIG. 27 is a diagram illustrating an example of a table set in the operation control station 7 included in the system in the fifth example embodiment of the present invention.

In the database unit 70 of the operation control station 7, the table illustrated in FIG. 27 is set by an administrator of the system of the present example embodiment. The table illustrated in FIG. 27 is a table obtained by appending pieces of flight information to the table, illustrated in FIG. 14, that was used in the system of the third example embodiment.

Each of the above-described pieces of flight information is associated with a piece of position information and indicates whether or not a position indicated by the piece of position information is a place over which a drone is allowed to fly. For example, a piece of flight information associated with a piece of position information of a position of 35 degrees 40 minutes 31 seconds north latitude and 139 degrees 45 minutes 10 seconds east longitude indicates that the position is a place over which a drone is allowed to fly.

A place that is not a place over which a drone is allowed to fly is, for example, an airport, an area where houses stand close together, or the like.

The database unit 70 stores the set table (table illustrated in FIG. 27).

The extraction unit 72 has the functions of the extraction unit 12 and extracts all pieces of position information of positions at which image data can be transmitted from the table stored in the database unit 70. Further, the extraction unit 72 extracts, out of the extracted pieces of position information, pieces of position information with each of which a piece of flight information indicating that the position is a place over which a drone is allowed to fly is associated. This operation enables the extraction unit 72 to extract pieces of position information of positions over which a drone is allowed to fly.

The extraction unit 72 outputs, to a selection unit 53, the extracted pieces of position information, an input piece of position information of a present location of a drone 2, and an input piece of position information of a flight destination of the drone 2.

Functions other than the above-described functions are the same as those in the system in the third example embodiment.

[Description of Operation]

Next, operation of the system of the present example embodiment will be described.

Figure 29:
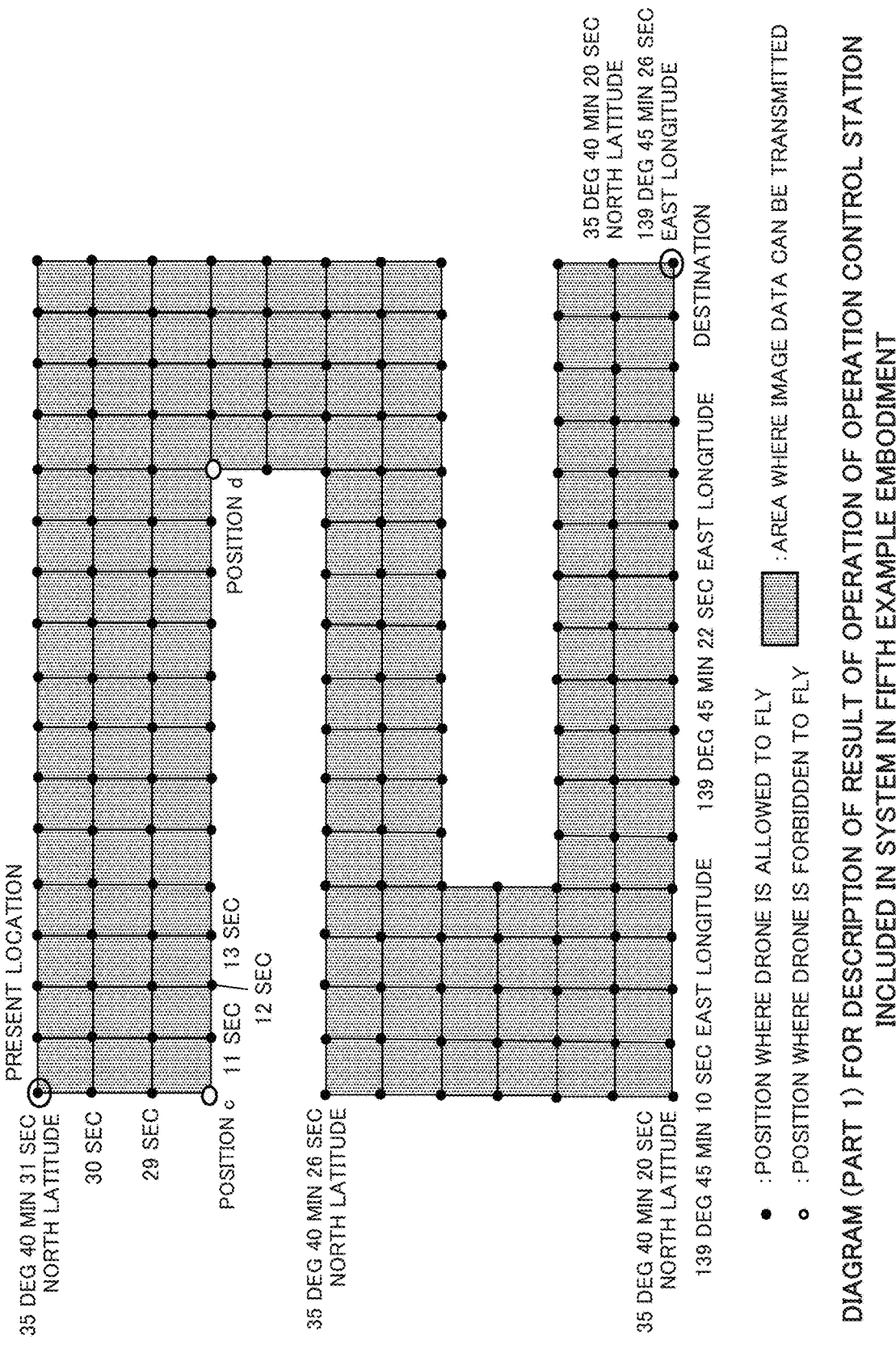
FIG. 29 is a diagram (part 1) for a description of a result of the operation of the operation control station included in the system in the fifth example embodiment of the present invention.
Figure 30:
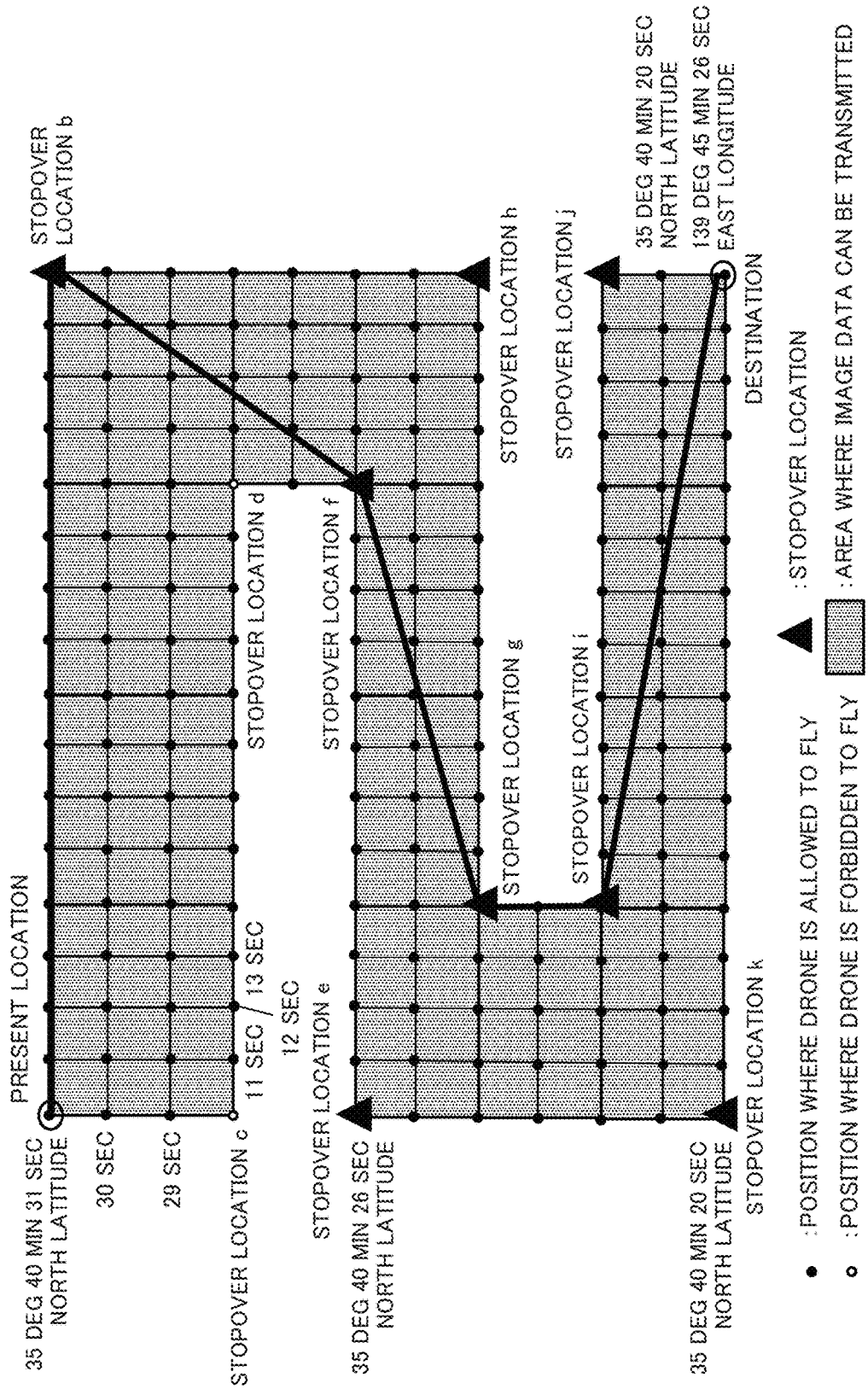
FIG. 30 is a diagram (part 2) for the description of the result of the operation of the operation control station included in the system in the fifth example embodiment of the present invention.

FIG. 28 is a diagram for a description of operation of the operation control station included in the system in the fifth example embodiment of the present invention. FIGS. 29 and 30 are diagrams for a description of a result of an operation of the operation control station included in the system in the fifth example embodiment of the present invention.

Using FIGS. 28 to 30, the operation of the system of the present example embodiment will be described below. Note that, assuming that the table illustrated in FIG. 27 has been set in the database unit 70, the following description will be made.

(1) Position Information Extraction of Stopover Location Where Drone Can Fly

First, it is assumed that, as illustrated in FIG. 28, the extraction unit 72 executes processing in step S12. In that case, the extraction unit 72 extracts all pieces of position information of positions at which image data can be transmitted from the table in FIG. 27 stored in the database unit 70 (S12).

Through the processing in step S12, the extraction unit 72 extracts all pieces of position information of positions at which image data can be transmitted.

Next, the extraction unit 72 extracts, among the extracted pieces of position information, all pieces of position information with each of which a piece of flight information indicating that the position is a place over which a drone is allowed to fly is associated from the table stored in the database unit 70 (S51).

Through the processing in step S51, the extraction unit 72 extracts all pieces of position information of positions at which image data can be transmitted and over which a drone is allowed to fly. In the following description, assuming that the extraction unit 12 of the operation control station 1 has extracted positions indicated by black dots illustrated in FIG. 29, the description will be continued. Note that positions c and d indicated by white dots in FIG. 29 are places over which a drone is forbidden to fly and it is assumed that the extraction unit 12 has not extracted the pieces of position information of these positions.

Next, as illustrated in FIG. 28, the operation control station 7 executes processing in steps S13, S14, S30, S31, S15, and S16.

As a consequence, the operation control station 7 outputs, to the drone 2, pieces of position information of stopover locations b, f, g, and i illustrated in FIG. 30 and the piece of position information of the flight destination of the drone 2. The pieces of position information of the stopover locations b, f, g, and i are pieces of position information of stopover locations on a shortest path.

As illustrated in FIG. 30, the drone 2, after having flown over the stopover locations b, f, g, and i and having transmitted image data continuously, flies to the destination. The drone 2 can not only transmit image data but also, avoiding a place(s) over which a drone is forbidden to fly, fly to a destination in a shortest path.

Operation other than the above-described operation is the same as that in the system in the third example embodiment.

Note that the above description was made assuming that the system of the present example embodiment has the configuration and functions of the system of the third example embodiment. The system of the present example embodiment may be a system configured under the assumption that the system has the configurations and functions of the systems of the first, second, and fourth example embodiments. Even in that case, the extraction unit 72 executes the processing in step S51 between the above-described processing in steps S12 and S13.

[Description of Advantageous Effects]

In the system of the present example embodiment, the drone 2 can not only transmit image data but also, avoiding a place(s) over which a drone is forbidden to fly, fly to a destination in a shortest path.

That is because the operation control station of the system of the present example embodiment extracts pieces of position information of positions over which a drone is allowed fly out of pieces of position information of positions at which image data can be transmitted. As a result of the extraction, the operation control station of the system of the present example embodiment can obtain, out of pieces of position information of positions over which a drone is allowed to fly, a piece(s) of position information of a position(s) on a shortest path to a destination and notify the drone of the obtained piece(s) of position information of the position(s). As a consequence, the drone can not only transmit image data but also, avoiding a place(s) over which a drone is forbidden to fly, fly to a destination in a shortest path.

Sixth Example Embodiment

Next, a sixth example embodiment of the present invention will be described.

An operation control station of a system of the sixth example embodiment makes a table reflect a communication rate notified by a drone (a communication rate that the drone has measured most recently). The operation control station is capable of keeping the table up to date.

Hereinafter, a configuration and operation of the system of the sixth example embodiment will be described.

[Description of Configuration]

(1) Configuration of System of Sixth Example Embodiment

Figure 31:
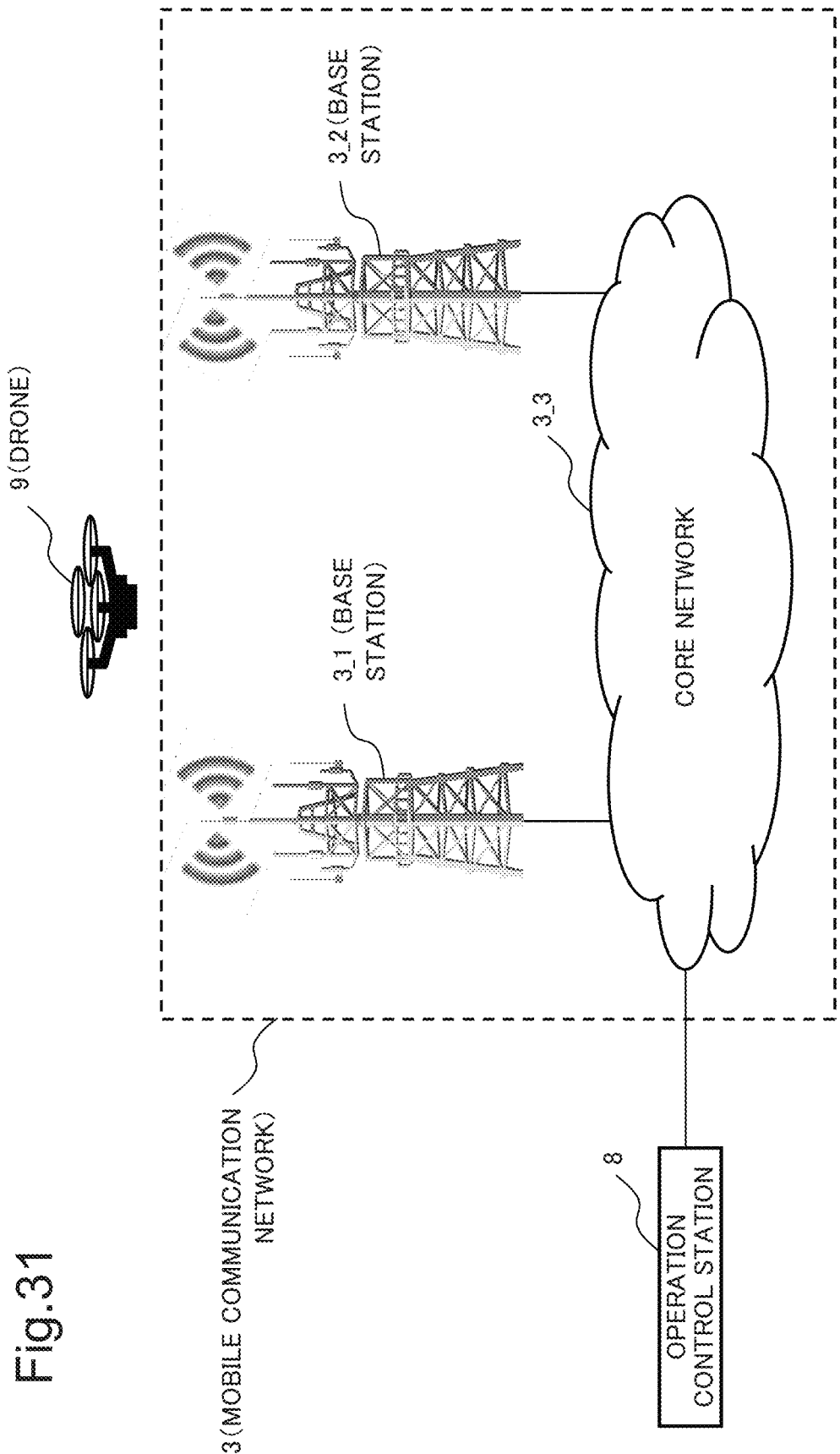
FIG. 31 is a diagram illustrating a configuration example of a system in a sixth example embodiment of the present invention.
Figure 32:
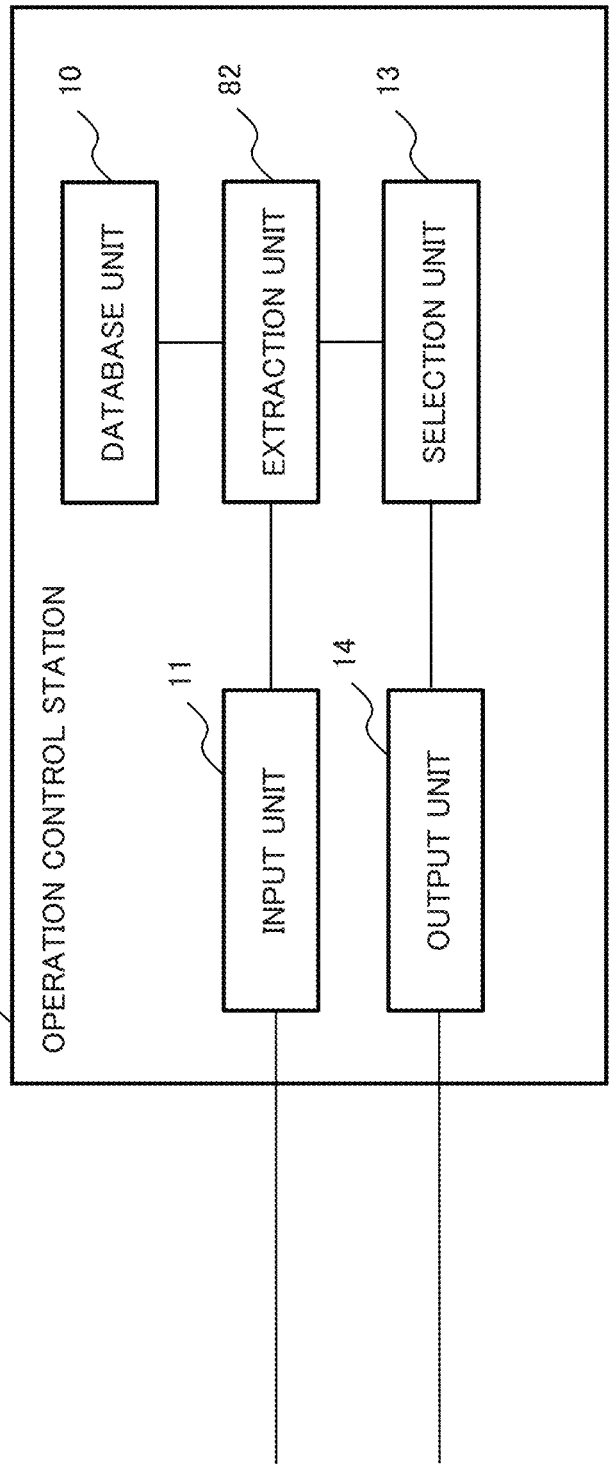
FIG. 32 is a diagram illustrating a configuration example of an operation control station included in the system in the sixth example embodiment of the present invention.

FIG. 31 is a diagram illustrating a configuration example of the system in the sixth example embodiment of the present invention. FIG. 32 is a diagram illustrating a configuration example of the operation control station included in the system in the sixth example embodiment of the present invention.

The system of the sixth example embodiment includes, as illustrated in FIG. 31, an operation control station 8 and a drone 9 in place of the operation control station 1 and the drone 2, respectively. The operation control station 8 includes, as illustrated in FIG. 32, an extraction unit 82 in place of the extraction unit 12.

Since components other than the above-described components are the same as those in the system in the first example embodiment, the same reference signs are assigned to those components and descriptions thereof will be omitted.

(2) About Functions of Extraction Unit 82

To the extraction unit 82, a piece of position information indicating a measurement place and a communication rate measured at the position indicated by the piece of position information are input from an input unit 11.

When a piece of position information indicating a measurement place and a communication rate are input, the extraction unit 82 updates a communication rate corresponding to the input piece of position information in the table stored in a database unit 10 with the input communication rate.

When the input piece of position information is not included in the table stored in the database unit 10, the extraction unit 82 writes the input piece of position information and communication rate in association with each other into the table in the database unit 10.

(3) Functions of Drone 9 (Communication Rate Measurement Function)

The drone 9 includes a mobile terminal into which a general application for measuring wireless communication speed is installed. The mobile terminal is connected to the drone 9 via a wired line.

The mobile terminal measures throughput of a wireless line, using the above-described application when it reaches predetermined timings and outputs the measured throughput to the drone 9. The above-described predetermined timings may be timings at fixed intervals and are set in the mobile terminal by an administrator of the system of the present example embodiment. The measured throughput is a communication rate.

When a communication rate is input from the mobile terminal, the drone 9 measures a piece of position information of a present location, using a GPS function. The measured piece of position information of the present location is a piece of position information indicating a measurement place. The drone 9 transmits the piece of position information indicating a measurement place and the measured communication rate to the operation control station 8.

Functions other than the above-described functions are the same as those in the system in the first example embodiment.

[Description of Operation]

Next, operation of the system of the present example embodiment will be described.

Figure 33:
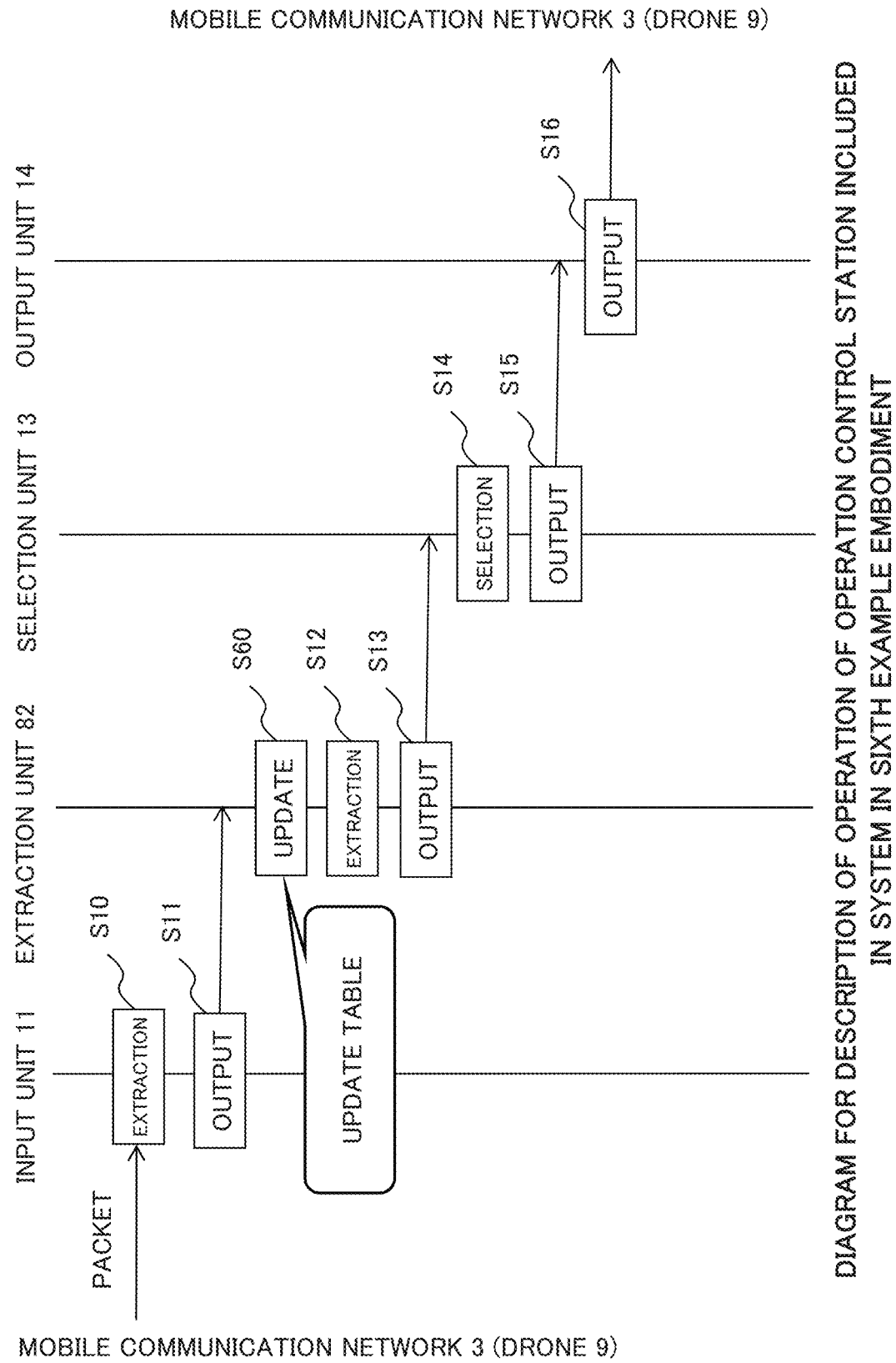
FIG. 33 is a diagram for a description of operation of the operation control station included in the system in the sixth example embodiment of the present invention.

FIG. 33 is a diagram for a description of operation of the operation control station included in the system in the sixth example embodiment of the present invention. Using FIG. 33, the operation of the system of the present example embodiment will be described below.

Note that, in the following description, it is assumed that the drone 9, using the functions described above in "(3) Functions of Drone 9", has transmitted a piece of position information indicating a measurement place and a communication rate measured at the position indicated by the piece of position information to the operation control station 8.

In that case, as illustrated in FIG. 33, an input unit 11 of the operation control station 8 executes the above-described processing in steps S10 and S11.

As a consequence, to the extraction unit 82 of the operation control station 8, the piece of position information indicating the measurement place and the communication rate measured at the position indicated by the piece of position information are input from the input unit 11.

When the piece of position information indicating the measurement place and the communication rate measured at the position indicated by the piece of position information are input, the extraction unit 82 updates a communication rate corresponding to the input piece of position information in the table stored in the database unit 10 with the input communication rate (S60).

Note, however, that, when the input piece of position information is not included in the table stored in the database unit 10, the extraction unit 82 writes the input piece of position information and communication rate in association with each other into the table in the database unit 10.

As a result of execution of the above-described processing in step S60, the table stored in the database unit 10 is updated with the most recently measured communication rate. The operation control station 8 can keep the table up to date.

Since operation other than the above-described operation is the same as that in the system in the first example embodiment, a description thereof will be omitted.

The above description was made assuming that the system of the present example embodiment has the configuration and functions of the system of the first example embodiment. The system of the present example embodiment may be a system configured under the assumption that the system has the configuration and functions of the system of any of the second to fifth example embodiments. Even in that case, the extraction unit 72 executes the processing in step S60 before the above-described processing in step S12.

[Description of Advantageous Effect]

The operation control station 8 included in the system of the present example embodiment is capable of keeping the table stored in the database unit 10 up to date.

This is because, when a piece of position information indicating a measurement place and a communication rate measured at the position indicated by the piece of position information are input, the operation control station of the system of the present example embodiment updates a communication rate corresponding to the input piece of position information with the input communication rate.

Seventh Example Embodiment

Next, a seventh example embodiment of the present invention will be described.

An operation control station included in a system of the seventh example embodiment notifies a base station of a time for which a drone flies over the base station. The base station emits radio waves toward the sky above during the time for which the drone flies over the base station. The drone can surely perform communication.

Hereinafter, a configuration and operation of the system of the seventh example embodiment will be described.

[Description of Configuration]

(1) Configuration of System of Seventh Example Embodiment

Figure 34:
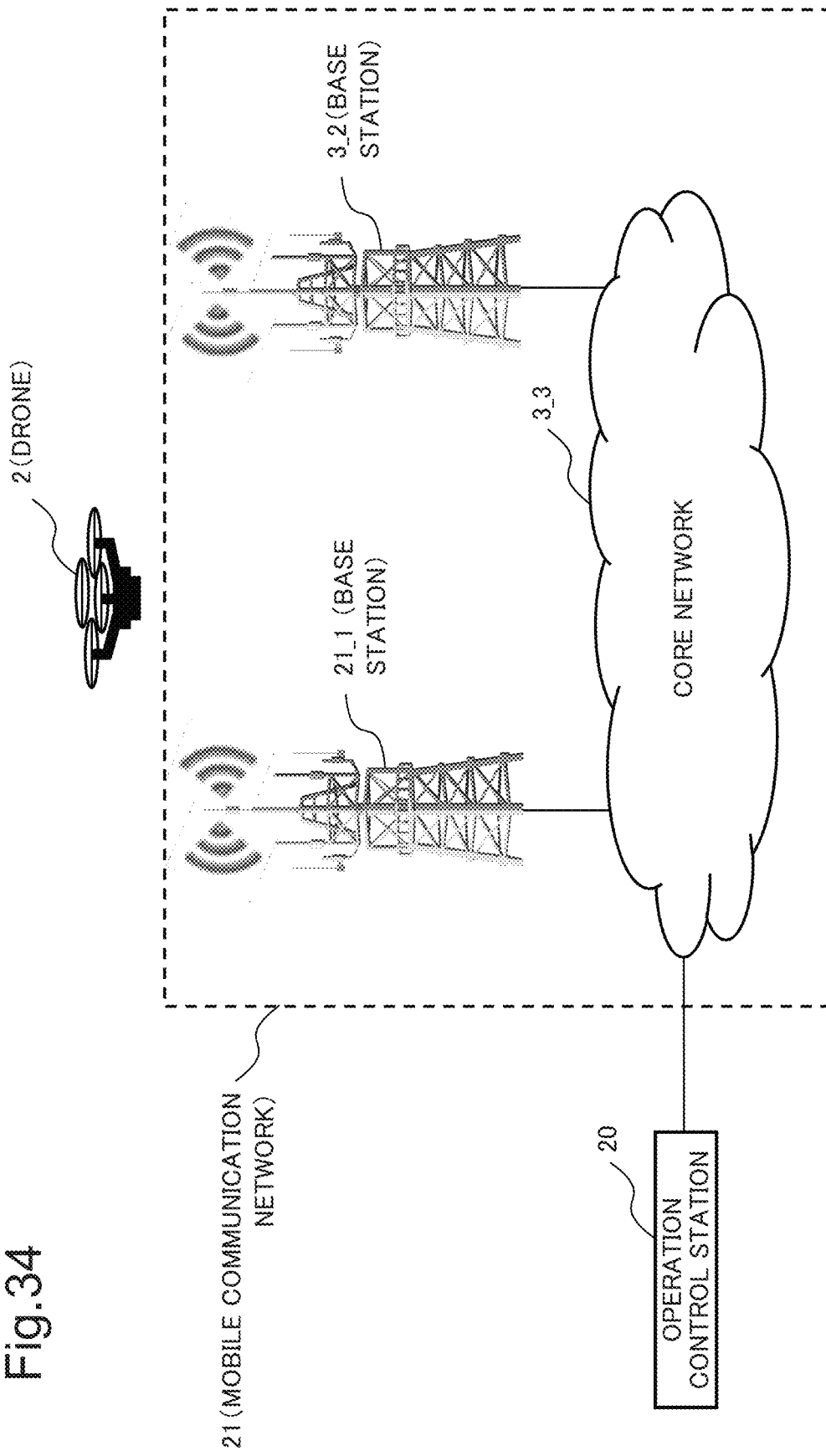
FIG. 34 is a diagram illustrating a configuration example of a system in a seventh example embodiment of the present invention.
Figure 35:
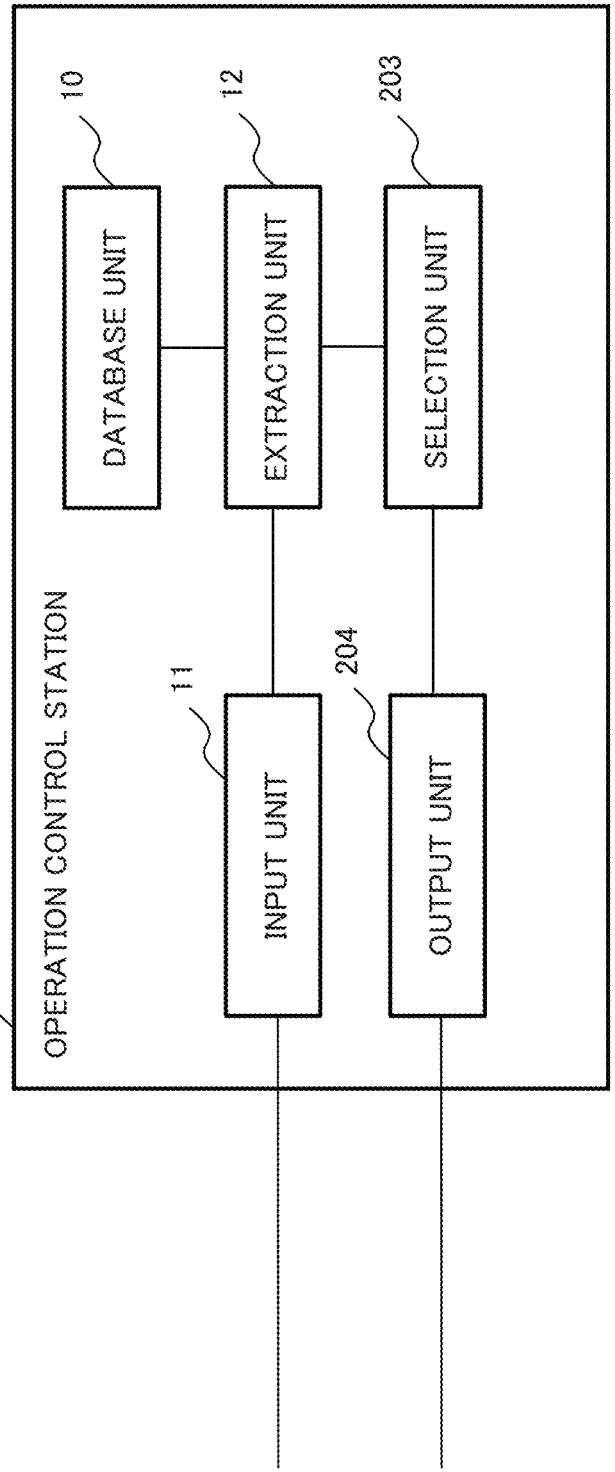
FIG. 35 is a diagram illustrating a configuration example of an operation control station included in the system in the seventh example embodiment of the present invention.

FIG. 34 is a diagram illustrating a configuration example of the system in the seventh example embodiment of the present invention. FIG. 35 is a diagram illustrating a configuration example of the operation control station included in the system in the seventh example embodiment of the present invention.

The system of the seventh example embodiment includes, as illustrated in FIG. 34, an operation control station 20 and a mobile communication network 21 in place of the operation control station 4 and the mobile communication network 3, respectively. The mobile communication network 21 includes base station 21_1 in place of the base station 3_1.

The operation control station 20 includes, as illustrated in FIG. 35, a selection unit 203 and an output unit 204 in place of the selection unit 23 and the output unit 14, respectively. The base station 21_1 includes, although not illustrated, an antenna (hereinafter, referred to as an "antenna for the sky") configured to emit radio waves toward the sky above.

Since components other than the above-described components are the same as those in the system in the second example embodiment, the same reference signs are assigned to those components and descriptions thereof will be omitted.

(2) About Functions of Selection Unit 203 and Output Unit 204

In the selection unit 203, a piece of position information of the base station 21_1 is set in advance by an administrator of the system of the present example embodiment.

The selection unit 203, as with the selection unit 23, calculates a piece(s) of position information of a stopover location(s) on a shortest path along which a drone 2 flies to a destination in the shortest distance.

The selection unit 203, when having calculated the piece(s) of position information of the stopover location(s) on the path, discriminates whether or not the base station 21_1 exists on the path. Specifically, the selection unit 203 calculates positions at equal intervals on the path and discriminates whether or not a position the distance of which to the base station 21_1 is equal to or less than a predetermined distance is included in the calculated positions. The predetermined distance is a range that radio waves from the base station 21_1 can reach and is set in the selection unit 203 by the administrator of the system of the present example embodiment.

When the base station 21_1 exists on the path, the selection unit 203 calculates a time point at which the drone 2 passes the position of the base station 21_1. A calculation method of the time point will be described in detail in [Description of Operation], to be described later.

Note that it is assumed that, to enable the time point to be calculated, a flight speed of the drone 2 is set in the selection unit 203 in advance by the administrator of the system of the present example embodiment. In addition, the selection unit 92 has a clock function that outputs a current time point.

The selection unit 203, when having calculated the time point at which the drone 2 passes the position of the base station 21_1, outputs a piece of information indicating the time point to the output unit 204. When the base station 21_1 does not exist on the above-described path, the selection unit 203 waits for input of another piece of position information from an extraction unit 12.

The output unit 204 outputs the input time point as a packet addressed to the base station 21_1.

(3) About Functions of Base Station 21_1

When a packet addressed to the base station 21_1 itself is input, the base station 21_1 extracts a time point from the input packet.

The base station 21_1 includes an antenna that emits radio waves toward the sky above and a clock function that outputs a time point. When the time point output by the clock function coincides with the extracted time point, the base station 21_1 transmits radio waves from the antenna toward the sky above. The radio waves may be radio waves having directivity.

Functions other than the above-described functions are the same as those in the system in the second example embodiment.

[Description of Operation]

Next, operation of the system of the present example embodiment will be described.

Figure 36:
FIG. 36 is a diagram for a description of operation of the operation control station included in the system in the seventh example embodiment of the present invention.

FIG. 36 is a diagram for a description of operation of the operation control station included in the system in the seventh example embodiment of the present invention. Using FIG. 36, the operation of the system of the present example embodiment will be described below.

(1) Discrimination of Whether or not Base Station 21_1 Exists on Path

First, when pieces of position information of a present location and destination of the drone 2 and the like are input, the selection unit 203, by executing processing in steps S14 and S15 as illustrated in FIG. 36, calculates a piece(s) of position information of a stopover location(s) on a path along which the drone 2 flies to the destination in the shortest distance.

Hereinafter, assuming that the calculated piece of position information of a stopover location is a piece of position information of a stopover location A illustrated in FIG. 10, the description will be continued. The path along which the drone 2 flies to the destination in the shortest distance is a path in which the drone 2 flies over the present location, the stopover location A, and the destination in this order.

Next, as illustrated in FIG. 36, the selection unit 203 discriminates whether or not the base station 21_1 exists on the path along which the drone 2 flies (S70).

Specifically, the selection unit 203 calculates positions at equal intervals on the path and discriminates whether or not a position the distance of which to the base station 21_1 is equal to or less than a predetermined distance is included in the calculated positions. The above-described predetermined distance is a range that radio waves from the base station 21_1 can reach and is set in the selection unit 203 by the administrator of the system of the present example embodiment.

"Calculating positions at equal intervals on the path" is equivalent to calculating pieces of position information of positions at equal intervals between the present location and the stopover location A and pieces of position information of positions at equal intervals between the stopover location A and the destination. The equal intervals means intervals of every one second in either latitude or longitude. The selection unit 203, when a difference in latitude between two points is equal to or greater than a difference in longitude between the two points, calculates pieces of position information of positions every one second in latitude and, when the difference in latitude between the two points is less than the difference in longitude between the two points, calculates pieces of position information of positions every one second in longitude. The selection unit 203 discriminates whether or not a piece of position information of a position the distance of which to the base station 21_1 is equal to or less than the predetermined distance is included in the calculated pieces of position information.

(2) Calculation of Time Point when Drone 2 Passes Position of Base Station 21_1

Next, when, in the above-described step S70, the base station 21_1 exists on the path (Yes in step S70), the selection unit 203 calculates a time point at which the drone 2 passes the position of the base station 21_1 (S71). A calculation method of the time point is in accordance with the following steps (q) to (u).

(q) First, the selection unit 203 discriminates whether or not the base station 21_1 exists between the present location of the drone 2 and the stopover location A. Specifically, the selection unit 203 discriminates whether or not the piece of position information (latitude and longitude) of the base station 21_1 indicates a latitude and longitude between the piece of position information (latitude and longitude) of the present location and the piece of position information (latitude and longitude) of the stopover location A.

(r) Next, when the selection unit 203 discriminates that the base station 21_1 exists between the present location of the drone 2 and the stopover location A, the selection unit 203 calculates a distance from the present location of the drone 2 to the base station 21_1, using Hubeny's formula. Further, the selection unit 203 calculates a period of time required to fly from the present location to the base station 21_1 by dividing the calculated distance by speed of the drone 2. The speed of the drone 2 is set in advance in the selection unit 203.

(s) Next, when the selection unit 203 discriminates that the base station 21_1 does not exist between the present location of the drone 2 and the stopover location A, the selection unit 203 discriminates whether or not the base station 21_1 exists between the stopover location A and the destination of the drone 2. Specifically, the selection unit 203 discriminates whether or not the piece of position information (latitude and longitude) of the base station 21_1 indicates a latitude and longitude between the piece of position information (latitude and longitude) of the stopover location A and the piece of position information (latitude and longitude) of the destination.

(t) Next, when the selection unit 203 discriminates that the base station 21_1 exists between the stopover location A and the destination of the drone 2, the selection unit 203 calculates the total distance of the distance from the present location of the drone 2 to the stopover location A and a distance from the stopover location A to the base station 21_1, using Hubeny's formula. Further, the selection unit 203 calculates a period of time required to fly from the present location to the base station 21_1 via the stopover location A by dividing the calculated distance by the speed of the drone 2.

(u) Next, the selection unit 203 adds the period of time calculated in the above-described step (r) or (t) to a time point that the clock function included in the selection unit 203 itself outputs. A time point obtained by the addition is the time point at which the drone 2 passes the position of the base station 21_1.

Through the above-described processing in steps (q) to (u), the selection unit 203 calculates a time point at which the drone 2 passes the position of the base station 21_1.

Note that, when, in the above-described processing in step (s), the above-described selection unit 203 discriminates that the base station 21_1 does not exist between the stopover location A and the destination of the drone 2, the selection unit 203 once terminates the processing and waits for input of a piece of position information of a present location of the drone 2 and the like. In addition, when, in the above-described step S70, the base station 21_1 does not exist on the flight path of the drone 2 (No in step S70), the selection unit 203 also once terminates the processing and waits for input of a piece of position information of a present location of the drone 2 and the like.

(2) Notification of Calculated Time Point to Base Station 21_1

The selection unit 203, when, by executing the above-described processing in step S71, having calculated a time point at which the drone 2 passes the position of the base station 21_1, outputs the time point to the output unit 204 (S72).

When the time point is input, the output unit 204 outputs the input time point as a packet addressed to the base station 21_1 (S73). The output packet reaches the base station 21_1 via a core network 3_3.

When a packet addressed to the base station 21_1 itself is input, the base station 21_1 extracts a time point from the input packet and stores the extracted time point in a memory included in the base station 21_1 itself.

Next, the base station 21_1 has the clock function outputting a current time point, and, when the time point output by the clock function coincides with the time point stored in the memory, the base station 21_1 transmits radio waves from the antenna for the sky directed toward the sky above.

As a consequence, since the drone 2 receives radio waves from the base station 21_1 at a time point at which the drone 2 passes a space above the base station 21_1, the drone 2 can surely perform communication. As a consequence, the drone 2 can surely deliver image data to the ground.

Note that the base station 21_1 terminates the emission of radio waves toward the sky above when a predetermined period of time has elapsed since the base station 21_1 started transmitting radio waves. As a consequence, since the base station 21_1 emits radio waves toward the sky above during only a period of time for which the drone 2 passes, increase in the power consumption of the device can be suppressed. The predetermined period of time is a period of time for which the drone 2 passes a space above the base station 21_1 and is set in the base station 21_1 by the administrator of the system of the present example embodiment.

In addition, although, in the above description, a case where the stopover location is the stopover location A was described, the selection unit 203 is capable of executing similar processing even when there are a plurality of stopover locations. That is, the selection unit 203, as with the above-described processing in step (q), discriminates whether or not the base station 21_1 exists between stopover locations. When the selection unit 203 discriminates that the base station 21_1 exists between stopover locations, the selection unit 203 calculates a distance from the present location of the drone 2 to the base station 21_1 via a stopover location(s), using Hubeny's formula. The selection unit 203 calculates a period of time required to reach the base station 21_1 by dividing the calculated distance by the speed of the drone 2 and adds the calculated period of time to a time point that the clock function, included in the selection unit 203 itself, outputs. The selection unit 203 outputs the calculated time point to the output unit 204. Note that the above-described "time point" is a piece of information that the operation control station uses and, to be precise, means time information.

Since operation other than the above-described operation is the same as that in the system in the second example embodiment, a description thereof will be omitted.

The above description was made assuming that the system of the present example embodiment has the configuration and functions of the system of the second example embodiment. The system of the present example embodiment may be a system configured under the assumption that the system has the configuration and functions of the system of either of the third and fourth example embodiments. In that case, the selection unit 203 executes the above-described processing in steps S70 to S72 after the processing in step S15. The output unit 204 executes the processing in step S73 after the processing in step S72.

[Description of Advantageous Effects]

Since, in the system of the present example embodiment, the drone 2 receives radio waves from the base station at a time point at which the drone 2 passes a stopover location, the drone 2 can surely perform communication. As a consequence, the drone 2 can surely deliver image data to the ground. Since, in the system of the present example embodiment, the base station 21_1 emits radio waves toward the sky above during only a predetermined period of time after a time point at which the drone 2 passes, increase in the power consumption of the device can be suppressed.

Eighth Example Embodiment

FIG. 37 is a diagram illustrating a configuration example of a system in an eighth example embodiment of the present invention. Hereinafter, a configuration and operation of the system of the eighth example embodiment will be described.

[Description of Configuration]

(1) Configuration of System of Eighth Example Embodiment

The system of the eighth example embodiment includes, as illustrated in FIG. 37, a device 100 and a flight vehicle 150. The device 100 is a device configured to communicate with the flight vehicle 150.

The device 100 includes a storage unit 101, an extraction unit 102, and an output unit 103.

(2) Functions of Respective Components of Device 100

The storage unit 101 stores a piece(s) of first position information and a first communication rate(s) at which communication can be performed at a position(s) indicated by the piece(s) of first position information in association with each other.

To the extraction unit 102, a piece of information corresponding to a predetermined second communication rate at which the flight vehicle 150 transmits data is input.

The above-described piece of information corresponding to the second communication rate may be input from the flight vehicle 150. In that case, an administrator of the system of the present example embodiment sets the above-described piece of information corresponding to the second communication rate in the flight vehicle 150 in advance. The administrator of the system of the present example embodiment may, for example, determine a transmission rate at which the flight vehicle 150 transmits data as a system standard at the time of system design and set a piece of information indicating the determined communication rate to the flight vehicle 150 as the piece of information corresponding to the second communication rate.

The extraction unit 102 extracts a piece(s) of first position information corresponding to a first communication rate(s) that is/are equal to or higher than the second communication rate from the storage unit 101.

The output unit 103 outputs a piece(s) of first position information extracted by the extraction unit 102 to the flight vehicle 150 or an instrument configured to notify the flight vehicle 150 of an input piece(s) of first position information. The instrument configured to notify the flight vehicle 150 of the input piece(s) of first position information may be a remote controller for manipulating the flight vehicle 150.

(3) Functions of Flight Vehicle 150

The flight vehicle 150 flies to a position(s) indicated by an input piece(s) of first position information.

[Description of Operation]

Next, operation of the system of the present example embodiment will be described. Note that it is assumed that the storage unit 101 of the device 100 has stored a piece(s) of first position information and a first communication rate(s) at which communication can be performed at a position(s) indicated by the piece(s) of first position information in association with each other.

In addition, it is assumed that, in the flight vehicle 150, a piece of information corresponding to a predetermined second communication rate of 3 Mbps at which the flight vehicle 150 transmits data has been set by the administrator of the system of the present example embodiment.

The flight vehicle 150 outputs, at a predetermined opportunity (for example, at the time of flight start), the piece of information corresponding to the set second communication rate to the extraction unit 102 of the device 100.

When the piece of information corresponding to the second communication rate is input from the flight vehicle 150, the extraction unit 102 of the device 100 extracts a piece(s) of first position information corresponding to a first communication rate(s) that is/are equal to or higher than the second communication rate from the storage unit 101.

The extracted piece(s) of first position information is a piece(s) of position information of a position(s) at which transmission can be performed at a communication rate equal to or higher than the second communication rate (3 Mbps). That is, the extracted piece(s) of first position information is a piece(s) of position information of a position(s) at which the flight vehicle 150 can transmit data.

Next, the output unit 103 outputs the piece(s) of first position information extracted by the extraction unit 102 to the flight vehicle 150.

Next, it is assumed that the flight vehicle 150 has captured an image of the ground, using a camera included in the vehicle 150 and has retained the captured image. In that case, the flight vehicle 150 flies to the position(s) indicated by the input piece(s) of first position information. As a consequence, the flight vehicle 150 can transmit the retained data at the position(s) indicated by the piece(s) of first position information. That is, the flight vehicle 150 can deliver retained data to the ground.

Note that, when a position indicated by an input piece of first position information is the present location, the flight vehicle 150 may, instead of retaining data, transmit the data immediately. Since the present location is a position at which data can be transmitted, the flight vehicle 150 can deliver data to the ground.

[Description of Advantageous Effect]

The present example embodiment enables the flight vehicle 150 to deliver data to the ground.

That is because, when a predetermined second communication rate at which the flight vehicle 150 transmits data is input, the device 100 included in the system of the present example embodiment calculates a piece(s) of first position information indicating a position(s) at which data can be transmitted at the communication rate and notifies the flight vehicle 150 of the calculated piece(s) of first position information. Therefore, the flight vehicle 150 can perceive a position at which data can be transmitted, fly to the position, and transmit data. As a consequence, the flight vehicle 150 can deliver data to the ground.

While the invention has been particularly shown and described with reference to example embodiments thereof, the invention is not limited to these embodiments. It will be understood by those of ordinary skill in the art that various changes inform and details may be made therein without departing from the spirit and scope of the present invention as defined by the claims.

The whole or part of the example embodiments disclosed above can be described as, but not limited to, the following supplementary notes.

(Supplementary Note 1)

A device configured to communicate with a flight vehicle, including:

a storage means for storing a piece(s) of first position information and a first communication rate(s) at which communication can be performed at a position(s) indicated by the piece(s) of first position information in association with each other;

an extraction means for, when a piece of information corresponding to a predetermined second communication rate at which the flight vehicle transmits data is input, extracting a piece(s) of first position information corresponding to a first communication rate(s) that is/are equal to or higher than the second communication rate from the storage means; and an output means for outputting the piece(s) of first position information extracted by the extraction means to the flight vehicle or an instrument configured to notify the flight vehicle of the input piece(s) of first position information.

(Supplementary Note 2)

The device according to supplementary note 1 including a selection means for, when a piece of third position information indicating a present location of the flight vehicle and a piece of fourth position information indicating a destination of the flight vehicle are input, selecting a piece of first position information of a position on a shortest path among a path(s) from the present location to the destination each of which passes one of a position(s) indicated by the piece(s) of first position information extracted by the extraction means, using a shortest path search method, wherein the output means outputs the piece of first position information selected by the selection means.

(Supplementary Note 3)

The device according to supplementary note 2, wherein the selection means selects, out of the piece(s) of first position information extracted by the extraction means, a predetermined piece(s) of first position information corresponding to a corner(s) of an area in which communication can be performed at a communication rate equal to or higher than the second communication rate and selects a piece(s) of first position information of a position(s) on a shortest path connecting positions within the area among a path(s) from the present location to the destination each of which passes a position(s) among a position(s) indicated by the selected piece(s) of first position information, using a shortest path search method.

(Supplementary Note 4)

The device according to either of supplementary notes 2 and 3, wherein the shortest path search method is a Dijkstra method.

(Supplementary Note 5)

The device according to any one of supplementary notes 1 to 4, wherein the device is a device connected to a core network of a mobile communication system or a mobile edge computing (MEC) server included in a base station.

(Supplementary Note 6)

The device according to any one of supplementary notes 1 to 5, wherein the storage means stores the piece(s) of first position information and a piece(s) of flight information that indicate(s) whether or not a flight vehicle is allowed to fly over a position(s) indicated by the piece(s) of first position information in association with each other, and the extraction means extracts, out of the extracted piece(s) of first position information, a piece(s) of first position information with which a piece(s) of flight information indicating that a flight vehicle is allowed to fly over the position(s) indicated by the piece(s) of first position information is/are associated in the storage means.

(Supplementary Note 7)

The device according to any one of supplementary notes 1 to 6, wherein when a piece of fifth position information and a fifth communication rate measured at a position indicated by the piece of fifth position information are input from the flight vehicle, the extraction means updates the first communication rate in the storage means corresponding to the input piece of fifth position information with the input fifth communication rate.

(Supplementary Note 8)

The device according to any one of supplementary notes 2 to 4, wherein the selection means performs first discrimination of whether or not a predetermined base station exists on the shortest path and, when a result of the first discrimination is positive, calculates a time point at which the flight vehicle passes a position of the predetermined base station and outputs a piece of time point information indicating the calculated time point to the output means, and the output means notifies the connected predetermined base station of the piece of time point information input from the selection means.

(Supplementary Note 9)

A system including:

a device according to any one of supplementary notes 1 to 8; and the flight vehicle configured to fly to a position(s) indicated by the input piece(s) of first position information.

(Supplementary Note 10)

The system according to supplementary note 9 including a base station connected to the device according to supplementary note 8, wherein the base station emits radio waves toward the sky above when it reaches a time point indicated by the piece of time point information.

(Supplementary Note 11)

A method for a device configured to communicate with a flight vehicle, the method including:

when a piece of information corresponding to a predetermined first communication rate at which the flight vehicle transmits data is input, extracting, from a storage means that stores a piece(s) of second position information and a second communication rate(s) at which communication can be performed at a position(s) indicated by the piece(s) of second position information in association with each other, a piece(s) of second position information corresponding to a second communication rate(s) that is/are equal to or higher than the first communication rate; and outputting the extracted piece(s) of second position information to the flight vehicle or an instrument configured to notify the flight vehicle of the input piece(s) of second position information.

(Supplementary Note 12)

The method according to supplementary note 11 including;

when a piece of third position information indicating a present location of the flight vehicle and a piece of fourth position information indicating a destination of the flight vehicle are input, selecting a piece of second position information of a position on a shortest path among a path(s) from the present location to the destination each of which passes one of a position(s) indicated by the extracted piece(s) of second position information, using a shortest path search method; and outputting the selected piece of second position information.

(Supplementary Note 13)

The method according to supplementary note 12 further including;

selecting, out of the extracted piece(s) of second position information, a predetermined piece(s) of second position information corresponding to a corner(s) of an area in which communication can be performed at a communication rate equal to or higher than the first communication rate and selecting a piece(s) of second position information of a position(s) on a shortest path connecting positions within the area among a path(s) from the present location to the destination each of which passes a position(s) among a position(s) indicated by the selected piece(s) of second position information, using a shortest path search method.

(Supplementary Note 14)

The method according to either of supplementary notes 12 and 13, wherein the shortest path search method is a Dijkstra method.

(Supplementary Note 15)

The method according to any one of supplementary notes 11 to 14, wherein the storage means is a storage means for storing the piece(s) of second position information and a piece(s) of flight information that indicate(s) whether or not a flight vehicle is allowed to fly over a position(s) indicated by the piece(s) of second position information in association with each other, and extracting, out of the extracted piece(s) of second position information, a piece(s) of second position information with which a piece(s) of flight information indicating that a flight vehicle is allowed to fly over the position(s) indicated by the piece(s) of second information is/are associated in the storage means.

(Supplementary Note 16)

The method according to any one of supplementary notes 11 to 15 further including when a piece of fifth position information and a fifth communication rate measured at a position indicated by the piece of fifth position information are input from the flight vehicle, updating the second communication rate in the storage means corresponding to the input piece of fifth position information with the input fifth communication rate.

(Supplementary Note 17)

The method according to any one of supplementary notes 12 to 14 further including:

performing first discrimination of whether or not a predetermined base station exists on the shortest path and, when a result of the first discrimination is positive, calculating a time point at which the flight vehicle passes a position of the predetermined base station and outputting a piece of time point information indicating the calculated time point; and notifying the connected predetermined base station of the input piece of time point information.

(Supplementary Note 18)

A recording medium recording a program causing a processor installed in a device configured to communicate with a flight vehicle to execute:

extraction processing of, when a piece of information corresponding to a predetermined first communication rate at which the flight vehicle transmits data is input, extracting, from a storage means that stores a piece(s) of second position information and a second communication rate(s) at which communication can be performed at a position(s) indicated by the piece(s) of second position information in association with each other, a piece(s) of second position information corresponding to a second communication rate(s) that is/are equal to or higher than the first communication rate; and output processing of outputting the piece(s) of second position information extracted in the extraction processing to the flight vehicle or an instrument configured to notify the flight vehicle of the input piece(s) of second position information.

(Supplementary Note 19)

The recording medium recording the program according to supplementary note 18, the program causing the processor to execute:

selection processing of, when a piece of third position information indicating a present location of the flight vehicle and a piece of fourth position information indicating a destination of the flight vehicle are input, selecting a piece of second position information of a position on a shortest path among a path(s) from the present location to the destination each of which passes one of a position(s) indicated by the piece(s) of second position information extracted in the extraction processing, using a shortest path search method; and in the output processing, processing of outputting the piece of second position information selected in the selection processing.

(Supplementary Note 20)

The recording medium recording the program according to supplementary note 19, the program causing the processor to execute in the selection processing, processing of selecting, out of the piece(s) of second position information extracted in the extraction processing, a predetermined piece(s) of second position information corresponding to a corner (s) of an area in which communication can be performed at a communication rate equal to or higher than the first communication rate and selecting a piece(s) of second position information of a position(s) on a shortest path connecting positions within the area among a path(s) from the present location to the destination each of which passes a position(s) among a position(s) indicated by the selected piece(s) of second position information, using a shortest path search method.

(Supplementary Note 21)

The recording medium recording the program according to either of supplementary notes 19 and 20, wherein the shortest path search method is a Dijkstra method.

(Supplementary Note 22)

The recording medium recording the program according to any one of supplementary notes 18 to 21, wherein the storage means is a storage means for storing the piece(s) of second position information and a piece(s) of flight information that indicate(s) whether or not a flight vehicle is allowed to fly over a position(s) indicated by the piece(s) of second position information in association with each other, the program causing the processor to execute, in the extraction processing, processing of extracting, out of the extracted piece(s) of second position information, a piece(s) of second position information with which a piece(s) of flight information indicating that a flight vehicle is allowed to fly over the position(s) indicated by the piece(s) of second information is/are associated in the storage means.

(Supplementary Note 23)

The recording medium recording the program according to any one of supplementary notes 18 to 22, the program causing the processor to execute in the extraction processing, processing of, when a piece of fifth position information and a fifth communication rate measured at a position indicated by the piece of fifth position information are input from the flight vehicle, updating the second communication rate in the storage means corresponding to the input piece of fifth position information with the input fifth communication rate.

(Supplementary Note 24)

The recording medium recording the program according to any one of supplementary notes 19 to 21, the program causing the processor to execute:

in the selection processing, processing of performing first discrimination of whether or not a predetermined base station exists on the shortest path and, when a result of the first discrimination is positive, calculating a time point at which the flight vehicle passes a position of the predetermined base station and outputting a piece of time point information indicating the calculated time point; and in the output processing, processing of notifying the connected predetermined base station of the piece of time point information input by the selection processing.

(Supplementary Note 25)

A method for a device configured to communicate with a flight vehicle, the method including:

when a piece of information corresponding to a predetermined first communication rate at which the flight vehicle transmits data is input, extracting, from a storage means that stores a piece(s) of second position information and a second communication rate(s) at which communication can be performed at a position(s) indicated by the piece(s) of second position information in association with each other, a piece(s) of second position information corresponding to a second communication rate(s) that is/are equal to or higher than the first communication rate; and outputting the extracted piece(s) of second position information to the flight vehicle or an instrument configured to notify the flight vehicle of the input piece(s) of first position information.

(Supplementary Note 26)

A program causing a processor installed in a device configured to communicate with a flight vehicle to execute:

extraction processing of, when a piece of information corresponding to a predetermined first communication rate at which the flight vehicle transmits data is input, extracting, from a storage means that stores a piece(s) of second position information and a second communication rate(s) at which communication can be performed at a position(s) indicated by the piece(s) of second position information in association with each other, a piece(s) of second position information corresponding to a second communication rate(s) that is/are equal to or higher than the first communication rate; and output processing of outputting the piece(s) of second position information extracted in the extraction processing to the flight vehicle or an instrument configured to notify the flight vehicle of the input piece(s) of first position information.

(Supplementary Note 27)

The program according to supplementary note 26 causing the processor to execute:

selection processing of, when a piece of third position information indicating a present location of the flight vehicle and a piece of fourth position information indicating a destination of the flight vehicle are input, selecting a piece of second position information of a position on a shortest path among a path(s) from the present location to the destination each of which passes one of a position(s) indicated by the piece(s) of second position information extracted in the extraction step, using a shortest path search method; and in the output processing, processing of outputting the piece of second position information selected in the selection processing.

(Supplementary Note 28)

A program causing a processor installed in a device configured to communicate with a flight vehicle to execute:

extraction processing of, when a piece of information corresponding to a predetermined first communication rate at which the flight vehicle transmits data is input, extracting, from a storage means that stores a piece(s) of second position information and a second communication rate(s) at which communication can be performed at a position(s) indicated by the piece(s) of second position information in association with each other, a piece(s) of second position information corresponding to a second communication rate(s) that is/are equal to or higher than the first communication rate; and output processing of outputting the piece(s) of second position information extracted in the extraction processing to the flight vehicle or an instrument configured to notify the flight vehicle of the input piece(s) of second position information.

(Supplementary Note 29)

The program according to supplementary note 28 causing the processor to execute:

selection processing of, when a piece of third position information indicating a present location of the flight vehicle and a piece of fourth position information indicating a destination of the flight vehicle are input, selecting a piece of second position information of a position on a shortest path among a path(s) from the present location to the destination each of which passes one of a position(s) indicated by the piece(s) of second position information extracted in the extraction processing, using a shortest path search method; and in the output processing, processing of outputting the piece of second position information selected in the selection processing.

(Supplementary Note 30)

The program according to supplementary note 29 causing the processor to execute in the selection processing, processing of selecting, out of the piece(s) of second position information extracted in the extraction processing, a predetermined piece(s) of second position information corresponding to a corner (s) of an area in which communication can be performed at a communication rate equal to or higher than the first communication rate and selecting a piece(s) of second position information of a position(s) on a shortest path connecting positions within the area among a path(s) from the present location to the destination each of which passes a position(s) among a position(s) indicated by the selected piece(s) of second position information, using a shortest path search method.

(Supplementary Note 31)

The program according to either of supplementary notes 29 and 30, wherein the shortest path search method is a Dijkstra method.

(Supplementary Note 32)

The program according to any one of supplementary notes 28 to 31, wherein the storage means is a storage means for storing the piece(s) of second position information and a piece(s) of flight information that indicate(s) whether or not a flight vehicle is allowed to fly over a position(s) indicated by the piece(s) of second position information in association with each other, the program causing the processor to execute, in the extraction processing, processing of extracting, out of the extracted piece(s) of second position information, a piece(s) of second position information with which a piece(s) of flight information indicating that a flight vehicle is allowed to fly over the position(s) indicated by the piece(s) of second information is/are associated in the storage means.

(Supplementary Note 33)

The program according to any one of supplementary notes 28 to 32 causing the processor to execute in the extraction processing, processing of, when a piece of fifth position information and a fifth communication rate measured at a position indicated by the piece of fifth position information are input from the flight vehicle, updating the second communication rate in the storage means corresponding to the input piece of fifth position information with the input fifth communication rate.

(Supplementary Note 34)

The program according to any one of supplementary notes 29 to 31 causing the processor to execute:

in the selection processing, processing of performing first discrimination of whether or not a predetermined base station exists on the shortest path and, when a result of the first discrimination is positive, calculating a time point at which the flight vehicle passes a position of the predetermined base station and outputting a piece of time point information indicating the calculated time point; and in the output processing, processing of notifying the connected predetermined base station of the piece of time point information input by the selection processing.

REFERENCE SIGNS LIST 1, 4, 5, 7, 8, 20 Operation control station
2, 9 Drone
3, 6, 21 Mobile communication network
3_1, 3_2, 6_1, 6_2, 21_1 Base station
3_3 Core network
10, 50, 70, 600 Database unit
11 Input unit
12, 52, 72, 82, 102, 602 Extraction unit
13, 23, 53, 203, 603 Selection unit
14, 103, 204, 604 Output unit
60 Mobile edge computing (MEC) server
100 Device
150 Flight vehicle
101 Storage unit

The invention claimed is:

1. A system comprising:
a device, and
a base station,
wherein the device comprises:
  a memory configured to store one or more pieces of first position information and one or more first communication rates at which data is transmittable by the flight vehicle at one or more positions indicated by the one or more pieces of first position information in association with each other;
  a processor configured to:
    receive, from the flight vehicle, a second position information indicating a present location of the flight vehicle and a second communication rate at which the flight vehicle transmits data;
    extract a first piece of the one or more pieces of first position information corresponding to one of the one or more first communication rates that is equal to or greater than the second communication rate from the memory;
    when the extracted first piece of the one or more pieces of the first position information output, select a second piece of the one or more pieces of first position information corresponding to one of the one or more positions that is located between the present location of the flight vehicle and a destination of the flight vehicle, based on the second position information, out of the first piece of the one or more pieces of first position information;
    control an operation of the flight vehicle by outputting the selected second piece of the one or more pieces of first position information to the flight vehicle;
    select a third piece of the one or more first position information of a position on a shortest path among one or more paths from the present location to the destination, using a shortest path search method;
    perform first discrimination of whether or not a predetermined base station exists on the shortest path, and when a result of the first discrimination is positive, calculate a time point at which the flight vehicle passes a position of the predetermined base station;
    output a piece of time point information indicating the calculated time point; and
    notify the connected predetermined base station of the piece of time point information, and wherein the base station is configured to emit radio waves toward the sky above when the time point indicated by the piece of time point information is reached.

2. The device according to claim 1, wherein the processor is further configured to:
select, when a third position information indicating a destination of the flight vehicle are input, the third piece of the one or more first position information of the position on the shortest path among one or more paths from the present location to the destination, each of which passes one of the one or more positions indicated by the extracted first piece of the one or more pieces of first position information, and
output the selected piece of first position information.

3. The device according to claim 2, wherein the processor is further configured to:
select, out of the extracted first piece of the one or more pieces of first position information, a predetermined piece of first position information corresponding to a corner or corners of an area in which communication can be performed at a communication rate equal to or greater than the second communication rate and select a piece of first position information of one or more positions on a shortest path connecting positions within the area among one or more paths from the present location to the destination each of which passes one or more positions among the one or more positions indicated by the selected piece of first position information, using a shortest path search method.

4. The device according to claim 2, wherein
the shortest path search method is a Dijkstra method.

5. The device according to claim 1, wherein
the memory stores the one or more pieces of first position information and one or more pieces of flight information that indicates whether or not a flight vehicle is allowed to fly over one or more positions indicated by the one or more pieces of first position information in association with each other, and
the processor is further configured to extract, out of the extracted first piece of the one or more pieces first position information, one or more pieces of first position information with which one or more pieces of flight information indicating that a flight vehicle is allowed to fly over the one or more positions indicated by the one or more pieces of first position information is associated in the memory.

6. The device according to claim 1, wherein
when a piece of fourth position information and a fourth communication rate measured at a position indicated by the piece of fourth position information are input from the flight vehicle, the processor is further configured to update the first communication rate in the memory corresponding to the input piece of fourth position information with the input fourth communication rate.

7. The device according to claim 1, wherein the device is a device connected to a core network of a mobile communication system or a mobile edge computing (MEC) server included in a base station.

8. A method for a device configured to communicate with a flight vehicle, the method including:
storing, in a memory, one or more pieces of first position information and one or more first communication rates at which data is transmittable by the flight vehicle at one or more positions indicated by the one or more pieces of first position information in association with each other;
receiving, from the flight vehicle, a second position information indicating a present location of the flight vehicle and a second communication rate at which the flight vehicle transmits data;
extracting a first piece of the one or more pieces of the first position information corresponding to one of the one or more first communication rates that is equal to or greater than the second communication rate from the memory;
when the extracted first piece of the one or more pieces of the first position information output, selecting a second piece of the one or more pieces of first position information corresponding to one of the one or more positions that is located between the present location of the flight vehicle and a destination of the flight vehicle, based on the second position information, out of the first piece of the one or more pieces of first position information;
controlling an operation of the flight vehicle by outputting the selected second piece of the one or more pieces of first position information;
selecting a third piece of the one or more first position information of a position on a shortest path among one or more paths from the present location to the destination, using a shortest path search method;
performing first discrimination of whether or not a predetermined base station exists on the shortest path, and when a result of the first discrimination is positive, calculate a time point at which the flight vehicle passes a position of the predetermined base station;
outputting a piece of time point information indicating the calculated time point;
notifying the connected predetermined base station of the piece of time point information, and
emitting, by the base station, radio waves toward the sky above when the time point indicated by the piece of time point information is reached.

9. The method according to claim 8 including;
when a third position information indicating a destination of the flight vehicle are input, selecting the third piece of the one or more first position information of the position on the shortest path among one or more paths from the present location to the destination, each of which passes one of the one or more positions indicated by the extracted first piece of the one or more pieces of first position information; and
outputting the selected piece of first position information.

10. The method according to claim 9 further including;
selecting, out of the extracted first piece of the one or more pieces of first position information, a predetermined piece of first position information corresponding to a corner or corners of an area in which communication can be performed at a communication rate equal to or greater than the second communication rate and select a piece of first position information of one or more positions on a shortest path connecting positions within the area among one or more paths from the present location to the destination each of which passes one or more positions among the one or more positions indicated by the selected piece of first position information, using a shortest path search method.

11. The method according to claim 9, wherein
the shortest path search method is a Dijkstra method.

12. The method according to claim 8 further including
when a piece of fourth position information and a fourth communication rate measured at a position indicated by the piece of fourth position information are input from the flight vehicle, updating the first communication rate in the memory corresponding to the input piece of fourth position information with the input fourth communication rate.

13. The method according to claim 8, wherein the memory stores the one or more pieces of first position information and one or more pieces of flight information that indicates whether or not a flight vehicle is allowed to fly over one or more positions indicated by the one or more pieces of first position information in association with each other, and the method further comprises extracting, out of the extracted first piece of the one or more pieces first position information, one or more pieces of first position information with which one or more pieces of flight information indicating that a flight vehicle is allowed to fly over the one or more positions indicated by the one or more pieces of first position information is associated in the memory.

14. A non-transitory computer readable recording medium recording a program causing a processor installed in a device configured to communicate with a flight vehicle to execute:

storing, in a memory, one or more pieces of first position information and one or more first communication rates at which data is transmittable by the flight vehicle at one or more positions indicated by the one or more pieces of first position information in association with each other;

receiving, from the flight vehicle, a second position information indicating a present location of the flight vehicle and a second communication rate at which the flight vehicle transmits data;

extracting a first piece of the one or more pieces of first position information corresponding to one of the one or more first communication rates that is equal to or greater than the second communication rate from the memory;

when the extracted first piece of the one or more pieces of the first position information output, selecting a second piece of the one or more pieces of first position information corresponding to one of the one or more positions that is located between the present location of the flight vehicle and a destination of the flight vehicle, based on the second position information, out of the first piece of the one or more pieces of first position information; and controlling an operation of the flight vehicle by outputting the selected second piece of the one or more pieces of first position information;

selecting a third piece of the one or more first position information of a position on a shortest path among one or more paths from the present location to the destination, using a shortest path search method;

performing first discrimination of whether or not a predetermined base station exists on the shortest path, and when a result of the first discrimination is positive, calculate a time point at which the flight vehicle passes a position of the predetermined base station;

outputting a piece of time point information indicating the calculated time point;

notifying the connected predetermined base station of the piece of time point information, and emitting, by the base station, radio waves toward the sky above when the time point indicated by the piece of time point information is reached.

15. The non-transitory computer readable recording medium recording the program according to claim 14, the program causing the processor to execute:

when a third position information indicating a destination of the flight vehicle are input, selecting the third piece of the one or more first position information of the position on the shortest path among one or more paths from the present location to the destination, each of which passes one of the one or more positions indicated by the extracted first piece of the one or more pieces of first position information; and outputting the piece of first position information selected in the selection processing.

16. The non-transitory computer readable recording medium recording the program according to claim 15, the program causing the processor to execute selecting, out of the first piece of the one or more pieces of first position information, a predetermined piece of first position information corresponding to a corner or corners of an area in which communication can be performed at a communication rate equal to or greater than the second communication rate and select a piece of first position information of one or more positions on a shortest path connecting positions within the area among one or more paths from the present location to the destination each of which passes one or more positions among the one or more positions indicated by the selected piece of first position information, using a shortest path search method.

* * * * *